US009600658B2

(12) United States Patent
Kanzaki et al.

(10) Patent No.: US 9,600,658 B2
(45) Date of Patent: Mar. 21, 2017

(54) GENERATING OR CHANGING PASSWORDS USING A DEGREE OF SIMPLICITY

(71) Applicant: International Business Machines Corporation, Armonk, NY (US)

(72) Inventors: Eisuke Kanzaki, Fujisawa (JP); Akira Ohkado, Yokohama (JP); Tomohiro Shioya, Tokyo (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 14/607,267

(22) Filed: Jan. 28, 2015

(65) Prior Publication Data

US 2015/0294109 A1 Oct. 15, 2015

(30) Foreign Application Priority Data

Apr. 11, 2014 (JP) .................................. 2014-082087

(51) Int. Cl.
*G06F 21/46* (2013.01)
*G06F 21/60* (2013.01)

(52) U.S. Cl.
CPC ............ *G06F 21/46* (2013.01); *G06F 21/604* (2013.01)

(58) Field of Classification Search
CPC ................................. G06F 21/46; G06F 21/604
See application file for complete search history.

(56) References Cited

U.S. PATENT DOCUMENTS 9,178,876 B1 * 11/2015 Johansson ........... H04L 63/0846
2005/0235341 A1 * 10/2005 Stieglitz ................. G06F 21/46
726/5

(Continued)

FOREIGN PATENT DOCUMENTS

GB 2486707 A 6/2012
JP 09325942 A 12/1997

(Continued)

OTHER PUBLICATIONS

Unknown, "Decision to Grant a Patent" for patent titled "A method of generating or changing a password, its electronic device, and program for electronic devices," Patent Application No. 2014-082087, dated Apr. 8, 2016, Tanslated May 25, 2016, 6 pages.

*Primary Examiner* — Robert Leung
(74) *Attorney, Agent, or Firm* — Mark G. Edwards

(57) ABSTRACT

A technique for generating passwords. The technique includes displaying objects, enabling a degree of simplicity to be set for a password, and generating a password in accordance with the established degree of simplicity. The technique also includes superimposing and displaying a secondary object icon for at least one secondary object available to a primary object on top of the primary object icon for the primary object, and the superimposing and display entails either superimposing and displaying a display on the superimposed secondary object icon to indicate whether or not the superimposed secondary object is available on the basis of the degree of simplicity, or changing the superimposed secondary object icon so as to differentiate the availability of the superimposed secondary object on the basis of the degree of simplicity.

12 Claims, 25 Drawing Sheets

(56) References Cited

U.S. PATENT DOCUMENTS

| | | | |
|---|---|---|---|
| 2008/0115223 A1* | 5/2008 | Morris | G06F 21/31 |
| | | | 726/27 |
| 2008/0320588 A1* | 12/2008 | Lipetz | G06F 21/6218 |
| | | | 726/19 |
| 2009/0282258 A1* | 11/2009 | Burke | G06F 21/31 |
| | | | 713/184 |
| 2012/0084734 A1 | 4/2012 | Wilairat | |
| 2013/0031480 A1* | 1/2013 | Boss | G06F 21/604 |
| | | | 715/738 |
| 2013/0055169 A1 | 2/2013 | Wright et al. | |
| 2013/0055379 A1* | 2/2013 | Adams | H04L 9/3226 |
| | | | 726/18 |
| 2013/0167224 A1 | 6/2013 | Horiuchi et al. | |

FOREIGN PATENT DOCUMENTS

| | | |
|---|---|---|
| JP | H11224222 A | 8/1999 |
| JP | 2001306173 A | 11/2001 |
| JP | 2004199322 A | 7/2004 |
| JP | 2006343875 A | 12/2006 |
| JP | 2007128259 A | 5/2007 |
| JP | 2011238258 A | 11/2011 |
| JP | 2011242834 A | 12/2011 |
| JP | 2012083917 A | 4/2012 |
| JP | 2012133787 A | 7/2012 |
| JP | 2013045470 A | 3/2013 |
| JP | 2013131164 A | 7/2013 |
| JP | 2013540321 A | 10/2013 |
| JP | 2015203924 A | 11/2015 |

* cited by examiner

GENERATING OR CHANGING PASSWORDS USING A DEGREE OF SIMPLICITY

CROSS-REFERENCE TO RELATED APPLICATION(S)

This application claims the benefit of priority to Japanese Patent Application No. 2014-082087, filed Apr. 11, 2014, the contents of which are incorporated herein by reference.

TECHNICAL FIELD

The present invention relates to a technique for generating or changing passwords. The present invention relates more specifically to a technique able to generate passwords that are simpler than the default password established for an electronic device, or change these generated passwords.

BACKGROUND ART

With the proliferation of mobile devices such as smartphones, mobile phones, and tablets in recent years, the opportunities to use these mobile devices in public places such as inside trains has increased.

Mobile devices are small and easily lost. A password (or passcode) is usually set in order to lock the screen of mobile devices. In order to provide greater password security, these passwords are usually long (a combination of six or more alphanumeric characters).

The user of a mobile device can use all of the functions once the mobile device has been unlocked using this password.

In recent years, employees have been bringing their personal information terminals to work and using them to conduct company business as part of a policy known as "bring your own device" or BYOD. With the introduction of BYOD, employees do not have to possess multiple devices and can use a device with which they are already familiar. However, certain functions used at the workplace and websites that can be accessed at the workplace have to be restricted, and access to company data outside of the office must be limited. Therefore, in order to provide greater password security in BYOD devices, these passwords are usually long (for example, a combination of six or more alphanumeric characters).

Patent Literature 1 describes a method for providing simple access control to various resources in electronic file devices used to handle shared files using a user-friendly interface establishing a positional relationship between icons and windows (paragraph 0010).

Patent Literature 2 describes a mobile terminal which includes a screen unlocking means that unlocks the terminal touch screen when a particular operation is performed using contact information icons (paragraph 0012).

Patent Literature 3 describes a method for unlocking a device with a touch screen display which includes the following steps: sensing touch screen input; determining whether or not the input is a request to unlock the device; determining whether or not the input is related to a device function; unlocking the device when the input is a request to unlock the device; and loading an application related to the input when the input is related to a device function (claim 1).

Patent Literature 4 describes a method executed by a computer which includes the steps of: receiving selection input including one or more gestures on the touch screen of a computing device; responding to the selection input by selecting a first lock screen pane among a plurality of lock screen panes in a user interface with lock screens for multiple access levels, each lock window pane being associated with a different access level, and each access level corresponding to a different function in the computing device; and responding to the selection by displaying the first lock screen pane (claim 1).

Patent Literature 5 describes a user verification device including an access granting means which grants access in response to an evaluation of password weakness (claim 1).

Patent Literature 6 describes a control program for controlling the executability of a processing request when an ID and predetermined authorization information related to the ID have been entered into a computer, and the processing in the processing request is processing permitted under the authorization information (claim 1).

Patent Literature 7 describes a verification program for logging into a system on the basis of identification information and password information, the verification program executing in a computer a receiving means for receiving identification information and password information, a retrieval means for retrieving authorization information corresponding to the password from the identification information and password information, and an output means for outputting the identification information and authorization information (claim 1).

Patent Literature 8 describes an information processing device including an input means for inputting a password, a password storing means for storing a plurality of passwords, a usage status detecting means for detecting usage status, a password selecting means for selecting a password corresponding to the usage status detected by the usage status detecting means from among the plurality of passwords stored in the password storing means, a password comparing means for comparing the password inputted using the input means to the password selected by the password selecting means, and a user verifying means for verifying an authorized user when the comparison results from the password comparing means match (claim 1).

Patent Literature 9 describes an information processing device with a locking function that restricts user operations in which the information processing device includes a lock setting unit which shifts the information processing device into the locked state when a user operation has not been inputted over a predetermined period of time, an unlocking unit which unlocks the device in response to the input of a predetermined first password, and a changing means for changing the number of characters that have to be inputted from the first password to unlock the device in response to the usage status of the information processing device (claim 1).

Patent Literature 10 describes a technique for displaying information related to the complexity of a user-registered password in a manner recognizable to the user (paragraph 0001).

CITED LITERATURE

Patent Literature

Patent Literature 1 Laid-Open Patent Publication No. 11-224222
Patent Literature 2 Laid-Open Patent Publication No. 2012-133787
Patent Literature 3 Laid-Open Patent Publication No. 2013-45470
Patent Literature 4 Translation of PCT Application No. 2013-540321

Patent Literature 5 Laid-Open Patent Publication No. 2011-242834

Patent Literature 6 Laid-Open Patent Publication No. 2011-238258

Patent Literature 7 Laid-Open Patent Publication No. 2007-128259

Patent Literature 8 Laid-Open Patent Publication No. 2001-306173

Patent Literature 9 Laid-Open Patent Publication No. 2013-131164

Patent Literature 10 Laid-Open Patent Publication No. 2012-083917

SUMMARY OF INVENTION

Technical Problems

It is cumbersome to have to enter a long password each time an application program (app) with a low security level is used. Entering a long password also needlessly makes a device more difficult to use.

In public places, such as inside trains and airplanes, and in certain situations (for example, at conferences, seminars and client meetings outside the company), the entering of passwords is not advised in order to prevent third parties from stealing passwords (especially, passwords providing access to highly confidential objects).

In public places and in certain situations, objects with a high security level (such as certain types of data) should not even be viewed.

When multiple users share an electronic device in which an operating system designed for touch panel operations using icons has been installed, such as Windows 8 (registered trademark) from Microsoft (registered trademark), the length of passwords (that is, the degree of simplicity) can be changed depending on user authorization in order to make the electronic device easier to use.

When multiple users share such an electronic device, applications that can be used and objects that can be accessed are preferably restricted depending on user authorization.

Therefore, it is an object of the present invention to provide passwords that make it easier for users to use application programs with a low security level and objects (application programs or content) that can be used with these application programs (especially application programs with a low security level).

It is another object of the present invention to provide a technique for generating new passwords that make it easier for users to use application programs with a low security level and objects (application programs or content) that can be used with these application programs (especially application programs with a low security level), and to restrict access to some or all functions in application programs used to handle objects with a high security level or to the use of highly confidential objects on the basis of these passwords.

Solution to Problems

The present invention provides a technique for generating or changing passwords. This technique may encompass a method for generating or changing these passwords, as well as a computer, computer program, and computer program product for generating or changing these passwords.
(First Aspect of the Invention)
A first aspect of the present invention is a method for generating a password, in which an electronic device executes a method including the steps of: displaying objects, the displayed objects being primary objects, secondary objects available to the first objects, or a combination thereof; enabling a degree of simplicity to be set for a password, the enabling step also including a step of superimposing and displaying a secondary object icon for at least one secondary object available to a primary object on top of the primary object icon for the primary object, the superimposing step also including either a step of superimposing and displaying a display on the superimposed secondary object icon to indicate whether or not the superimposed secondary object is available on the basis of the degree of simplicity, or a step of changing the superimposed secondary object icon so as to differentiate the availability of the superimposed secondary object on the basis of the degree of simplicity; and generating a password in accordance with the established degree of simplicity.
(Example of Slider Bar)
In an embodiment of the present invention, the step of enabling a degree of simplicity to be set for a password may further include a step of displaying a degree of simplicity setting display to enable the degree of simplicity for the password to be changed.
(Example of Changing Degree of Simplicity by Sliding Slider Bar)
In an embodiment of the present invention, the electronic device may also execute, in response to the degree of simplicity established in the degree of simplicity setting display, a step of dynamically changing either the display indicating whether or not the superimposed secondary object is available on the basis of the degree of simplicity, or the display indicating whether or not the primary object is available on the basis of the degree of simplicity; or dynamically changing the superimposed secondary object icon so as to differentiate the availability of the superimposed secondary object on the basis of the degree of simplicity, or the primary object icon so as to differentiate the availability of the primary object on the basis of the degree of simplicity.
(Another Example of Changing Degree of Simplicity by Sliding Slider Bar)
In an embodiment of the present invention, the electronic device may also execute the steps of: detecting a changed degree of simplicity for a password; dynamically changing, in response to the detected degree of simplicity, either the display indicating whether or not the superimposed secondary object is available on the basis of the degree of simplicity, or the display indicating whether or not the primary object is available on the basis of the degree of simplicity; or dynamically changing the superimposed secondary object icon so as to differentiate the availability of the superimposed secondary object on the basis of the degree of simplicity, or the primary object icon so as to differentiate the availability of the primary object on the basis of the degree of simplicity; and changing the generated password to a password in accordance with the changed degree of simplicity.
(Drag-and-Drop Example: Recalculating Degree of Simplicity)
In an embodiment of the present invention, the step of enabling a degree of simplicity to be set for a password may also include a step of calculating the degree of simplicity so as to enable a moved secondary object to be available in response to a secondary object icon having been moved onto a primary object icon.
(Drag-and-Drop Example: Changing Display)
In an embodiment of the present invention, the method also includes the step of dynamically changing, in response to a secondary object icon having been moved onto a primary object icon, either the display indicating whether or not the superimposed secondary object is available on the basis of the degree of simplicity, or the superimposed secondary object icon so as to differentiate the availability of the superimposed secondary object on the basis of the degree of simplicity.

(Drag-and-Drop Example: Security Level)

In an embodiment of the present invention, the step of calculating the degree of simplicity also includes the step of calculating the degree of simplicity so the security level associated with the moved secondary object satisfies the security level associated with the established degree of simplicity.

(Checkbox Example: Recalculating Degree of Simplicity)

In an embodiment of the present invention, the step of enabling a degree of simplicity to be set for a password may also include a step of calculating the degree of simplicity so as to make a selected or changed secondary or primary object available in response to the object icon of a secondary or primary object unavailable on the basis of the established degree of simplicity having been selected, or in response to a display on an icon indicating whether or not an unavailable secondary or primary object is available on the basis of the established degree of simplicity having been changed to available on the basis of the degree of simplicity.

(Checkbox Example: Changing Display)

In an embodiment of the present invention, the step of calculating the degree of simplicity may also include the step of calculating the degree of simplicity so the security level associated with the selected or changed secondary or primary object or a security level calculated using a combination thereof satisfies the security level associated with the established degree of simplicity.

(Checkbox Example: Display)

In an embodiment of the present invention, the display indicating availability on the basis of the degree of simplicity may be a checkbox, the display indicating that the superimposed secondary object is available on the basis of the degree of simplicity may be the checkbox having been turned on, and the display indicating that the superimposed secondary object is not available on the basis of the degree of simplicity may be the checkbox having been turned off.

(Changing Color of Displayed Icon)

In an embodiment of the present invention, the step of changing the superimposed secondary object icon so as to differentiate the availability of the superimposed secondary object on the basis of the degree of simplicity may also include the step of changing the color of the superimposed secondary object icon.

(Icon-on-Icon-on-Icon)

In an embodiment of the present invention, the electronic device may also execute the step of superimposing and displaying a tertiary object icon for at least one tertiary object available to a secondary object on top of an expanded secondary object icon in response to the expanded display of the secondary object icon.

(Access Groups and Security Level)

In an embodiment of the present invention, the primary objects or secondary objects available on the basis of an established degree of simplicity, or a combination thereof, may form an access group, and the security level associated with the primary objects belonging to the access group, the security level associated with the secondary objects belonging to the access group, or a security level calculated on the basis of a combination thereof may satisfy the security level associated with the established degree of simplicity.

(Generation of Multiple Simple Passwords)

In an embodiment of the present invention, the step of generating a password in accordance with the established degree of simplicity may also include the step of generating a plurality of passwords, the plurality of passwords being generated so that a different access group is associated with each of the plurality of passwords.

(Input of Full Password)

In an embodiment of the present invention, the step of enabling a degree of simplicity to be set for a password enables a degree of simplicity to be set in response to a primary password having been entered and verified, and the password has a lower security level than the primary password.

(Second Aspect of the Invention)

A second aspect of the present invention is an electronic device able to set passwords, in which the electronic device includes: a display means for displaying objects, the displayed objects being primary objects, secondary objects available to the first objects, or a combination thereof; a degree of simplicity setting means for setting the degree of simplicity for a password; and a password generating means for generating a password in accordance with the established degree of simplicity; the display means superimposing and displaying a secondary object icon for at least one secondary object available to a primary object on top of the primary object icon for the primary object, superimposing and displaying a display on the superimposed secondary object icon to indicate whether or not the superimposed secondary object is available on the basis of the degree of simplicity, and changing and displaying the superimposed secondary object icon so as to differentiate the availability of the superimposed secondary object on the basis of the degree of simplicity.

In an embodiment of the present invention, the display means may display a degree of simplicity setting display to enable the degree of simplicity for the password to be changed. Therefore, setting the degree of simplicity for a password can be performed using a degree of simplicity setting display which enables the degree of simplicity for the password to be changed.

In an embodiment of the present invention, the display means, in response to the degree of simplicity established in the degree of simplicity setting display, may dynamically change either the display indicating whether or not the superimposed secondary object is available on the basis of the degree of simplicity, or the display indicating whether or not the primary object is available on the basis of the degree of simplicity; or dynamically change the superimposed secondary object icon so as to differentiate the availability of the superimposed secondary object on the basis of the degree of simplicity, or the primary object icon so as to differentiate the availability of the primary object on the basis of the degree of simplicity.

In an embodiment of the present invention, the electronic device may also include a detecting means for detecting a changed degree of simplicity for a password, and the display means may dynamically change, in response to the detected degree of simplicity, either the display indicating whether or not the superimposed secondary object is available on the basis of the degree of simplicity, or the display indicating whether or not the primary object is available on the basis of the degree of simplicity; or dynamically change the superimposed secondary object icon so as to differentiate the availability of the superimposed secondary object on the basis of the degree of simplicity, or the primary object icon so as to differentiate the availability of the primary object on the basis of the degree of simplicity; and the password generating means may change the generated password to a password in accordance with the changed degree of simplicity.

In an embodiment of the present invention, the degree of simplicity setting means may calculate the degree of simplicity so as to enable a moved secondary object to be available in response to a secondary object icon having been moved onto a primary object icon.

In an embodiment of the present invention, the display means may dynamically change, in response to a secondary object icon having been moved onto a primary object icon, either the display indicating whether or not the superimposed secondary object is available on the basis of the degree of simplicity, or the superimposed secondary object icon so as to differentiate the availability of the superimposed secondary object on the basis of the degree of simplicity.

In an embodiment of the present invention, the degree of simplicity setting means may also calculate the degree of simplicity so the security level associated with the moved secondary object satisfies the security level associated with the established degree of simplicity.

In an embodiment of the present invention, the degree of simplicity setting means may also calculate the degree of simplicity so as to make a selected or changed secondary or primary object available in response to the object icon of a secondary or primary object unavailable on the basis of the established degree of simplicity having been selected, or in response to a display on an icon indicating whether or not an unavailable secondary or primary object is available on the basis of the established degree of simplicity having been changed to available on the basis of the degree of simplicity.

In an embodiment of the present invention, the degree of simplicity setting means may also calculate the degree of simplicity so the security level associated with the selected or changed secondary or primary object or a security level calculated using a combination thereof satisfies the security level associated with the established degree of simplicity.

In an embodiment of the present invention, the display indicating availability on the basis of the degree of simplicity may be a checkbox, the display indicating that the superimposed secondary object is available on the basis of the degree of simplicity may be the checkbox having been turned on, and the display indicating that the superimposed secondary object is not available on the basis of the degree of simplicity may be the checkbox having been turned off.

In an embodiment of the present invention, the superimposed secondary object icon is changed so as to differentiate the availability of the superimposed secondary object on the basis of the degree of simplicity, and this may include changing the color of the superimposed secondary object icon.

In an embodiment of the present invention, the display means may also superimpose and display a tertiary object icon for at least one tertiary object available to a secondary object on top of an expanded secondary object icon in response to the expanded display of the secondary object icon.

In an embodiment of the present invention, the primary objects or secondary objects available on the basis of an established degree of simplicity, or a combination thereof, may form an access group, and the security level associated with the primary objects belonging to the access group, the security level associated with the secondary objects belonging to the access group, or a security level calculated on the basis of a combination thereof may satisfy the security level associated with the established degree of simplicity.

In an embodiment of the present invention, the password generating means may generate a plurality of passwords. Here, the plurality of passwords are generated so that a different access group is associated with each of the plurality of generated passwords.

In an embodiment of the present invention, the password generating means may generate a password in response to a primary password having been entered and verified, and the password has a lower security level than the primary password.

(Third Aspect of the Invention)

A third aspect of the present invention is a program for an electronic device or a program product for an electronic device in which the program for an electronic device or program product for an electronic device executes each step of the method described above in an electronic device to set a password. When the electronic device is a user terminal, the program for the electronic device may be a program for a user terminal.

A program for an electronic device according to an embodiment of the present invention can be stored on any electronic device-readable recording medium, including a flexible disk, MO, CD-ROM, DVD, BD, hard disk device, USB memory, ROM, MRAM or RAM. The electronic device program can also be downloaded from another electronic device, such as a server, connected to a communication network for storage on a recording medium, or can be copied from another recording medium. A program for an electronic device according to an embodiment of the present invention can also be compressed, divided into a plurality of programs, and recorded on one or more recording media. A program product for an electronic device according to an embodiment of the present invention can take a variety of forms. The program product for an electronic device can include, for example, the recording medium on which the program for an electronic device is stored or a transmission medium over which the program for an electronic device is transmitted.

The summary of the present invention provided above is not intended to enumerate all of the required features of the present invention, and it is to be understood that the present invention includes all combinations and sub-combinations of these constituent elements.

It should also be clear that a person of skill in the art could conceive of various changes such as combining a plurality of machines and allocating functions to these machines to embody the hardware configurational elements of the information processing device used in an embodiment of the present invention. These changes are encompassed within the concept of the present invention. However, these configurational elements are for illustrative purposes only, and all of the configurational elements are not essential configurational elements of the present invention.

Also, the present invention can be realized by hardware, software, or a combination of hardware and software. When the present invention is executed by a combination of hardware and software, it is typically executed by a device in which the program for an electronic device has been installed. Here, the program for an electronic device is downloaded to the memory of the device and executed. The program for an electronic device then controls the device and executes the processing of the present invention. This program for an electronic device can be configured from groups of instructions expressed in any language, code or notation. The device can execute the specific functions in the group of instructions immediately, or after (1) converting the group of instructions into another language, code or notation, and/or (2) copying the group of instructions to another medium.

Effect of the Invention

By setting the degree of simplicity for a password in accordance with an embodiment of the present invention, objects with a low security level (such as an application program or content) can be accessed by entering a simple password generated in accordance with the degree of simplicity (such as a short password or an easy-to-remember password). This makes the device easier to use.

By specifying and confirming the object to be used on a graphical user interface in accordance with an embodiment of the present invention, the user can access a particular object (such as an object with a high security level) without having to know the security level, and a simple password can be automatically generated in accordance with the security level of the particular object.

By setting the degree of simplicity for a password in accordance with an embodiment of the present invention, particular objects (such as objects with a high security level) are rendered unavailable in accordance with the degree of simplicity of the password. This improves security for certain objects.

Simple passwords with different security levels can be generated in accordance with an embodiment of the present invention. Therefore, by selectively assigning simple passwords with different security levels to each user, users with different authorization, and groups, access to specific objects can be established for each user, users with different authorization, and groups.

DESCRIPTION OF EMBODIMENT

Figure 1A:
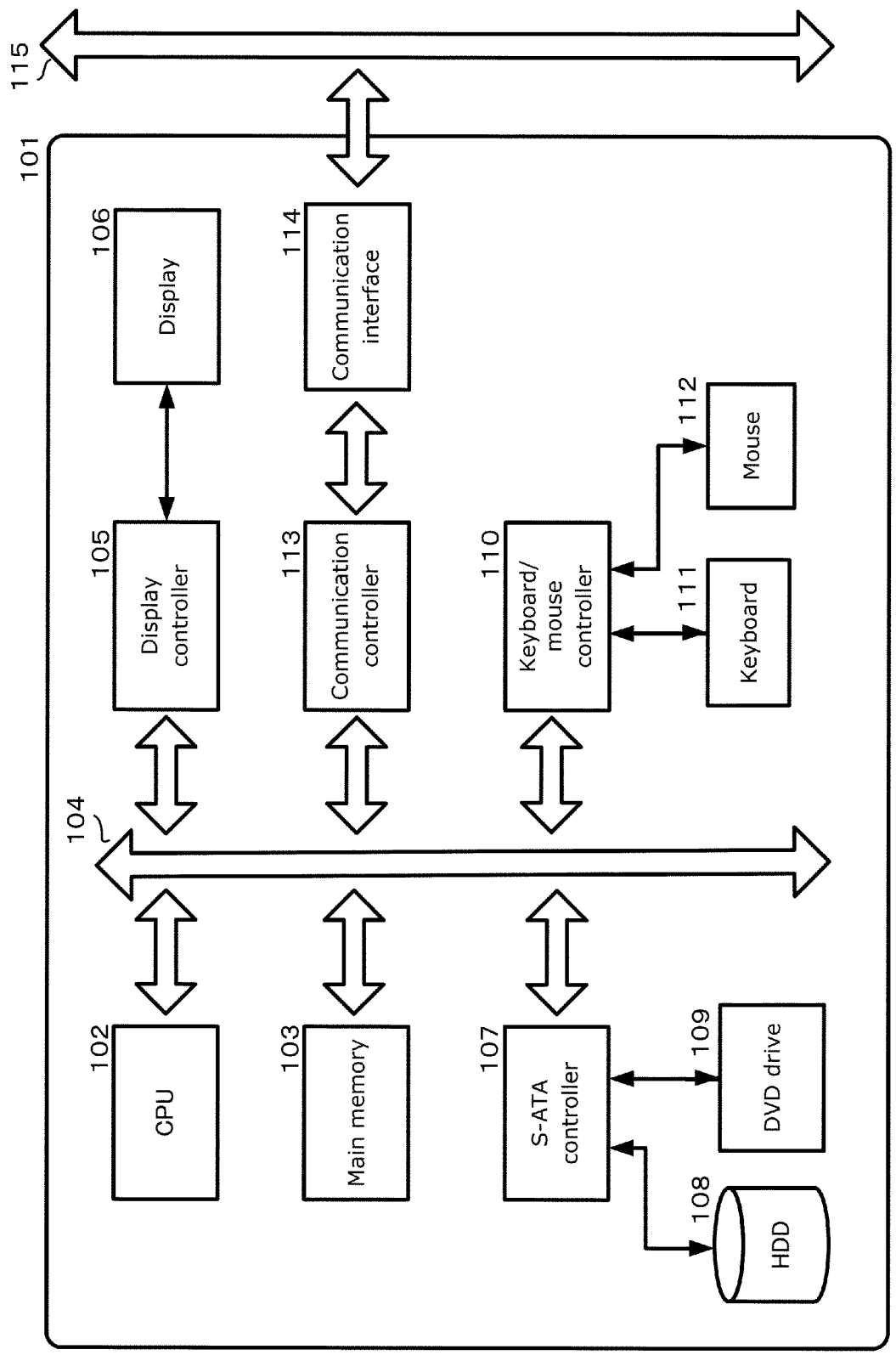
FIG. 1A is a diagram showing an example of an electronic device that can be used in an embodiment of the present invention.

The following is an explanation of an embodiment of the present invention with reference to the drawings. In the drawings described below, the same reference signs are used to denote the same elements unless otherwise noted. It should be understood that the embodiment of the present invention is used to explain a preferred embodiment of the present invention and that there is no intention to limit the scope of the present invention to the embodiment shown herein.

Figure 1B:
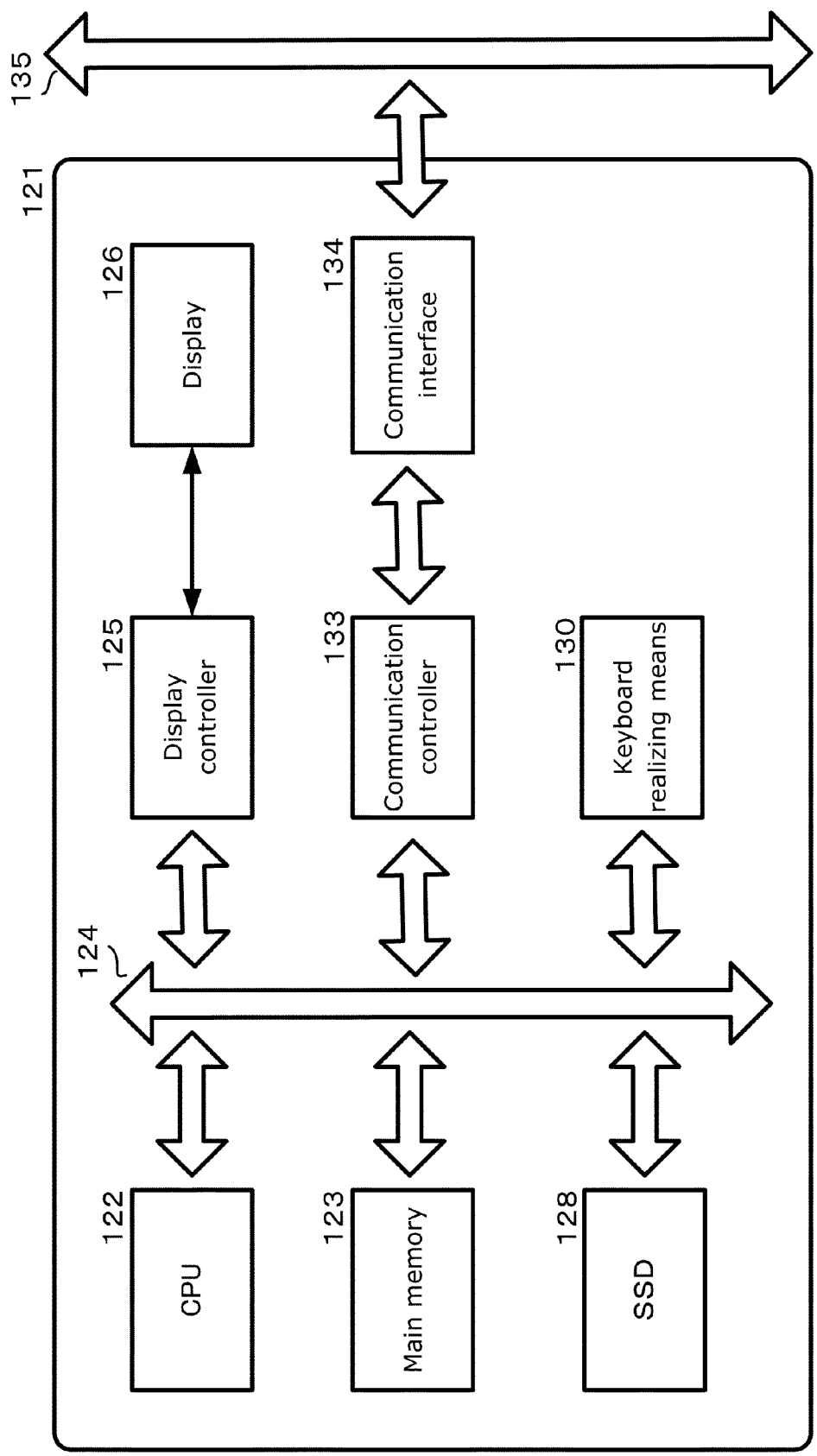
FIG. 1B is a diagram showing an example of an electronic device that can be used in an embodiment of the present invention.

FIG. 1A and FIG. 1B are diagrams showing examples of electronic device that can be used in an embodiment of the present invention. The electronic device may be a computer (desktop computer, notebook computer, all-in-one computer, or server), or a tablet, smartphone, or gaming device. However, the electronic device is not limited to these examples.

FIG. 1A is a diagram showing an example of an electronic device, such as a computer, that can be used in an embodiment of the present invention.

This electronic device (101) includes a central processing unit (CPU) (102) and a main memory (103), and these are connected to a bus (104). The CPU (102) is preferably based on a 32-bit or 64-bit architecture. Examples of CPUs (102) include the Core i (trademark) series, Core 2 (trademark) series, Atom (trademark) series, Xeon (registered trademark) series, Pentium (registered trademark) series or Celeron (registered trademark) series from Intel Corporation, the A Series (trademark), the Phenom (trademark) series, Athlon (trademark) series, Turion (registered trademark) series or Sempron (trademark) from Advanced Micro Devices, or the Power (trademark) series from International Business Machines Incorporated.

A display (106) such as a liquid crystal display (LCD) may be connected to the bus (104) via a display controller (105). The liquid crystal display (LCD) may be a touch panel display or a floating touch display. The display (106) may be used to display objects using the appropriate graphics interface by working with software running on the electronic device (101) (for example, a program for an electronic device according to an embodiment of the present invention) or another type of program for an electronic device (such as another type of computer program) running on the electronic device (101). The display (106) may also, for example, output a screen for a web browser application.

A disk (108), such as a hard disk or solid state drive (SSD), may be connected to the bus (104) via a SATA or IDE controller (107).

A drive (109) such as a CD, DVD or BD drive, may also be connected to the bus (104) via a SATA or IDE controller (107).

A keyboard (111) and mouse (112) may be optionally connected to the bus (104) via a peripheral device controller (110), such as a keyboard/mouse controller, or a USB bus.

Programs, including an operating system such as Windows (registered trademark), UNIX(registered trademark), or MacOS (registered trademark), Android (registered trademark), Java (registered trademark) programming environments such as J2EE, Java (registered trademark) applications, Java (registered trademark) virtual machines (VM), and Java (registered trademark) just-in-time (JIT) compilers, as well as a program for an electronic device according to the embodiment of the present invention, and other programs and data, are stored on the disk (108) for download to the main memory (103).

The disk (108) may be built into the electronic device (101), connected via cable so as to be accessible to the electronic device (101), or connected via a wired or wireless network so as to be accessible to the electronic device (101).

If necessary, a drive (109) may be used to install programs such as the operating system, applications or a program for an electronic device according to an embodiment of the present invention on the disk (108) from a CD-ROM, DVD-ROM or BD.

The communication interface (114) can use, for example, the Ethernet (registered trademark) protocol. The communication interface (114) is connected to a bus (104) via a communication controller (113), and functions to physically connect the electronic device (101) to the communication network (115). This provides a network interface layer for the TCP/IP communication protocol in the communication function of the operating system of the electronic device (101). The communication line can be in a wireless LAN environment based on wireless LAN connection standards, in a Wi-Fi wireless LAN environment such as IEEE 802.11a/b/g/n, or in a mobile phone network environment (for example, a 3G or 4G environment).

FIG. 1B is a diagram showing an example of an electronic device that can be used in an embodiment of the present invention, such as a tablet, smartphone, mobile phone, or gaming device.

The CPU (122), main memory (123), bus (124), display controller (125), display (126), SSD (128), communication controller (133), communication interface (134), and communication line (135) in the electronic device (121) shown in FIG. 1B correspond to the CPU (102), main memory (103), bus (104), display controller (105), display (106), SSD (108), communication controller (113), communication interface (114), and communication line (115) in the electronic device (101) shown in FIG. 1A.

When the electronic device (121) is a smartphone, mobile phone, or tablet, the CPU (122) can be any CPU commonly used in a tablet, smartphone, or mobile phone, or an A series (registered trademark) model from Apple, Inc.

The smartphone OS (for example, Android (registered trademark), Windows (registered trademark) or Windows (registered trademark) Phone, or iOS) may be stored on an SSD (128) disk along with the application program of the present invention, and other programs and data for loading into the main memory (123).

The keyboard realizing means (130) may be an application used to display a software keyboard on the display (126).

Figure 2:
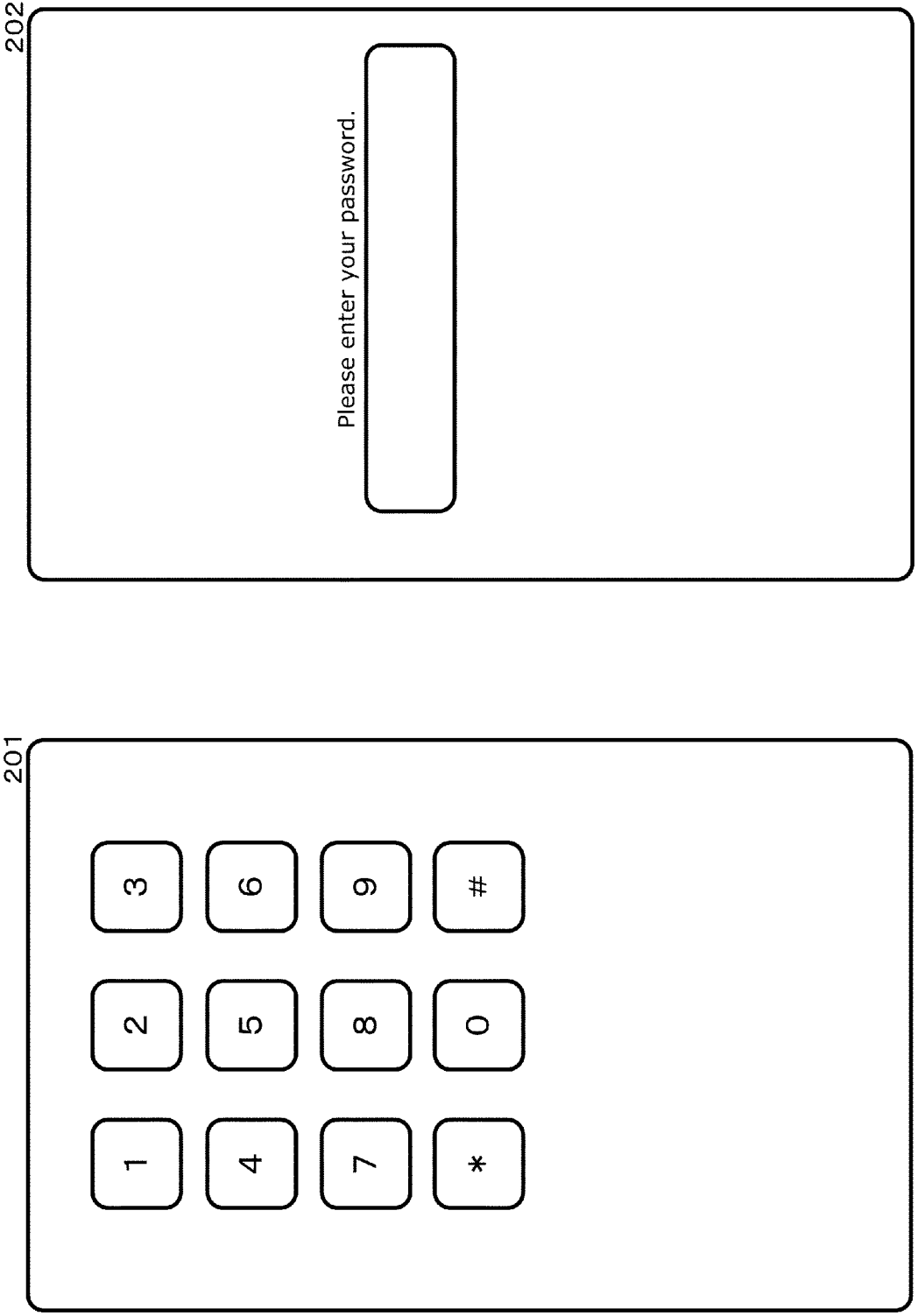
FIG. 2 shows examples of screens according to the prior art which are used to enter a full password for unlocking an electronic device and enabling full use of all functions.

FIG. 2 shows examples of screens according to the prior art which are used to enter a full password for unlocking an electronic device and enabling full use of all functions. (In the present specification, a full password refers to the usual password in order to distinguish it from the simple passwords generated in accordance with the present invention.)

The electronic device displays a password input screen (201) which allows the user to access objects available on the device (for example, applications, and data and other applications available to these applications). The password input screen (201) may include a series of numbers, characters, symbols, or a combination thereof. When a password has been entered using a keyboard or touchscreen, and the password has been verified by the electronic device, the password input screen transitions to a screen displaying the objects available to the electronic device (for example, a desktop screen or a start screen). The user can use this screen to gain access to any one of the objects.

Alternatively, the electronic device may display password input screen (202) which allows the user to access objects available on the device (for example, applications, and data and other applications available to these applications). The password input screen (202) may include a window enabling a character string of numbers, characters, symbols, or a combination thereof, to be inputted. When a password has been entered using a keyboard or touchscreen, and the password has been verified by the electronic device, the password input screen transitions to a screen displaying the objects available to the electronic device (for example, a desktop screen or a start screen). The user can use this screen to gain access to any one of the objects.

Alternatively, the electronic device may receive a password inputted using voice recognition which allows the user to access objects available on the device (for example, applications, and data and other applications available to these applications). When a password has been entered using a keyboard or touchscreen, and the password has been verified by the electronic device, a locked screen transitions to a screen displaying the objects available to the electronic device (for example, a desktop screen or a start screen). The user can use this screen to gain access to any one of the objects.

The usual password is typically a long password (including, but not limited to, six or more alphanumeric characters) in order to provide greater password security.

FIG. 3A through FIG. 3E, FIG. 5A through FIG. 5B, and FIG. 7A through FIG. 7C show examples of passwords simpler than the usual password (referred to below as simple passwords) which have been generated in accordance with an embodiment of the present invention.

FIG. 4A through FIG. 4B and FIG. 6A through FIG. 6B show examples of logins (unlocking operations) performed using simple passwords generated in accordance with an embodiment of the present invention.

The electronic device referred to below may be the electronic device (101) shown in FIG. 1A or the electronic device (121) shown in FIG. 1B.

In an embodiment of the present invention, the simple password may have fewer characters than the usual password, may have the same number of characters as the usual password but be easier to remember, or may be a particular operation that is performed instead of entering a character string. The simple passwords described below are merely examples, and the simple passwords of the present invention are not limited to them.

A simple password may have one of the following characteristics in comparison to the usual password.

(1) The simple password is a phrase that is shorter than the usual password. For example, the simple password may be a single numeral (for example, any numeral between 1 and 9), a single letter (for example, any letter between A and Z), a single hiragana character (for example, any hiragana character between あ and ん), a single katakana character (for example, any katakana character between ア and ン), a single symbol (for example, and symbol selected from among ".", "+", "−", "/" and "*"), or a combination of two to five of these characters.

(2) The simple password is a phrase that is easier to remember than the usual password. For example, the simple password may be two consecutive numerals (for example, "12"), two consecutive letters (for example, "AB"), two consecutive hiragana characters (for example, "ai"), two consecutive katakana characters (for example, "AI"), two symbols (for example, "+−"), or a combination of three to five of these characters.

(3) The simple password is a phrase that is easy to utter. For example, the simple password may be a combination of a consonant and a vowel that is easy to utter in the English language, such as "PA" or "DA", or a combination of two hiragana characters that is easy to utter in the Japanese language, such as "an" or "ao".

(4) The simple password is a sequence of keys as long as or longer than the usual password but is easier to perform. For example, the simple password may be a series of keys that are arranged consecutively on a keyboard in the horizontal or vertical direction such as "12345" or "ASDFG".

(5) The simple password is as long as or longer than the usual password but is easier to remember. For example, the simple password may be the user's date of birth, the current date, a postal code or phone number, or a portion thereof (for example, just the day, month or year of the user's birthday or the current date).

(6) The simple password is associated with the user. For example, the simple password may be the user's initials, name, gender, or a portion thereof.

(7) The simple password is a particular operation, such as an operation that is easy to perform on a touch screen. For example, the simple password may be to slide a finger to the right, or to press down on the touch screen for a predetermined amount of time (for example, 5 seconds).

(8) The simple keyword is a particular operation, such as pressing a particular key. For example, the simple password may be to press a function key (such as "F12" or "Esc").

(9) The simple keyword is a particular operation, such as uttering a particular sound. For example, the simple password may be to utter "pass".

In (1) through (6), the characters may be half-width or full-width characters.

In the embodiments of the present invention, an "object" can be (1) an application, (2) data or another application available to this application, or (3) data or another application available to the application in (2).

The application in (1) appears directly on the screen (or desktop). The application in (1) is an application that can be launched directly from the electronic device.

The application in (2) is an available application that is operated by the application in (1). The application in (2) is not an application that can be launched directly from the electronic device, but an application launched by the application in (1). Data available to the application in (2) is data that can be displayed in the application in (1), or data that can be accessed from the application in (1).

The application in (3) is an available application that is operated by the application in (2). The application in (3) is not an application that can be launched directly from the electronic device or an application launched by the application in (1), but an application launched by the application in (2). Data available to the application in (3) is data that can be displayed in the application in (2), or data that can be accessed from the application in (2).

FIG. 3A through FIG. 3D show examples of screens in embodiments of the present invention which can be used to set (or change) the degree of simplicity of a password using a degree of simplicity setting display for setting the degree of simplicity for a password, which can display a password based on the established degree of simplicity, and which can display the object icons of objects that are available on the basis of the established degree of simplicity, or can display objects that are available on the basis of the established degree of simplicity on top of the object icons of available objects.

In the present embodiments, the degree of simplicity setting display may be a slider bar or scroll bar. The degree of simplicity setting display is not limited to a slider bar or scroll bar. It can be any display that can be used to set the degree of simplicity. For example, the degree of simplicity setting display may enable the degree of simplicity to be set by selecting an O icon "O" in the display "(simple) OOOOO (complicated)".

Figure 3A:
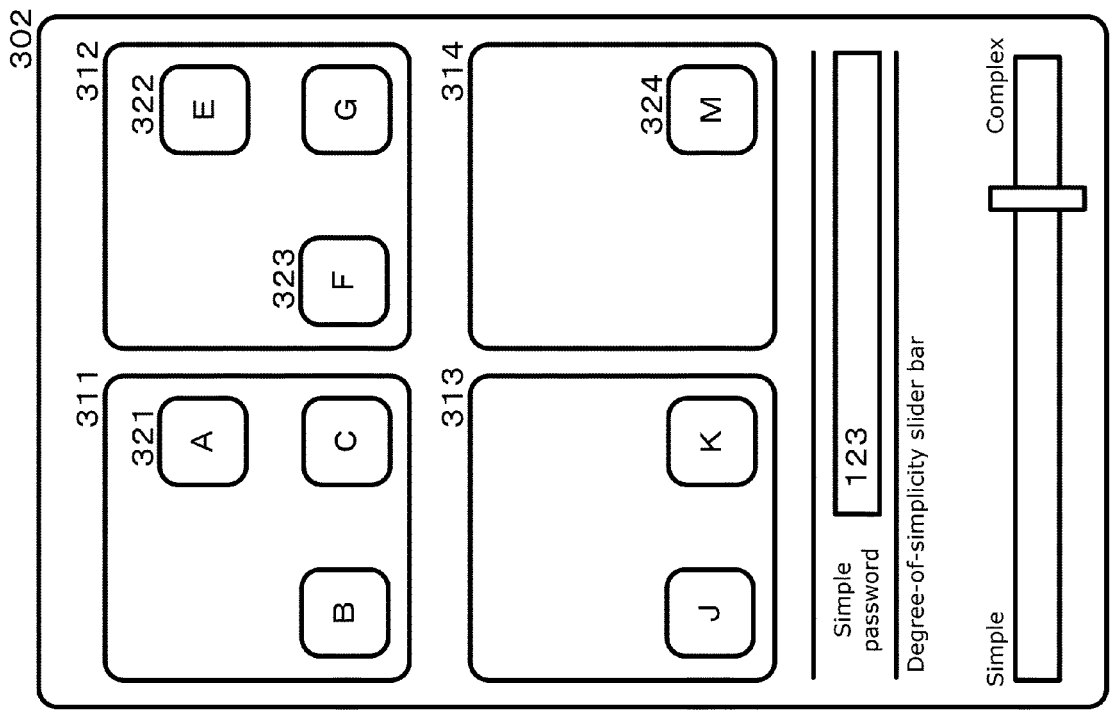
FIG. 3A shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention.
Figure 3A:
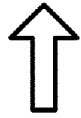
Figure 3A:
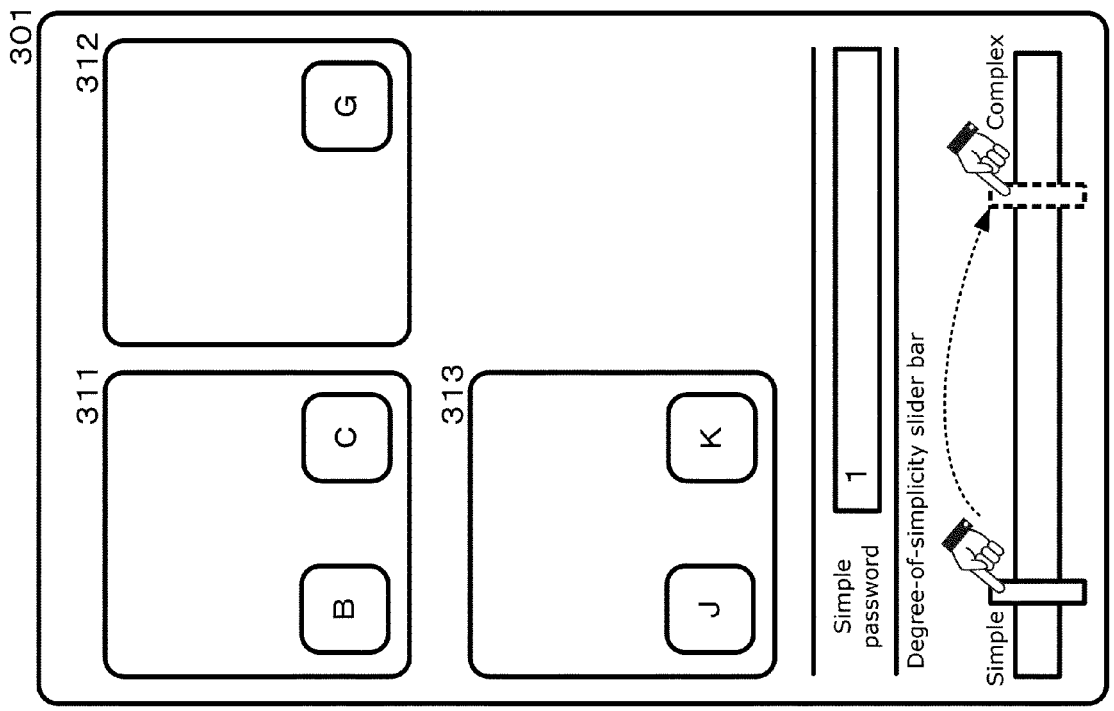

FIG. 3A shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention.

The user enters the usual password in the electronic device, and the electronic device verifies the usual password that has been entered. When verification of the password has been successful, the electronic device displays screen (301) enabling the degree of simplicity to be set for a password in response to the menu for setting the degree of simplicity for a password having been called up.

Screen (301) shows a slider bar enabling the degree of simplicity for a password to be set, a simple password generated in response to the degree of simplicity set by moving the slider bar, and object icons for objects available on the basis of the established degree of simplicity. Objects available on the basis of the established degree of simplicity are objects available to the user on the electronic device (objects that can be accessed, displayed or executed) when the simple password has been verified.

On the screen (301), the slider bar is located near "simple" for the degree of simplicity. The initial position of the slider bar on the screen (301) may be a default degree of simplicity predetermined by the user or by the electronic device program in the embodiment of the present invention, or may be the degree of simplicity previously set by the user in accordance with the electronic device program in the embodiment of the present invention.

The electronic device generates a simple password based on the degree of simplicity indicated by the position of the slider bar. On the screen (301), the simple password is a single numerical character "1" (half-width).

The screen (301) shows the object icons for three objects (311, 312, 313) available to the user on the basis of the degree of simplicity indicated by the current position of the slider bar. Because the object icons for three objects (311, 312, 313) are displayed directly on the screen, each of the three objects (311, 312, 313) (for example, applications) may be used on its own.

The screen (301) also shows the object icons for three objects (311, 312, 313) available to the user on the basis of the degree of simplicity indicated by the current position of the slider bar. Here, the screen (301) shows the object icons for objects B and C available to object (311), the object icon for object G available to object (312), and the object icons for objects J and K available to object (313). Here, object B and object C are each an object (an application or data) available to object (311). Similarly, object G is an object (an application or data) available to object (312). Similarly, object J and object K are each an object (an application or data) available to object (313).

The user slides the slider bar towards "complex" for the degree of simplicity (see the dotted arrow on screen (301)).

Screen (302) shows the screen after the slider bar has been moved.

On the screen (302), the slider bar is located near "complex" for the degree of simplicity, and the simple password corresponding to the degree of simplicity is three consecutive numerical characters "123" (half-width).

In response to the degree of simplicity established by sliding the slider bar towards "complex", the simple password ("123") generated is longer than the simple password ("1") prior to the sliding movement (but still simpler than the usual password). In other words, a longer simple password is generated by the electronic device by setting the degree of simplicity to a more complex setting. Conversely, a shorter simple password is generated by the electronic device by setting the degree of simplicity to a simpler setting.

The screen (302) also shows the object icons for four objects (311, 312, 313, 314) available to the user on the basis of the degree of simplicity indicated by the position of the slider bar.

A new object (314) is displayed on the screen among the four objects (311, 312, 313, 314) compared to the situation before the slider bar was moved. Therefore, by moving the degree of simplicity in the more complex direction using the slider bar, an additional object (314) is displayed compared to the situation before the slider bar was moved. In other words, the electronic device may display the object icons for more objects available to the user when a more complex degree of simplicity is established. Conversely, object icons for objects available at a given degree of simplicity may disappear from the screen when a simpler degree of simplicity is established.

The screen (302) also shows the object icons for objects available to the four objects (311, 312, 313, 314) on the basis of the degree of simplicity indicated by the position of the slider bar. On the screen (302), object icons for objects A, B and C available to object (311), object icons for objects E, F and G available to object (312), object icons for objects J and K available to object (313), and the object icon for object M available to object (314) are displayed.

Therefore, by moving the degree of simplicity in the more complex direction using the slider bar, new objects are available compared to the situation before the slider bar was moved, including object A (321) available to object (311), object E (322) and object F (323) available to object (312), and object M (324) available to object (314). In other words, when the degree of simplicity is set to a more complex setting, the electronic device superimposes more newly available object icons on top of the object icons for the available objects. Conversely, when the degree of simplicity is set to a simpler setting, object icons for objects no longer available at the new degree of simplicity are removed by the electronic device from the object icons on which the object icons for objects no longer available had been superimposed.

In the embodiment shown in FIG. 3A, as explained above, the electronic device, in response to the degree of simplicity having been set by moving the slider bar, generates a simple password corresponding to the degree of simplicity, displays object icons for the objects available at the current degree of simplicity on the display screen and/or on top of object icons on the display screen, and removes object icons for objects no longer available at the current degree of simplicity from the display screen and/or from object icons on the display screen.

Figure 3B:
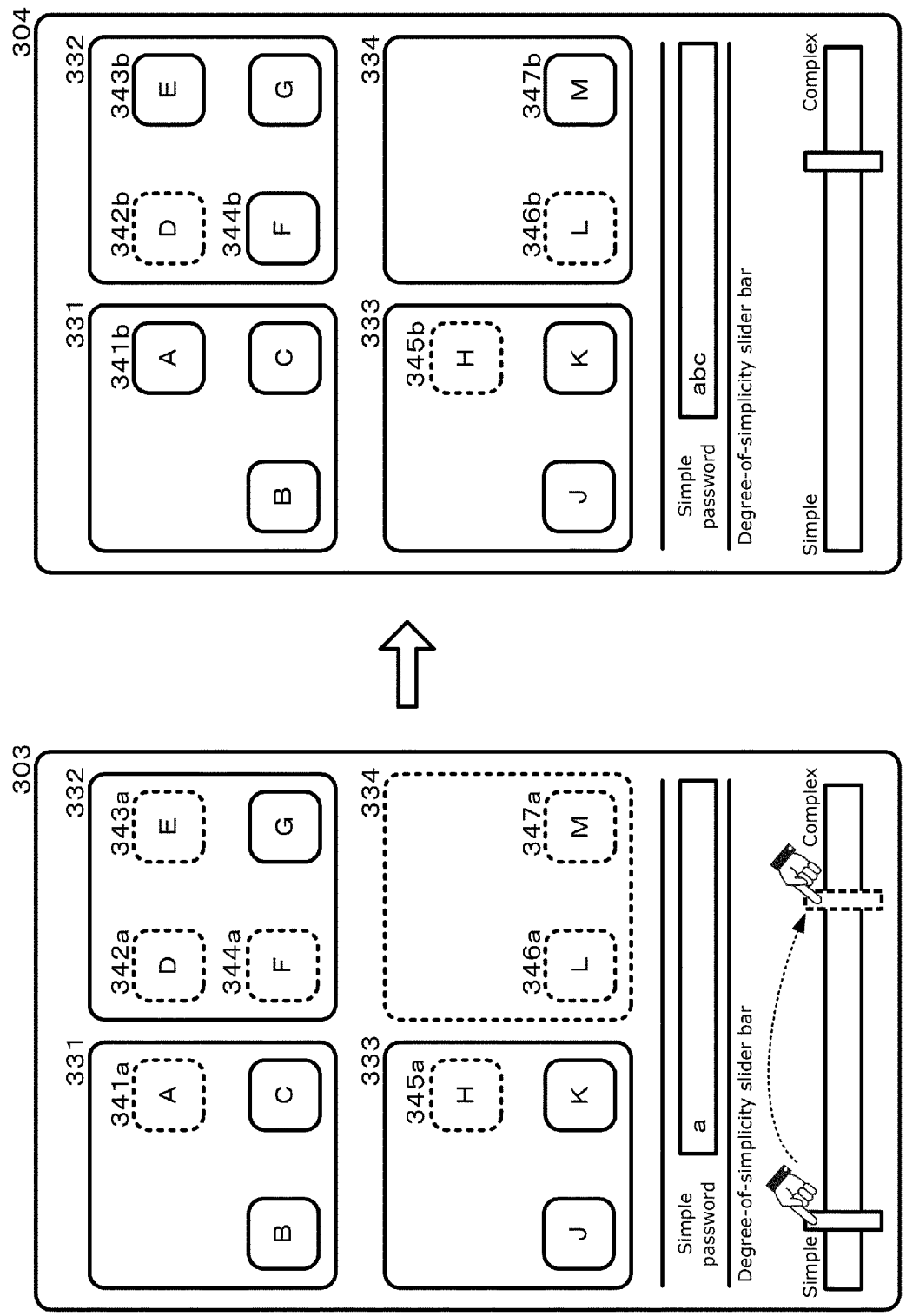
FIG. 3B shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention. Here, the object icons of objects available to the user are displayed using solid lines, and the object icons for objects not available to the user are displayed using dotted lines.

FIG. 3B shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention. Here, the object icons of objects available to the user are displayed using solid lines, and the object icons for objects not available to the user are displayed using dotted lines.

The user enters the usual password in the electronic device, and the electronic device verifies the usual password that has been entered. When verification of the password has been successful, the electronic device displays screen (303) enabling the degree of simplicity to be set for a password in response to the menu for setting the degree of simplicity for a password having been called up.

Screen (303) shows a slider bar enabling the degree of simplicity for a password to be set, a simple password generated in response to the degree of simplicity set by moving the slider bar, and object icons for objects available to the user. The objects available to the user include objects available in response to the established degree of simplicity, objects unavailable in response to the established degree of simplicity, or a combination thereof.

On the screen (303), the slider bar is located near "simple" for the degree of simplicity. The initial position of the slider bar on the screen (303) may be a default degree of simplicity predetermined by the user or by the electronic device program in the embodiment of the present invention, or may be the degree of simplicity previously set by the user in accordance with the electronic device program in the embodiment of the present invention.

The electronic device generates a simple password based on the degree of simplicity indicated by the position of the slider bar. On the screen (303), the simple password is the first letter of the alphabet "a" (half-width lower case character).

The screen (303) shows the object icons for four objects (331, 332, 333, 334) available to the user on the basis of the degree of simplicity indicated by the current position of the slider bar. Among the object icons for the four objects (331, 332, 333, 334), the object icons displayed using solid lines are for the objects (331, 332, 333) that are available at the current degree of simplicity. Among the object icons for the four objects (331, 332, 333, 334), the object icons displayed using dotted lines (342b, 345b, 346b) are for the objects that are not available at the current degree of simplicity.

The screen (303) also shows object icons for objects available to the user by means of the four objects (331, 332, 333, 334) available to the user on the basis of the degree of simplicity indicated by the current position of the slider bar. In other words, the screen (303) shows the object icons for objects A, B and C available to the user by means of object (331), the object icons for objects D, E, F and G available to the user by means of object (332), the object icons for objects H, J and K available to the user by means of object (333), and the object icons for objects L and M available to the user by means of object (334). The object icons displayed using solid lines on top of the object icon for object (331) indicate that object B and object C are available by means of object (331) at the current degree of simplicity. The object icon displayed using dotted lines on top of the object icon for object (331) indicates that object A (341a) is not available by means of object (331) at the current degree of simplicity. Similarly, the object icon displayed using solid lines on top of the object icon for object (332) indicates that object G is available by means of object (332) at the current degree of simplicity. The object icons displayed using dotted lines on top of the object icon for object (332) indicate that object D (342*a*), object E (343*a*) and object F (344*a*) are not available by means of object (332) at the current degree of simplicity. Similarly, the object icons displayed using solid lines on top of the object icon for object (333) indicate that object J and object K are available by means of object (333) at the current degree of simplicity. The object icon displayed using dotted lines on top of the object icon for object (333) indicates that object H (345*a*) is not available by means of object (333) at the current degree of simplicity. The object icons displayed using dotted lines on top of the object icon for object (334) indicate that object L (346*a*) and object M (347*a*) are not available by means of object (334) at the current degree of simplicity.

The user slides the slider bar towards "complex" for the degree of simplicity (see the dotted arrow on screen (303)).

Screen (304) shows the screen after the slider bar has been moved.

On the screen (304), the slider bar is located near "complex" for the degree of simplicity, and the simple password corresponding to the degree of simplicity is three consecutive letters "abc" (half-width lower case characters).

In response to the degree of simplicity established by sliding the slider bar towards "complex", the simple password ("abc") generated is longer than the simple password ("a") prior to the sliding movement (but still simpler than the usual password). In other words, a longer simple password is generated by the electronic device by setting the degree of simplicity to a more complex setting. Conversely, a shorter simple password is generated by the electronic device by setting the degree of simplicity to a simpler setting.

The screen (304) also shows the object icons for four objects (331, 332, 333, 334) available to the user on the basis of the degree of simplicity indicated by the position of the slider bar.

Compared to the situation prior to moving the slider bar, the object icon for object (334) among the four objects (331, 332, 333, 334) is displayed using solid lines. Therefore, by moving the degree of simplicity in the more complex direction using the slider bar, an additional object (334) is made available compared to the situation before the slider bar was moved. In other words, the electronic device may display the object icons for more objects available to the user when a more complex degree of simplicity is established. Conversely, object icons for objects available at a given degree of simplicity may disappear from the screen when a simpler degree of simplicity is established.

The screen (304) also shows object icons for objects available to the user by means of the four objects (331, 332, 333, 334) available to the user on the basis of the degree of simplicity indicated by the current position of the slider bar. The object icons displayed using solid lines on top of the object icon for object (331) indicate that object A (341*b*), object B and object C are available by means of object (331) at the current degree of simplicity. Similarly, the object icons displayed using solid lines on top of the object icon for object (332) indicate that object E (343*b*), object F (344*b*), and object G are available by means of object (332) at the current degree of simplicity. The object icon displayed using dotted lines on top of the object icon for object (332) indicates that object D (342*b*) is not available by means of object (332) at the current degree of simplicity. Similarly, the object icons displayed using solid lines on top of the object icon for object (333) indicate that object J and object K are available by means of object (333) at the current degree of simplicity. The object icon displayed using dotted lines on top of the object icon for object (333) indicates that object H (345*b*) is not available by means of object (333) at the current degree of simplicity. Similarly, the object icon displayed using solid lines on top of the object icon for object (334) indicates that object M (347*b*) is available by means of object (334) at the current degree of simplicity. The object icon displayed using dotted lines on top of the object icon for object (334) indicates that object L (346*b*) is not available by means of object (334) at the current degree of simplicity.

Therefore, by moving the degree of simplicity in the more complex direction using the slider bar, new objects are available compared to the situation before the slider bar was moved, including object A (341*b*) available to object (331), object E (343*b*) and object F (344*b*) available to object (332), object H (345*b*) available to object (333), and object M (347*b*) available to object (334). In other words, when the degree of simplicity is set to a more complex setting, the electronic device superimposes more newly available object icons on top of the object icons for the available objects. Conversely, when the degree of simplicity is set to a simpler setting, object icons for objects no longer available at the new degree of simplicity are removed by the electronic device from the object icons on which the object icons for objects no longer available had been superimposed. The solid lines and dotted lines are for illustrative purposes only. Unavailable object icons may be displayed in any manner that differentiates them from available objects.

In the embodiment shown in FIG. 3B, as explained above, the electronic device, in response to the degree of simplicity having been set by moving the slider bar, generates a simple password corresponding to the degree of simplicity, displays object icons for the objects available at the current degree of simplicity on the display screen and/or on top of object icons on the display screen using solid lines, and displays object icons for the objects unavailable at the current degree of simplicity on the display screen and/or on top of object icons on the display screen using dotted lines.

Figure 3C:
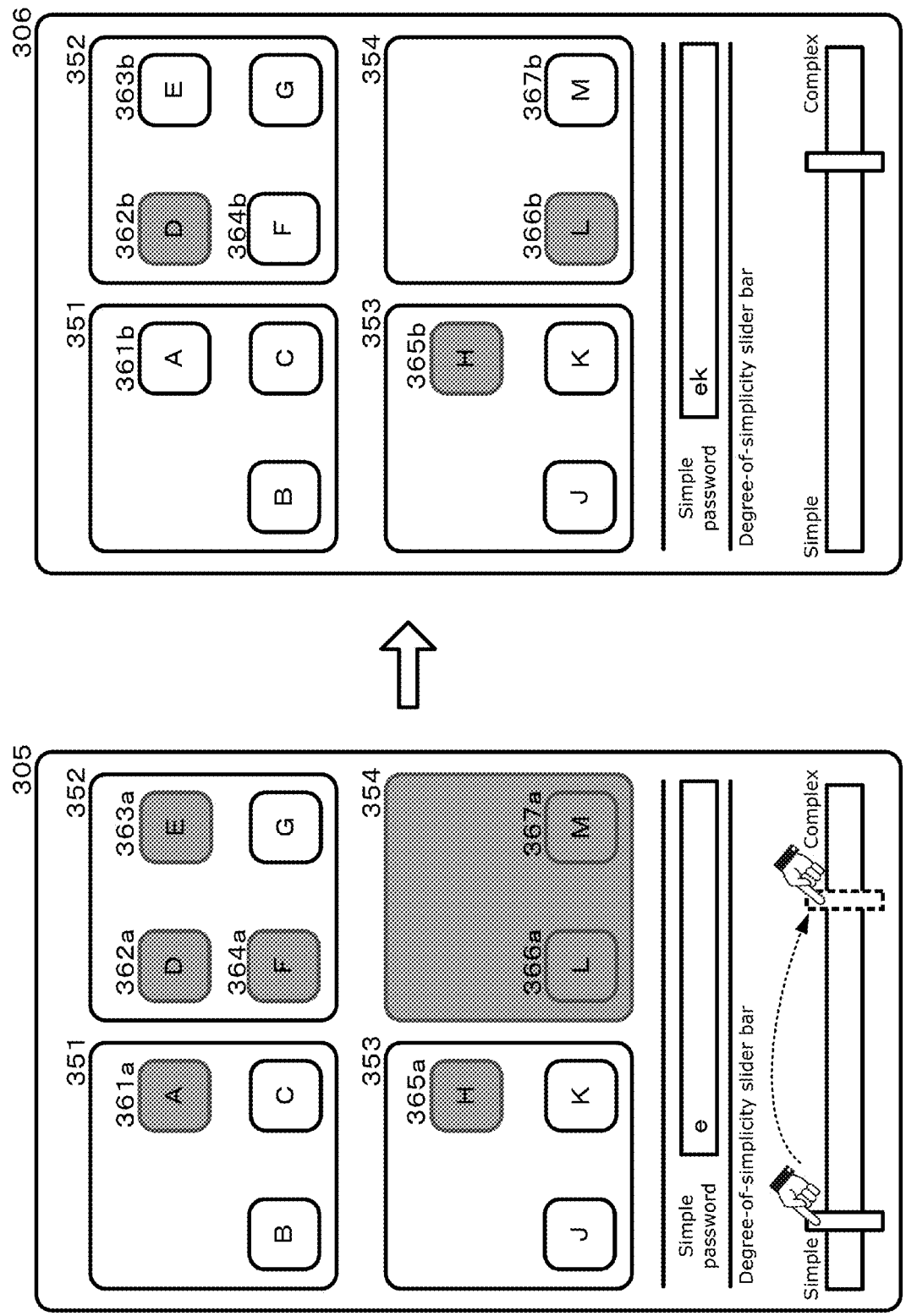
FIG. 3C shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention. Here, the object icons of objects available to the user are displayed in the original color of the icons, and the object icons for objects not available to the user are not displayed in the original color of the icons but displayed, for example, monochromatically or using shading according to an embodiment of the present invention.

FIG. 3C shows the generation of a simple password based on the degree of simplicity established in response to the user sliding a slider bar from "simple" towards "complex" to establish the degree of simplicity for a password, and shows the change in objects available to the user based on the established degree of simplicity according to an embodiment of the present invention. Here, the object icons of objects available to the user are displayed in the original color of the icons, and the object icons for objects not available to the user are not displayed in the original color of the icons but displayed, for example, monochromatically or using shading according to an embodiment of the present invention.

The user enters the usual password in the electronic device, and the electronic device verifies the usual password that has been entered. When verification of the password has been successful, the electronic device displays screen (305) enabling the degree of simplicity to be set for a password in response to the menu for setting the degree of simplicity for a password having been called up.

Screen (305) shows a slider bar enabling the degree of simplicity for a password to be set, a simple password generated in response to the degree of simplicity set by moving the slider bar, and object icons for objects available to the user.

On the screen (305), the slider bar is located near "simple" for the degree of simplicity. The initial position of the slider bar on the screen (305) may be a default degree of simplicity predetermined by the user or by the electronic device program in the embodiment of the present invention, or may be the degree of simplicity previously set by the user in accordance with the electronic device program in the embodiment of the present invention.

The electronic device generates a simple password based on the degree of simplicity indicated by the position of the slider bar. On the screen (305), the simple password is the first letter of the user's initials "e" (half-width lower case character).

The screen (305) shows the object icons for four objects (351, 352, 353, 354) available to the user on the basis of the degree of simplicity indicated by the current position of the slider bar. Among the object icons for the four objects (351, 352, 353, 354), the object icons displayed using solid lines (black, unshaded) are for the objects (351, 352, 353) that are available at the current degree of simplicity. Among the object icons for the four objects (351, 352, 353, 354), the object icons for the object displayed using solid lines (gray, shaded) is for an object (354) that is not available at the current degree of simplicity.

The screen (305) also shows object icons for objects available to the user by means of the four objects (351, 352, 353, 354) available to the user on the basis of the degree of simplicity indicated by the current position of the slider bar. In other words, the screen (305) shows the object icons for objects A, B and C available to the user by means of object (351), the object icons for objects D, E, F and G available to the user by means of object (352), the object icons for objects H, J and K available to the user by means of object (353), and the object icons for objects L and M available to the user by means of object (354). The object icons displayed using solid lines (black, unshaded) on top of the object icon for object (351) indicate that object B and object C are available by means of object (351) at the current degree of simplicity. The object icon displayed using solid lines (gray, shaded) on top of the object icon for object (351) indicates that object A (361*a*) is not available by means of object (351) at the current degree of simplicity. Similarly, the object icon displayed using solid lines (black, unshaded) on top of the object icon for object (352) indicates that object G is available by means of object (352) at the current degree of simplicity. The object icons displayed using solid lines (gray, shaded) on top of the object icon for object (352) indicate that object D (362*a*), object E (363*a*) and object F (364*a*) are not available by means of object (352) at the current degree of simplicity. Similarly, the object icons displayed using solid lines (black, unshaded) on top of the object icon for object (353) indicate that object J and object K are available by means of object (353) at the current degree of simplicity. The object icon displayed using solid lines (gray, shaded) on top of the object icon for object (353) indicates that object H (365*a*) is not available by means of object (353) at the current degree of simplicity. The object icons displayed using solid lines (gray, shaded) on top of the object icon for object (354) indicate that object L (366*a*) and object M (367*a*) are not available by means of object (354) at the current degree of simplicity.

In this example, when an object is changed from unavailable to available, the display of the object icon for the object changes from solid lines (black, unshaded) to solid lines (gray, shaded). In other examples, the object icon may be changed from monochromatic to full color, or the object icon may be enlarged. The present invention is not restricted to these examples.

The user slides the slider bar towards "complex" for the degree of simplicity (see the dotted arrow on screen (305)).

Screen (306) shows the screen after the slider bar has been moved.

On the screen (306), the slider bar is located near "complex" for the degree of simplicity, and the simple password corresponding to the degree of simplicity is the user's initials "ek" (half-width lower case characters).

In response to the degree of simplicity established by sliding the slider bar towards "complex", the simple password ("ek") generated is longer than the simple password ("e") prior to the sliding movement (but still simpler than the usual password). In other words, a longer simple password is generated by the electronic device by setting the degree of simplicity to a more complex setting. Conversely, a shorter simple password is generated by the electronic device by setting the degree of simplicity to a simpler setting.

The screen (306) also shows the object icons for four objects (351, 352, 353, 354) available to the user on the basis of the degree of simplicity indicated by the position of the slider bar.

Compared to the situation prior to moving the slider bar, the object icon for object (354) among the four objects (351, 352, 353, 354) is displayed using solid lines (black, unshaded). Therefore, by moving the degree of simplicity in the more complex direction using the slider bar, an additional object (354) is made available compared to the situation before the slider bar was moved. In other words, the electronic device may display the object icons for more objects available to the user when a more complex degree of simplicity is established. Conversely, object icons for objects available at a given degree of simplicity may disappear from the screen when a simpler degree of simplicity is established.

The screen (306) also shows object icons for objects available to the user by means of the four objects (351, 352, 353, 354) available to the user on the basis of the degree of simplicity indicated by the current position of the slider bar. The object icons displayed using solid lines (black, shaded) on top of the object icon for object (351) indicate that object A (361*b*), object B and object C are available by means of object (351) at the current degree of simplicity. Similarly, the object icons displayed using solid lines (black, unshaded) on top of the object icon for object (352) indicate that object E (363*b*), object F (364*b*), and object G are available by means of object (352) at the current degree of simplicity. The object icon displayed using solid lines (gray, shaded) on top of the object icon for object (352) indicates that object D (362*b*) is not available by means of object (352) at the current degree of simplicity. Similarly, the object icons displayed using solid lines (black, unshaded) on top of the object icon for object (353) indicate that object J and object K are available by means of object (353) at the current degree of simplicity. The object icon displayed using solid lines (gray, shaded) on top of the object icon for object (353) indicates that object H (365*b*) is not available by means of object (353) at the current degree of simplicity. Similarly, the object icon displayed using solid lines (black, unshaded) on top of the object icon for object (354) indicates that object M (367*b*) is available by means of object (354) at the current degree of simplicity. The object icon displayed using solid lines (gray, shaded) on top of the object icon for object (354) indicates that object L (366*b*) is not available by means of object (354) at the current degree of simplicity.

Therefore, by moving the degree of simplicity in the more complex direction using the slider bar, new objects are available compared to the situation before the slider bar was moved, including object A (361*b*) available to object (351), object E (363*b*) and object F (364*b*) available to object (352), object H (365*b*) available to object (353), and object M (367*b*) available to object (354). In other words, when the degree of simplicity is set to a more complex setting, the electronic device superimposes more newly available object icons on top of the object icons for the available objects and displays them using solid lines (black, unshaded). Conversely, when the degree of simplicity is set to a simpler setting, object icons for objects no longer available at the new degree of simplicity are displayed by the electronic device on top of the object icons for the available objects and displays them using solid lines (gray, shaded). The solid lines (black, unshaded) and solid lines (gray, shaded) are for illustrative purposes only. Unavailable object icons may be displayed in any manner that differentiates them from available objects.

In the embodiment shown in FIG. 3C, as explained above, the electronic device, in response to the degree of simplicity having been set by moving the slider bar, generates a simple password corresponding to the degree of simplicity, displays object icons for the objects available at the current degree of simplicity on the display screen and/or on top of object icons on the display screen using solid lines (black, unshaded), and displays object icons for the objects unavailable at the current degree of simplicity on the display screen and/or on top of object icons on the display screen using solid lines (gray, shaded).

Figure 3D:
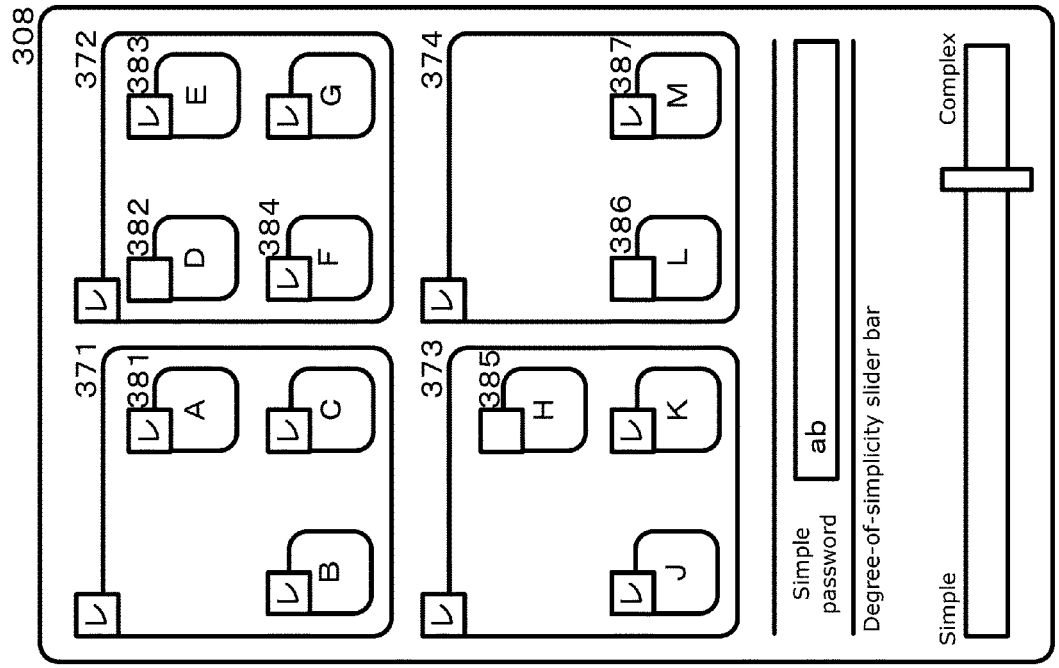
FIG. 3D shows the generation of a simple password based on the degree of simplicity established in response to the user sliding a slider bar from "simple" towards "complex" to establish the degree of simplicity for a password, and shows the change in objects available to the user based on the established degree of simplicity by checking the checkboxes associated with the object icons of the available objects according to an embodiment of the present invention.
Figure 3D:
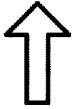
Figure 3D:
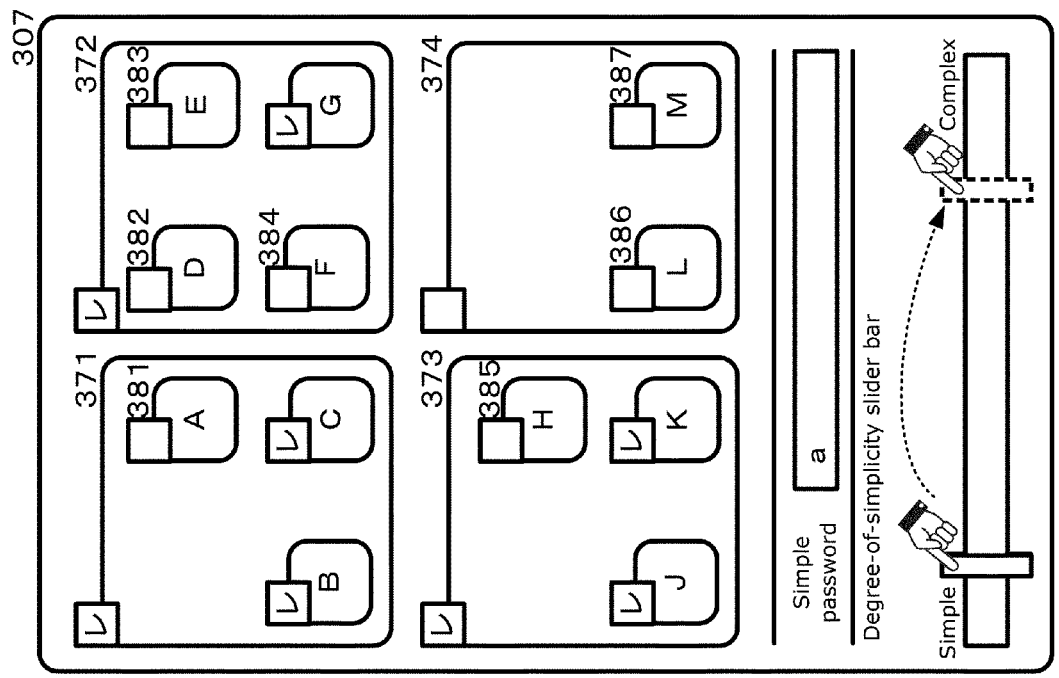

FIG. 3D shows the generation of a simple password based on the degree of simplicity established in response to the user sliding a slider bar from "simple" towards "complex" to establish the degree of simplicity for a password, and shows the change in objects available to the user based on the established degree of simplicity by checking the checkboxes associated with the object icons of the available objects according to an embodiment of the present invention.

The user enters the usual password in the electronic device, and the electronic device verifies the usual password that has been entered. When verification of the password has been successful, the electronic device displays screen (307) enabling the degree of simplicity to be set for a password in response to the menu for setting the degree of simplicity for a password having been called up.

Screen (307) shows a slider bar enabling the degree of simplicity for a password to be set, a simple password generated in response to the degree of simplicity set by moving the slider bar, object icons for objects available to the user, and checkboxes indicating whether or not the object is available. When the checkbox is turned on (that is, the box is checked off), the object is available. When the checkbox is turned off (that is, the box is unchecked), the object is not available.

On the screen (307), the slider bar is located near "simple" for the degree of simplicity. The initial position of the slider bar on the screen (307) may be a default degree of simplicity predetermined by the user or by the electronic device program in the embodiment of the present invention, or may be the degree of simplicity previously set by the user in accordance with the electronic device program in the embodiment of the present invention.

The electronic device generates a simple password based on the degree of simplicity indicated by the position of the slider bar. On the screen (307), the simple password is the first letter of the alphabet "a" (half-width lower case character).

The screen (307) shows the object icons for four objects (371, 372, 373, 374) available to the user on the basis of the degree of simplicity indicated by the current position of the slider bar. Among the object icons for the four objects (371, 372, 373, 374), the object icons with checked off checkboxes are for the objects (371, 372, 373) that are available at the current degree of simplicity. Among the object icons for the four objects (371, 372, 373, 374), the object icon with an unchecked checkbox is for the object (374) that are not available at the current degree of simplicity.

The screen (307) also shows object icons for objects available to the user by means of the four objects (371, 372, 373, 374) available to the user on the basis of the degree of simplicity indicated by the current position of the slider bar. In other words, the screen (307) shows the object icons for objects A, B and C available to the user by means of object (371), the object icons for objects D, E, F and G available to the user by means of object (372), the object icons for objects H, J and K available to the user by means of object (373), and the object icons for objects L and M available to the user by means of object (374). The object icons with a checked off checkbox on the object icon for object (371) indicate that object B and object C are available by means of object (371) at the current degree of simplicity. The object icon with an unchecked checkbox on the object icon for object (371) indicates that object A (381) is not available by means of object (371) at the current degree of simplicity. Similarly, the object icon with a checked off checkbox on the object icon for object (372) indicates that object G is available by means of object (372) at the current degree of simplicity. The object icons with an unchecked checkbox on the object icon for object (372) indicate that object D (382), object E (383) and object F (384) are not available by means of object (372) at the current degree of simplicity. Similarly, the object icons with a checked off checkbox on the object icon for object (373) indicate that object J and object K are available by means of object (373) at the current degree of simplicity. The object icon with an unchecked checkbox on the object icon for object (373) indicates that object H is not available by means of object (373) at the current degree of simplicity. The object icons with an unchecked checkbox on the object icon for object (374) indicate that object L and object M (384) are not available by means of object (374) at the current degree of simplicity.

The user slides the slider bar towards "complex" for the degree of simplicity (see the dotted arrow on screen (307)).

Screen (308) shows the screen after the slider bar has been moved.

On the screen (308), the slider bar is located near "complex" for the degree of simplicity, and the simple password corresponding to the degree of simplicity is two consecutive letters "ab" (half-width lower case characters).

In response to the degree of simplicity established by sliding the slider bar towards "complex", the simple password ("ab") generated is longer than the simple password ("a") prior to the sliding movement (but still simpler than the usual password). In other words, a longer simple password is generated by the electronic device by setting the degree of simplicity to a more complex setting. Conversely, a shorter simple password is generated by the electronic device by setting the degree of simplicity to a simpler setting.

The screen (308) also shows the checked off object icons for four objects (371, 372, 373, 374) available to the user on the basis of the degree of simplicity indicated by the position of the slider bar.

Compared to the situation prior to moving the slider bar, the object icon for object (374) among the four objects (371, 372, 373, 374) has a checked off checkbox. Therefore, by moving the degree of simplicity in the more complex direction using the slider bar, an additional object (374) is made available compared to the situation before the slider bar was moved. In other words, the electronic device checks off object icons for even more objects (374) available to the user when a more complex degree of simplicity is established. Conversely, object icons for objects available at a given degree of simplicity may be unchecked when a simpler degree of simplicity is established.

The screen (308) also shows object icons for objects available to the user by means of the four objects (371, 372, 373, 374) available to the user on the basis of the degree of simplicity indicated by the current position of the slider bar. The object icons displayed with a checked off checkbox on the object icon for object (371) indicate that object A (381), object B and object C are available by means of object (371) at the current degree of simplicity. Similarly, the object icons displayed with a checked off checkbox on the object icon for object (372) indicate that object E (382), object F (383), and object G are available by means of object (372) at the current degree of simplicity. The object icon with an unchecked checkbox on the object icon for object (372) indicates that object D is not available by means of object (372) at the current degree of simplicity. Similarly, the object icons with a checked off checkbox on the object icon for object (373) indicate that object J and object K are available by means of object (373) at the current degree of simplicity. The object icon with an unchecked checkbox on the object icon for object (373) indicates that object H (385) is not available by means of object (373) at the current degree of simplicity. Similarly, the object icon with a checked off checkbox on the object icon for object (374) indicates that object M (387) is available by means of object (374) at the current degree of simplicity. The object icon with an unchecked checkbox on the object icon for object (374) indicates that object L (386) is not available by means of object (374) at the current degree of simplicity.

Therefore, by moving the degree of simplicity in the more complex direction using the slider bar, new objects are available compared to the situation before the slider bar was moved, including object A (381) available to object (371), object E (383) and object F (384) available to object (372), and object M (387) available to object (374). In other words, when the degree of simplicity is set to a more complex setting, the electronic device may check off the checkboxes of more newly available object icons. Conversely, when the degree of simplicity is set to a simpler setting, the checkboxes of object icons for objects no longer available at the new degree of simplicity may be unchecked.

In the embodiment shown in FIG. 3D, as explained above, the electronic device, in response to the degree of simplicity having been set by moving the slider bar, generates a simple password corresponding to the degree of simplicity, checks off the checkboxes of object icons for the objects available at the current degree of simplicity and/or checks off the checkboxes of object icons for the objects available on top of object icons on the display screen, and unchecks the checkboxes of object icons for the objects not available at the current degree of simplicity and/or unchecks the checkboxes of object icons for unavailable objects on top of object icons on the display screen.

Figure 3E:
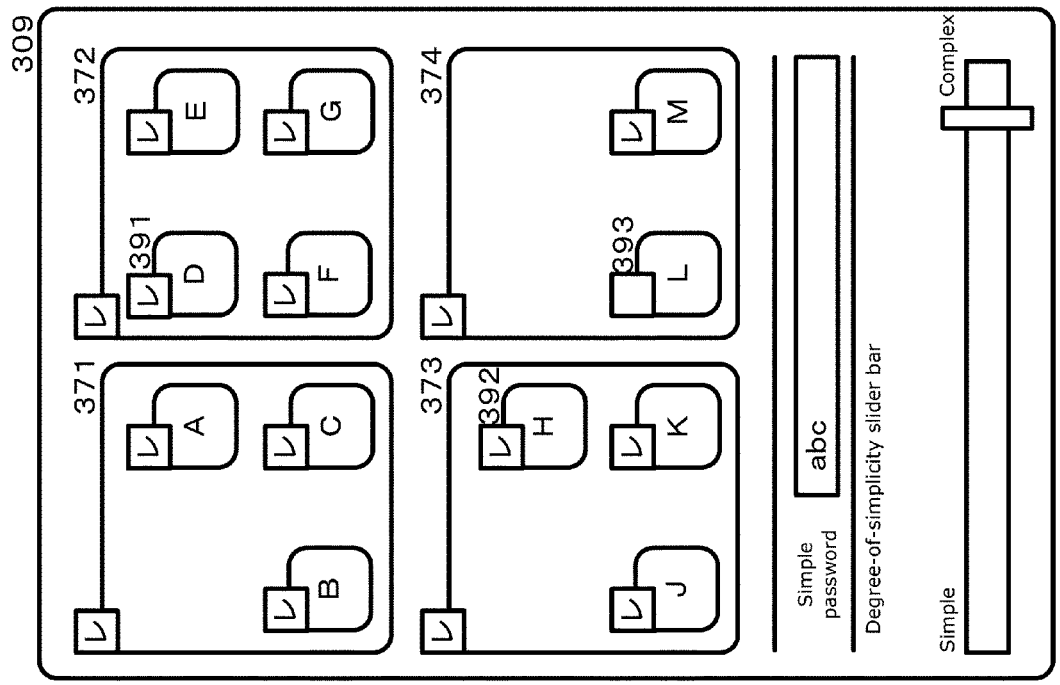
FIG. 3E shows the generation of a simple password based on the degree of simplicity established in response to the user sliding a slider bar from "simple" towards "complex" to establish the degree of simplicity for a password, and shows the change in objects available to the user based on the established degree of simplicity by checking the checkboxes associated with the object icons of the available objects on the screen (308) shown in FIG. 3D according to an embodiment of the present invention.
Figure 3E:
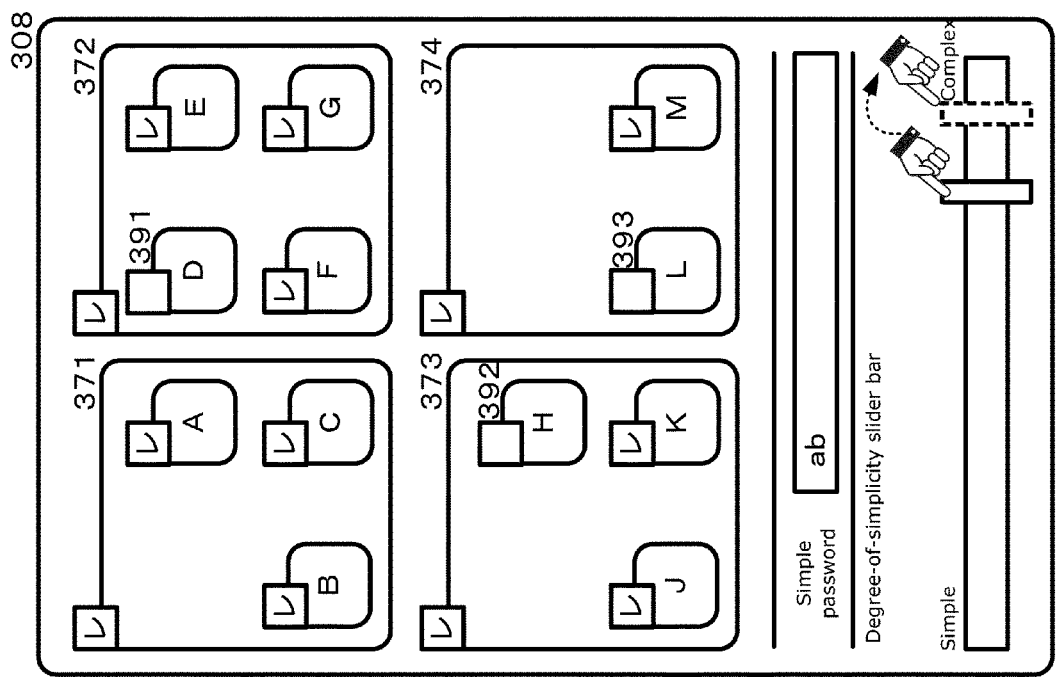

FIG. 3E shows the generation of a simple password based on the degree of simplicity established in response to the user sliding a slider bar from "simple" towards "complex" to establish the degree of simplicity for a password, and shows the change in objects available to the user based on the established degree of simplicity by checking the checkboxes associated with the object icons of the available objects on the screen (308) shown in FIG. 3D according to an embodiment of the present invention.

The screen (308) shown in FIG. 3E is the same screen (308) shown in FIG. 3D. When screen (308) is mentioned below, it refers to screen (308) shown in FIG. 3E.

The user slides the slider bar towards "complex" for the degree of simplicity (see the dotted arrow on screen (308)).

Screen (309) shows the screen after the slider bar has been moved.

On the screen (309), the slider bar is located near "complex" for the degree of simplicity, and the simple password corresponding to the degree of simplicity is three consecutive letters "abc" (half-width lower case characters).

In response to the degree of simplicity established by sliding the slider bar towards "complex", the simple password ("abc") generated is longer than the simple password ("ab") prior to the sliding movement (but still simpler than the usual password). In other words, a longer simple password is generated by the electronic device by setting the degree of simplicity to a more complex setting. Conversely, a shorter simple password is generated by the electronic device by setting the degree of simplicity to a simpler setting.

The screen (309) also shows checked off object icons for four objects (371, 372, 373, 374) available to the user on the basis of the degree of simplicity indicated by the position of the slider bar.

The screen (309) also shows object icons for objects available to the user by means of the four objects (371, 372, 373, 374) available to the user on the basis of the degree of simplicity indicated by the current position of the slider bar. The object icons displayed with a checked off checkbox on the object icon for object (371) indicate that object A, object B and object C are available by means of object (371) at the current degree of simplicity. Similarly, the object icons displayed with a checked off checkbox on the object icon for object (372) indicate that object D (391), object E, object F, and object G are available by means of object (372) at the current degree of simplicity. Similarly, the object icons with a checked off checkbox on the object icon for object (373) indicate that object H (392), object J and object K are available by means of object (373) at the current degree of simplicity. Similarly, the object icon with a checked off checkbox on the object icon for object (374) indicates that object M is available by means of object (374) at the current degree of simplicity. The object icon with an unchecked checkbox on the object icon for object (374) indicates that object L (393) is not available by means of object (374) at the current degree of simplicity.

Therefore, by moving the degree of simplicity in the more complex direction using the slider bar, new objects are available compared to the situation before the slider bar was moved, including object D (391) available to object (372), and object H (385) available to object (373). In other words, when the degree of simplicity is set to a more complex setting, the electronic device may check off the checkboxes of more newly available object icons. Conversely, when the degree of simplicity is set to a simpler setting, the checkboxes of object icons for objects no longer available at the new degree of simplicity may be unchecked.

In the embodiment shown in FIG. 3E, as explained above, the electronic device, in response to the degree of simplicity having been set by moving the slider bar, generates a simple password corresponding to the degree of simplicity, checks off the checkboxes of object icons for the objects available at the current degree of simplicity and/or checks off the checkboxes of object icons for the objects available on top of object icons on the display screen, and unchecks the checkboxes of object icons for the objects not available at the current degree of simplicity and/or unchecks the checkboxes of object icons for unavailable objects on top of object icons on the display screen.

Figure 4A:
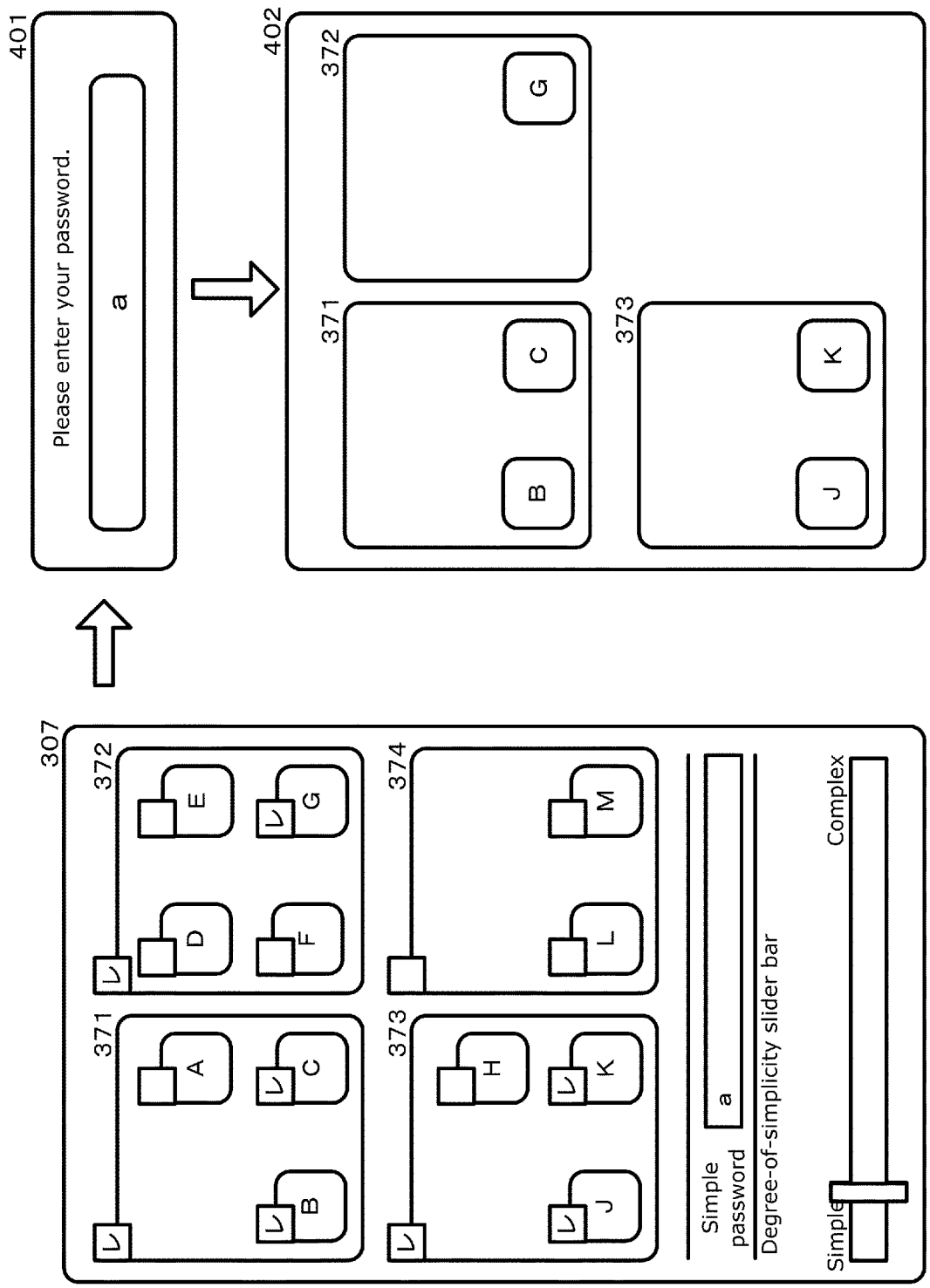
FIG. 4A shows examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.
Figure 4B:
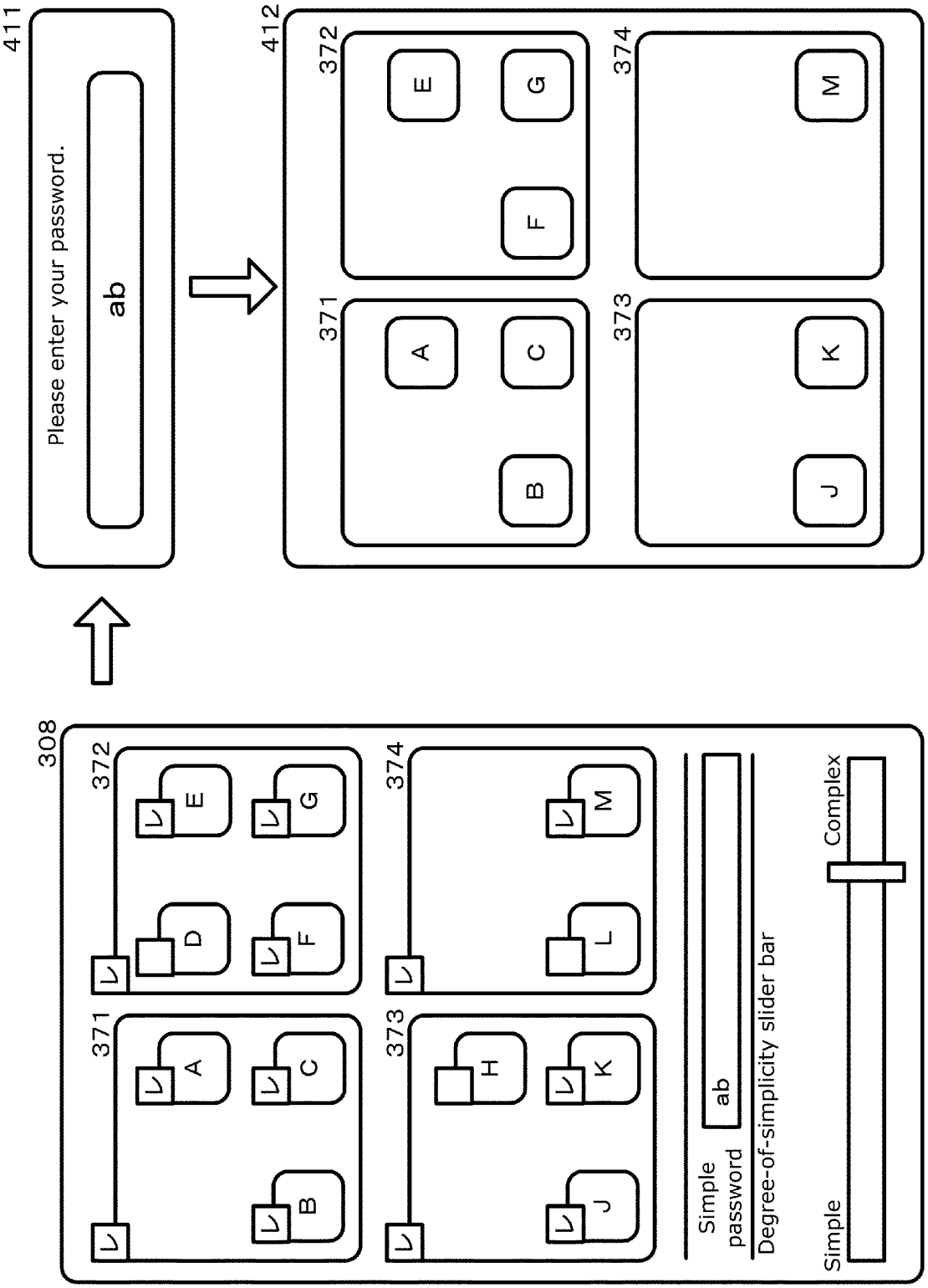
FIG. 4B shows examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.

FIG. 4A and FIG. 4B each show examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.

The screen (307) shown in FIG. 4A is the same screen (307) shown in FIG. 3D. When screen (307) is mentioned below, it refers to screen (307) shown in FIG. 4A.

The user wishes to use an object available at the degree of simplicity indicated by the default position of the slider bar (see the position of the slider bar on screen (307)). The user then completes the process of generating a simple password in accordance with an embodiment of the present invention.

In response to the user calling up the screen for entering a simple password, the electronic device displays the simple password input screen (401).

The user enters the simple password "a" (half-width lower case character) in the electronic device.

The electronic device receives the entered character string "a", and verifies that the entered character string matches the registered simple password "a".

In response to the entered character string matching the registered simple password "a", the electronic device generates an initial display screen including the objects available to the user at the current degree of simplicity, and displays the initial display screen on the display device. The initial display screen includes application icons for four applications (371, 372, 373 and 374), object icons for object B and object C available to application (371), an object icon for object G available to application (372), and object icons for object J and object K available to application (373).

Screen (402) shows the initial display screen. Object icons for objects not available to the user at the current degree of simplicity are not included in the initial display screen. Also, there are no checkboxes for object icons on the initial display screen.

The screen (308) shown in FIG. 4B is the same screen (307) shown in FIG. 3D. When screen (307) is mentioned below, it refers to screen (307) shown in FIG. 4A.

When the user has moved to slider bar to a higher degree of simplicity, the electronic device generates a simple password "ab" based on the current degree of simplicity.

In response to the user calling up the screen for entering a simple password, the electronic device displays the simple password input screen (411).

The user enters the simple password "ab" in the electronic device.

The electronic device receives the entered character string "ab", and verifies that the entered character string matches the registered simple password "ab".

In response to the entered character string matching the registered simple password "ab", the electronic device generates an initial display screen including the objects available to the user at the current degree of simplicity, and displays the initial display screen on the display device. The initial display screen includes application icons for four applications (371, 372, 373 and 374), object icons for object A, object B and object C available to application (371), object icons for object E, object F, and object G available to application (372), object icons for object J and object K available to application (373), and an object icon for object M available to application (374).

Screen (412) shows the initial display screen. Object icons for objects not available to the user at the current degree of simplicity are not included in the initial display screen. Also, there are no checkboxes for object icons on the initial display screen.

FIG. 5A through FIG. 5D each show embodiments of the present invention in which object icons available to the user have been moved onto another object icon, a password for the degree of simplicity enabling these object icons to be used is displayed on the screen, and the object icons for objects available at the current degree of simplicity are displayed on the screen or displayed on object icons of objects that can be used by objects available at the current degree of simplicity.

Figure 5A:
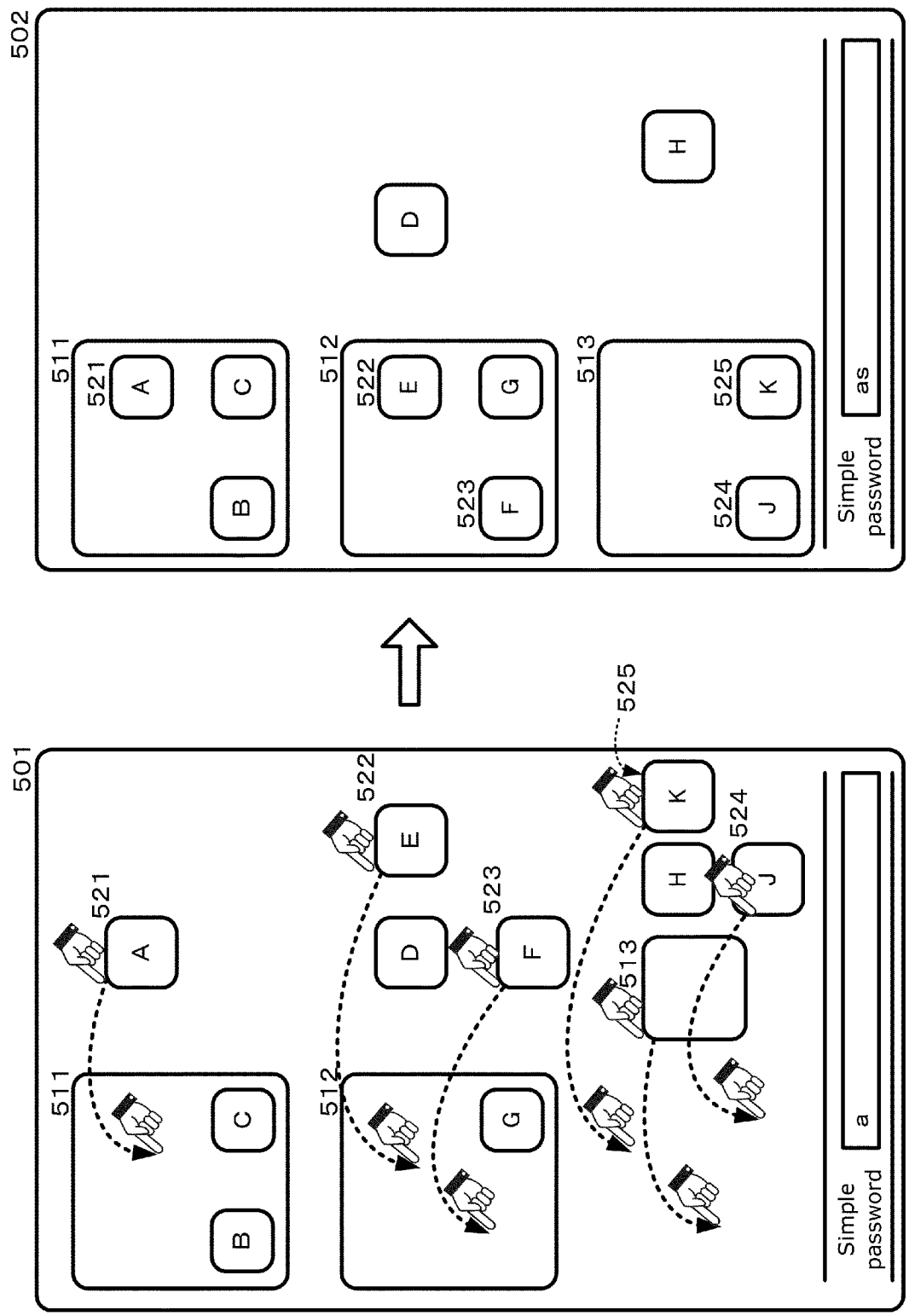
FIG. 5A shows an embodiment of the present invention in which the electronic device recalculates the degree of simplicity of the passwords of the entire device, and generates passwords in accordance with the recalculated degree of simplicity in response to the user having moved object icons to be used to a predetermined location or onto another object icon.

FIG. 5A shows an embodiment of the present invention in which the electronic device recalculates the degree of simplicity of the passwords of the entire device, and generates passwords in accordance with the recalculated degree of simplicity in response to the user having moved object icons to be used to a predetermined location or onto another object icon.

The user enters the usual password in the electronic device, and the electronic device verifies the usual password that has been entered. When verification of the password has been successful, a screen (501) is displayed enabling objects to be moved or selected.

The screen (501) shows the object icons for objects available to the currently displayed simple password ("a") (half-width, lower case) (hereinafter referred to as available objects), and object icons for objects that are unavailable to the currently displayed simple password but would be available if the degree of simplicity were changed (referred to below as potentially available objects). The object icons for potentially available objects refer to objects displayed on the screen or object icons displayed on top of object icons on the screen. Potentially available objects are objects that can be selected by the user.

Screen (501) shows objects available at the default degree of simplicity predetermined by the user or by the electronic device program in the embodiment of the present invention, or at a previously established degree of simplicity. On screen (501), the available objects are object (511) and object B and object C on the object icon for object (511), and object (512) and object G on the object icon for object (512).

Screen (501) also shows objects unavailable at the default degree of simplicity predetermined by the user or by the electronic device program in the embodiment of the present invention, or at a previously established degree of simplicity, but potentially available. On screen (501), the potentially available objects are object (513), object A, objects D, E and F, and objects H, K and J. The object icon for object (513) is displayed directly on top of the screen. The object icons for object A, objects D, E and F, and objects H, K and J are superimposed on top of the object icons for objects displayed directly on top of the screen. The object icon for object (513) may be displayed, for example, at a size larger than the object icons for object A, objects D, E and F, and objects H, K and J.

The electronic device generates a simple password on the basis of the degree of simplicity. The screen (501) shows the simple password "a" (half-width, lower case), which is the key farthest to the left in the middle row of the keyboard.

The user can select the objects to be used among the potential objects using a pointing device or by performing a touchpad operation. For example, when object A (521) is to be used, the user drags and drops object A (521) onto object (511). Similarly, when object E (522) or object F (523) is to be used, the user individually or simultaneously drags and drops object E (522) and object F (523) onto object (512). Similarly, when object (513) is to be used along with object K (525) and object J (524), the user first performs a particular operation to make object (513) available (such as moving object (513) to a particular location or double-clicking). When this operation has been performed, the electronic device makes the object icon for object (513) the same size as the object icons for object (511) and object (512), and displays object (513) as an available object. Next, the user individually or simultaneously drags and drops object J (524) and object K (525) onto object (513).

The screen (502) shows the situation after each of these objects has been dragged and dropped. Object D and object H have not been selected by the user.

The screen (502) shows the simple password "as" (half-width, lower case), which are the two keys farthest to the left in the middle row of the keyboard. This is the simple password corresponding to the degree of simplicity after each of these objects has been dragged and dropped. The electronic device calculates a degree of simplicity for the entire device based on the degree of simplicity associated with each of the objects available on the electronic device, and generates simple passwords on the basis of the recalculated degree of simplicity.

The simple password ("as") generated by the addition of available objects is longer than the simple password ("a") prior to the drag-and-drop operation (but still simpler than the usual password). In other words, the electronic device may generate longer simple passwords as the recalculated degree of simplicity increases. Conversely, the electronic device may generate shorter simple passwords as the recalculated degree of simplicity decreases.

In the embodiment shown in FIG. 5A, as mentioned above, the electronic device recalculates the degree of simplicity for the entire device and generates a simple password in response to the recalculated degree of simplicity on the basis of the degree of simplicity associated with each of the objects available on the device after objects have been dragged and dropped to a predetermined location or on top of another object icon.

Figure 5B:
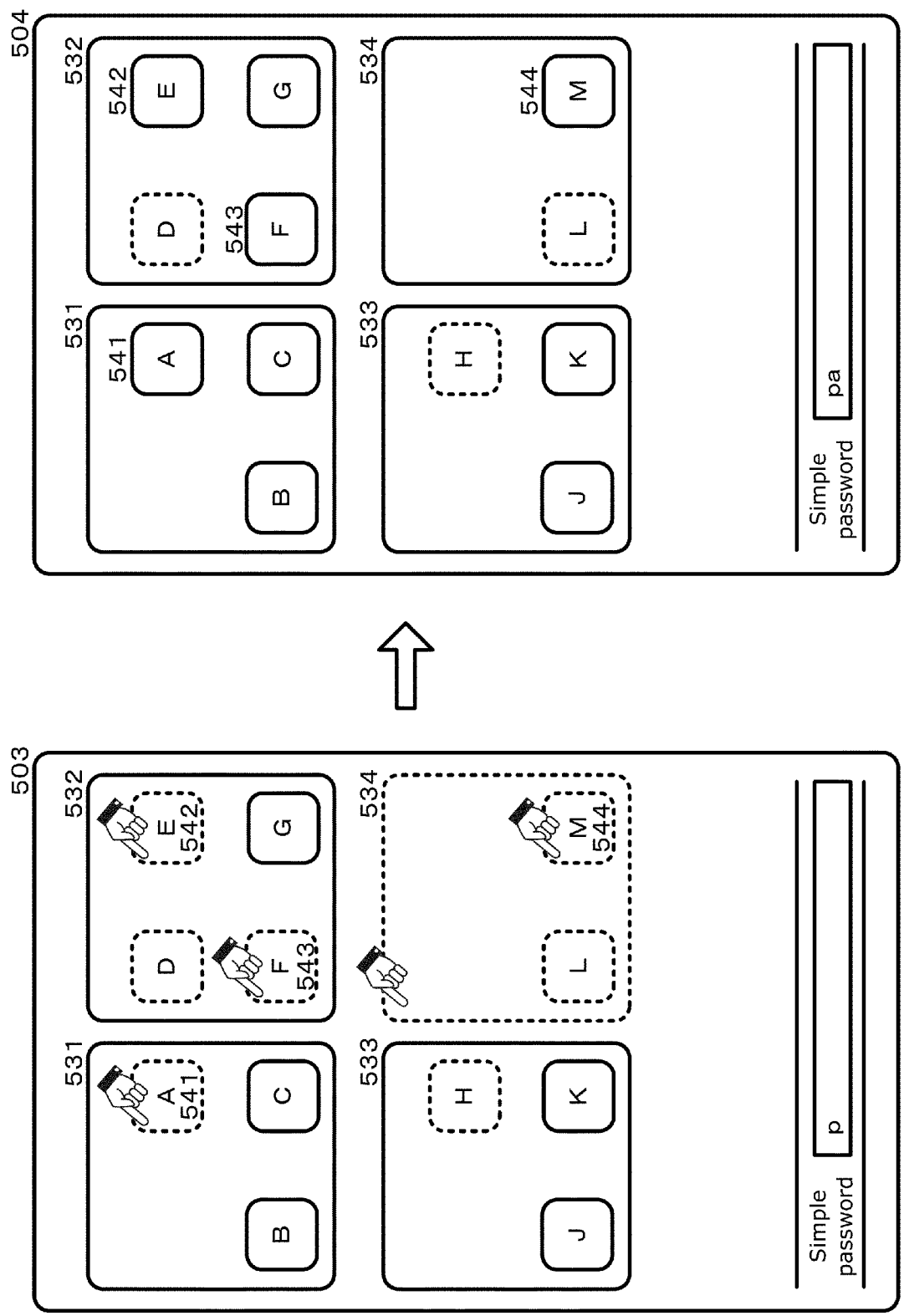
FIG. 5B shows an embodiment of the present invention in which the electronic device recalculates the degree of simplicity of the passwords of the entire device, and generates passwords in accordance with the recalculated degree of simplicity in response to the user having selected object icons to be used.

FIG. 5B shows an embodiment of the present invention in which the electronic device recalculates the degree of simplicity of the passwords of the entire device, and generates passwords in accordance with the recalculated degree of simplicity in response to the user having selected object icons to be used.

The user enters the usual password in the electronic device, and the electronic device verifies the usual password that has been entered. When verification of the password has been successful, the electronic device displays screen (503) enabling objects to be selected in response to the menu for selecting object to be used by the user having been called up.

The screen (503) shows the object icons for objects available to the currently displayed simple password ("p") (half-width, lower case) (available objects), and object icons for objects that are unavailable to the currently displayed simple password but would be available if the degree of simplicity were changed (potentially available objects).

Screen (503) shows objects available at the default degree of simplicity predetermined by the user or by the electronic device program in the embodiment of the present invention, or at a previously established degree of simplicity (displayed using solid lines). On screen (503), the available objects are object (531) and object B and object C on the object icon for object (531), object (532) and object G on the object icon for object (532), and object (533) and object J and object K on the object icon for object (533).

Screen (503) shows objects which are unavailable at the default degree of simplicity predetermined by the user or by the electronic device program in the embodiment of the present invention, or at a previously established degree of simplicity, but which are potentially available (displayed using dotted lines). On screen (503), the potentially available objects are object A on the object icon for object (531), objects D, E and F on the object icon for object (532), object H on the object icon for object (533), object (534), and objects L and M on the object icon for object (534).

Screen (503) also shows, as the simple password, "p" (half-width, lower case character) which is a portion of the easy to vocalize phrase "pa". The electronic device generates a simple password in response to the degree of simplicity calculated for the entire electronic device on the basis of the degree of simplicity associated with each of the currently available objects.

The user can select an object to be used from among the potentially available objects using a pointing device or by performing a touchpad operation (such as clicking or double-clicking). When, for example, object A (541) is to be used, the user selects object A (541). Similarly, when object E (542) and object F (543) are to be used, the user individually or simultaneously selects object E (542) and object F (543). Similarly, when object (534) and object M (544) are to be used, object (534) is selected to first enable object (534), and then object M (544) is selected. Alternatively, the user may simply select object M (544), and the electronic device can automatically select object (534) which is required for the use of object M (544).

The screen (504) shows the situation after each of these objects has been selected. Object D, object H and object L have not been selected by the user.

Screen (504) also shows, as the simple password corresponding to the degree of simplicity of the entire electronic device after the selection of each object, "pa" (half-width, lower case characters) which is an easy to vocalize phrase. The electronic device generates a simple password in response to the degree of simplicity calculated for the entire electronic device on the basis of the degree of simplicity associated with each of the currently available objects.

The simple password ("pa") generated by the addition of available objects is longer than the simple password ("p") prior to object selection (but still simpler than the usual password). In other words, the electronic device may generate longer simple passwords as the recalculated degree of simplicity increases. Conversely, the electronic device may generate shorter simple passwords as the recalculated degree of simplicity decreases.

In the embodiment shown in FIG. 5B, as mentioned above, the electronic device recalculates the degree of simplicity for the entire device and generates a simple password in response to the recalculated degree of simplicity on the basis of the degree of simplicity associated with each of the objects available on the device after objects have been selected.

Figure 5C:
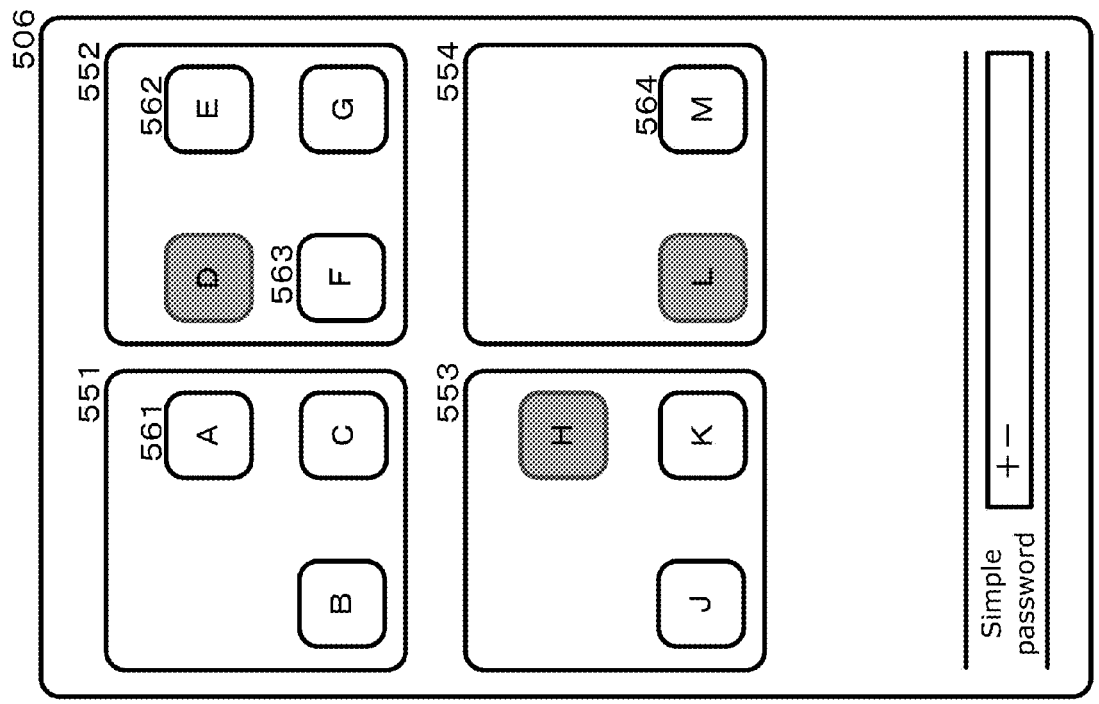
FIG. 5C shows an embodiment of the present invention in which the electronic device recalculates the degree of simplicity of the passwords of the entire device, and generates passwords in accordance with the recalculated degree of simplicity in response to the user having selected object icons to be used.
Figure 5C:
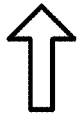
Figure 5C:
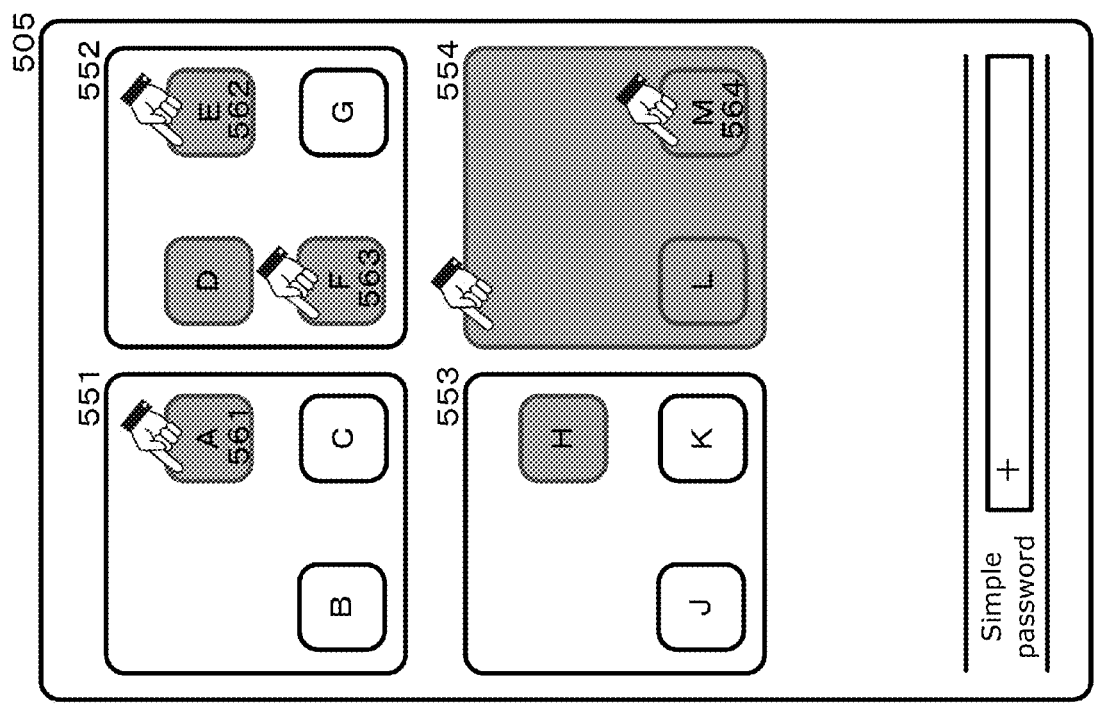

FIG. 5C shows an embodiment of the present invention in which the electronic device recalculates the degree of simplicity of the passwords of the entire device, and generates passwords in accordance with the recalculated degree of simplicity in response to the user having selected object icons to be used.

The user enters the usual password in the electronic device, and the electronic device verifies the usual password that has been entered. When verification of the password has been successful, the electronic device displays screen (505) enabling objects to be selected in response to the menu for selecting objects available to the user having been called up.

The screen (505) shows the object icons for objects available to the currently displayed simple password ("+") (half-width) (available objects), and object icons for objects that are unavailable to the currently displayed simple password but would be available if the degree of simplicity were changed (potentially available objects).

Screen (505) shows objects available at the default degree of simplicity predetermined by the user or by the electronic device program in the embodiment of the present invention, or at a previously established degree of simplicity (displayed using solid black lines and no shading). On screen (505), the available objects are object (551) and object B and object C on the object icon for object (551), object (552) and object G on the object icon for object (553), and object (553) and object J and object K on the object icon for object (553).

Screen (505) shows objects which are unavailable at the default degree of simplicity predetermined by the user or by the electronic device program in the embodiment of the present invention, or at a previously established degree of simplicity, but which are potentially available (gray solid lines with shading). On screen (505), the potentially available objects are object A on the object icon for object (551), objects D, E and F on the object icon for object (552), object H on the object icon for object (553), object (554), and objects L and M on the object icon for object (554).

Screen (505) also shows, as the simple password, the single symbol "+" (half-width). The electronic device generates a simple password in response to the degree of simplicity calculated for the entire electronic device on the basis of the degree of simplicity associated with each of the currently available objects.

The user can select an object to be used from among the potentially available objects using a pointing device or by performing a touchpad operation (such as clicking or double-clicking). When, for example, object A (561) is to be used, the user selects object A (561). Similarly, when object E (562) and object F (563) are to be used, the user individually or simultaneously selects object E (562) and object F (563). Similarly, when object (554) and object M (564) are to be used, object (554) is selected to first enable object (554), and then object M (564) is selected. Alternatively, the user may simply select object M (564), and the electronic device can automatically select object (554) which is required for the use of object M (564).

The screen (506) shows the situation after each of these objects has been selected. Object D, object H and object L have not been selected by the user.

Screen (506) also shows, as the simple password corresponding to the degree of simplicity of the entire electronic device after the selection of each object, the two symbols "+−" (half-width). The electronic device generates a simple password in response to the degree of simplicity calculated for the entire electronic device on the basis of the degree of simplicity associated with each of the currently available objects.

The simple password ("+−") generated by the addition of available objects is longer than the simple password ("+") prior to object selection (but still simpler than the usual password). In other words, the electronic device may generate longer simple passwords as the recalculated degree of simplicity increases. Conversely, the electronic device may generate shorter simple passwords as the recalculated degree of simplicity decreases.

In the embodiment shown in FIG. 5C, as mentioned above, the electronic device recalculates the degree of simplicity for the entire device and generates a simple password in response to the recalculated degree of simplicity on the basis of the degree of simplicity associated with each of the objects available on the device after objects have been selected.

Figure 5D:
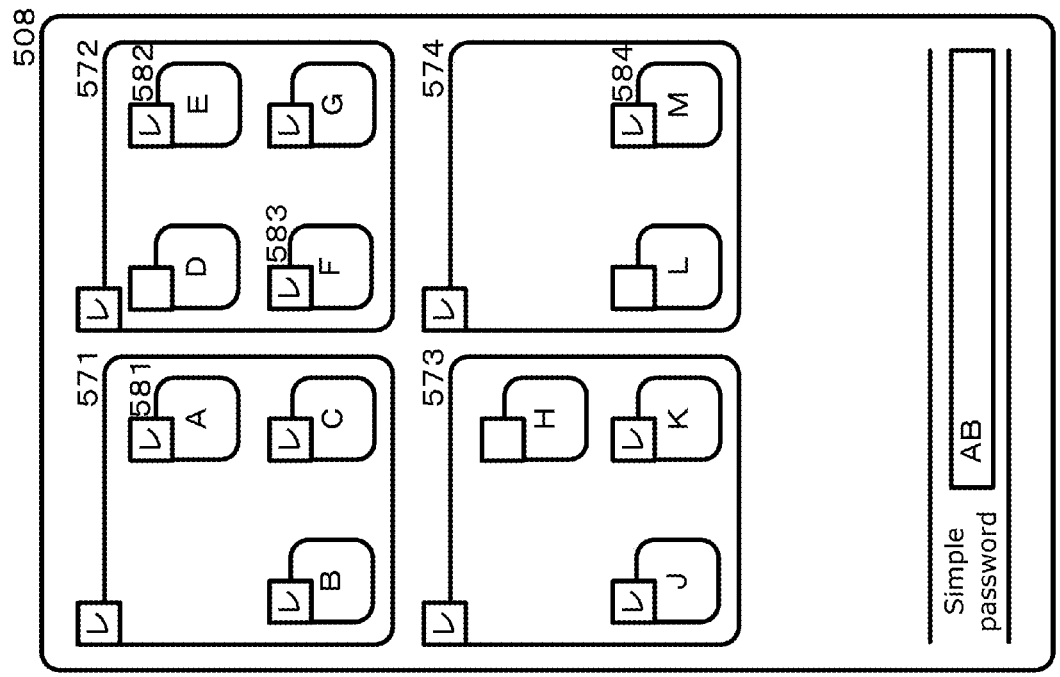
FIG. 5D shows an embodiment of the present invention in which the electronic device recalculates the degree of simplicity of the passwords of the entire device, and generates passwords in accordance with the recalculated degree of simplicity in response to the user having checked the checkboxes associated with object icons to be used.
Figure 5D:
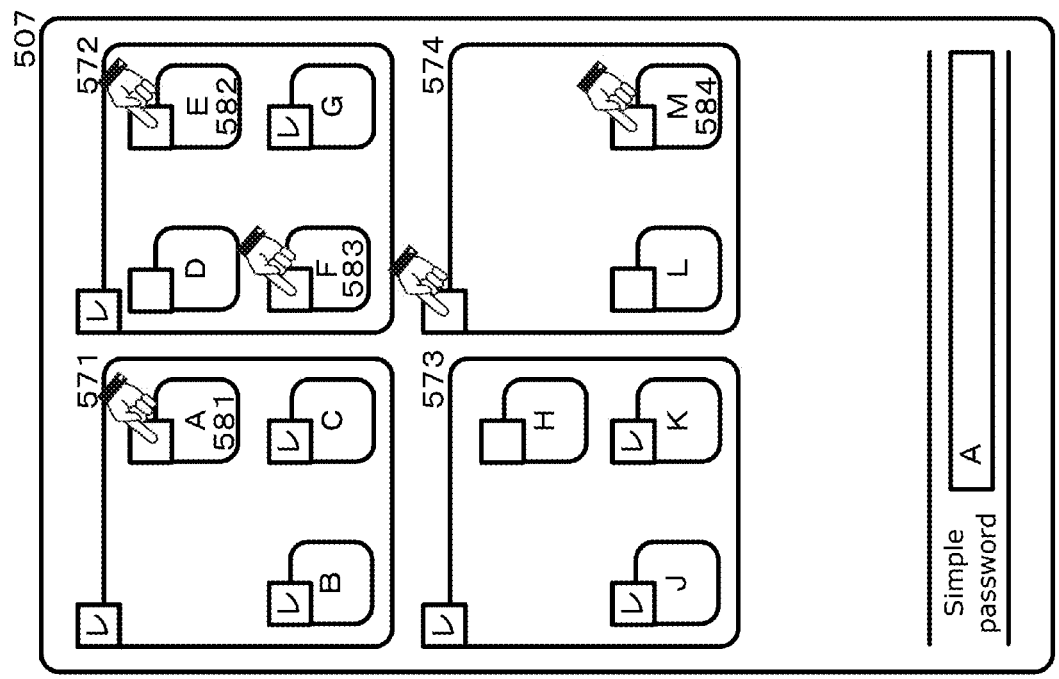

FIG. 5D shows an embodiment of the present invention in which the electronic device recalculates the degree of simplicity of the passwords of the entire device, and generates passwords in accordance with the recalculated degree of simplicity in response to the user having checked the checkboxes associated with object icons to be used.

The user enters the usual password in the electronic device, and the electronic device verifies the usual password that has been entered. When verification of the password has been successful, the electronic device displays screen (507) enabling objects to be selected in response to the menu for selecting objects available to the user having been called up.

The screen (507) shows the object icons for objects available to the currently displayed simple password ("A") (half-width, upper case character) (available objects), and object icons for objects that are unavailable to the currently displayed simple password but would be available if the degree of simplicity were changed (potentially available objects).

Screen (507) shows objects available at the default degree of simplicity predetermined by the user or by the electronic device program in the embodiment of the present invention, or at a previously established degree of simplicity. The object icons of the available objects are displayed with a checkbox that has been turned on (checked off). On screen (507), the available objects are object (571) and object B and object C on the object icon for object (571), object (572) and object G on the object icon for object (573), and object (573) and object J and object K on the object icon for object (573).

Screen (507) shows objects which are unavailable at the default degree of simplicity predetermined by the user or by the electronic device program in the embodiment of the present invention, or at a previously established degree of simplicity, but which are potentially available. The object icons of the potentially available objects are displayed with a checkbox that has been turned off (unchecked). On screen (507), the potentially available objects are object A on the object icon for object (571), objects D, E and F on the object icon for object (572), object H on the object icon for object (573), object (574), and objects L and M on the object icon for object (574).

Screen (507) also shows, as the simple password, the first letter of the alphabet "A" (half-width, upper case character). The electronic device generates a simple password in response to the degree of simplicity calculated for the entire electronic device on the basis of the degree of simplicity associated with each of the currently available objects.

The user can select an object to be used from among the potentially available objects using a pointing device or by performing a touchpad operation (such as clicking or double-clicking). When, for example, object A (571) is to be used, the user selects object A (571). Similarly, when object E (582) and object F (583) are to be used, the user individually or simultaneously selects object E (582) and object F (583). Similarly, when object (574) and object M (584) are to be used, object (574) is selected to first enable object (574), and then object M (584) is selected. Alternatively, the user may simply select object M (584), and the electronic device can automatically select object (574) which is required for the use of object M (584).

The screen (508) shows the situation after each of these objects has been selected. Object D, object H and object L have not been selected by the user.

Screen (508) also shows, as the simple password corresponding to the degree of simplicity of the entire electronic device after the selection of each object, the two consecutive letters "AB" (half-width, upper case characters). The electronic device generates a simple password in response to the degree of simplicity calculated for the entire electronic device on the basis of the degree of simplicity associated with each of the currently available objects.

The simple password ("AB") generated by the addition of available objects is longer than the simple password ("A") prior to object selection (but still simpler than the usual password). In other words, the electronic device may generate longer simple passwords as the recalculated degree of simplicity increases. Conversely, the electronic device may generate shorter simple passwords as the recalculated degree of simplicity decreases.

In the embodiment shown in FIG. 5D, as mentioned above, the electronic device recalculates the degree of simplicity for the entire device and generates a simple password in response to the recalculated degree of simplicity on the basis of the degree of simplicity associated with each of the objects available on the device after objects have been selected.

Figure 5E:
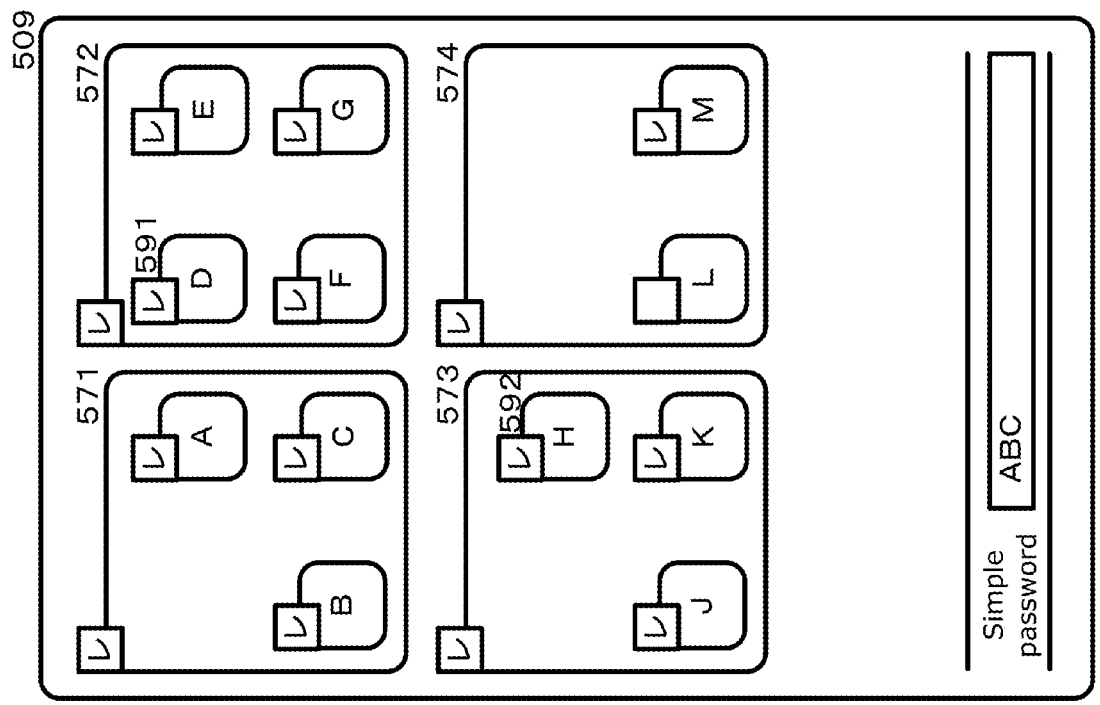
FIG. 5E shows an embodiment of the present invention in which the electronic device recalculates the degree of simplicity of the passwords of the entire device, and generates passwords in accordance with the recalculated degree of simplicity in response to the user having checked the checkboxes associated with object icons of the objects to be used on the screen shown in FIG. 5D.
Figure 5E:
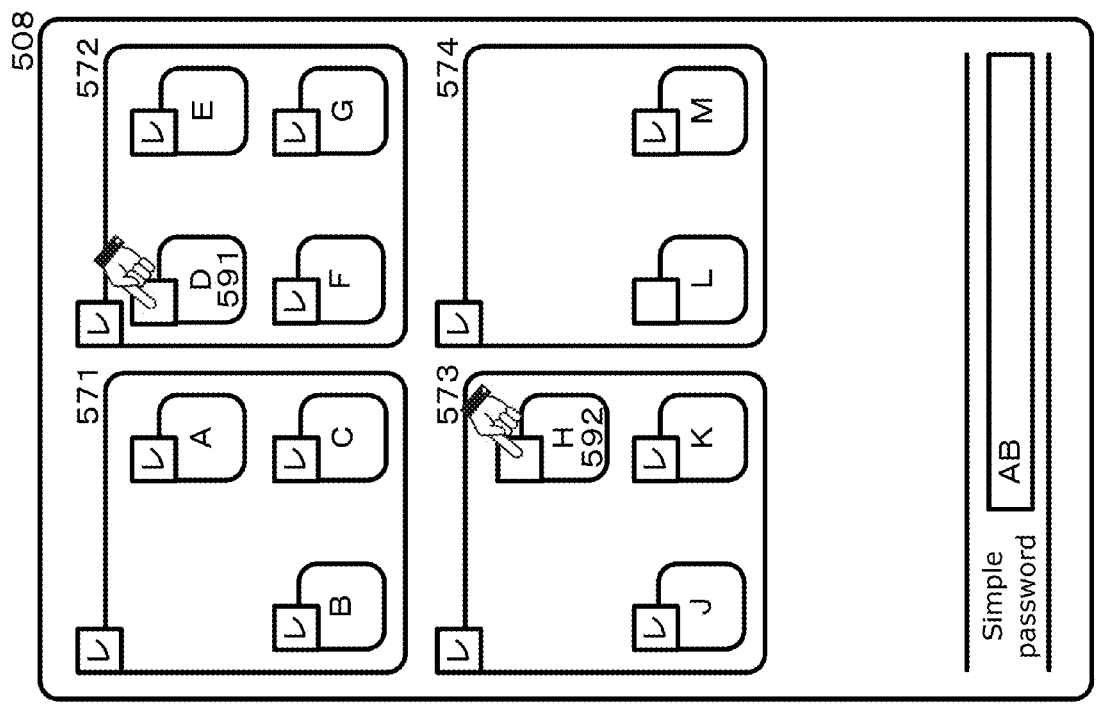

FIG. 5E shows an embodiment of the present invention in which the electronic device recalculates the degree of simplicity of the passwords of the entire device, and generates passwords in accordance with the recalculated degree of simplicity in response to the user having checked the checkboxes associated with object icons of the objects to be used on the screen (508) shown in FIG. 5D.

The screen (508) shown in FIG. 5E is the same screen (508) shown in FIG. 5D. When screen (508) is mentioned below, it refers to screen (508) shown in FIG. 5E.

The user can select an object to be used from among the potentially available objects using a pointing device or by performing a touchpad operation (such as clicking or double-clicking). When, for example, object D (591) is to be used, the user selects object D (591). Similarly, when object H (592) is to be used, the user selects object H (592).

The screen (509) shows the situation after each of these objects has been selected. Object L has not been selected by the user.

Screen (509) also shows, as the simple password corresponding to the degree of simplicity of the entire electronic device after the selection of each object with a checked off checkbox, the three consecutive letters "ABC" (half-width, upper case characters). The electronic device recalculates the degree of simplicity of the passwords of the entire device, and generates passwords in accordance with the recalculated degree of simplicity on the basis of the degree of simplicity associated with each of the objects available to the electronic device.

The simple password ("ABC") generated by the addition of available objects is longer than the simple password ("AB") prior to checking off checkboxes (but still simpler than the usual password). In other words, the electronic device may generate longer simple passwords as the recalculated degree of simplicity increases. Conversely, the electronic device may generate shorter simple passwords as the recalculated degree of simplicity decreases.

In the embodiment shown in FIG. 5E, as mentioned above, the electronic device recalculates the degree of simplicity for the entire device and generates a simple password in response to the recalculated degree of simplicity on the basis of the degree of simplicity associated with each of the objects available on the device with a checked off checkbox.

Figure 6A:
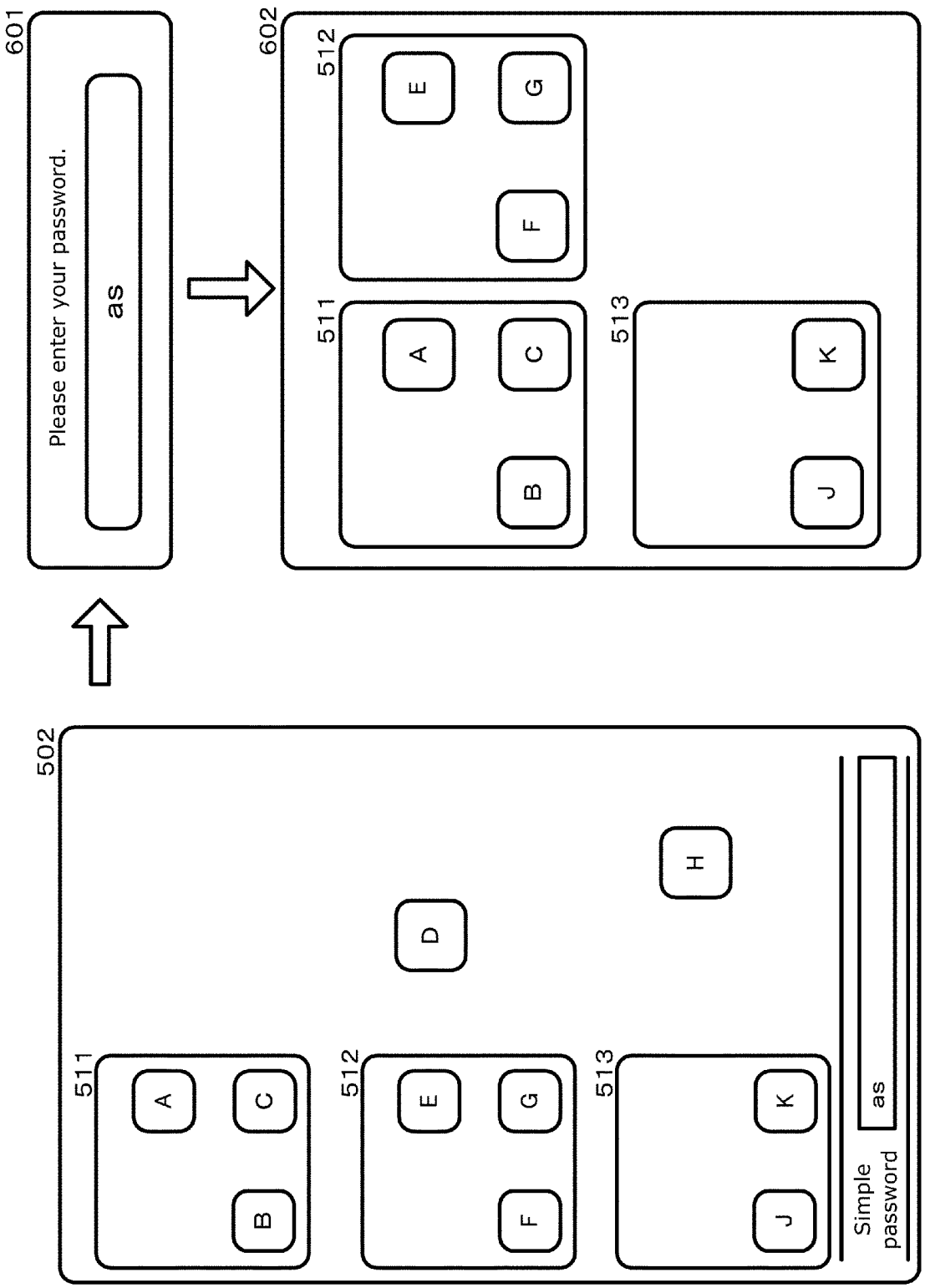
FIG. 6A shows examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.
Figure 6B:
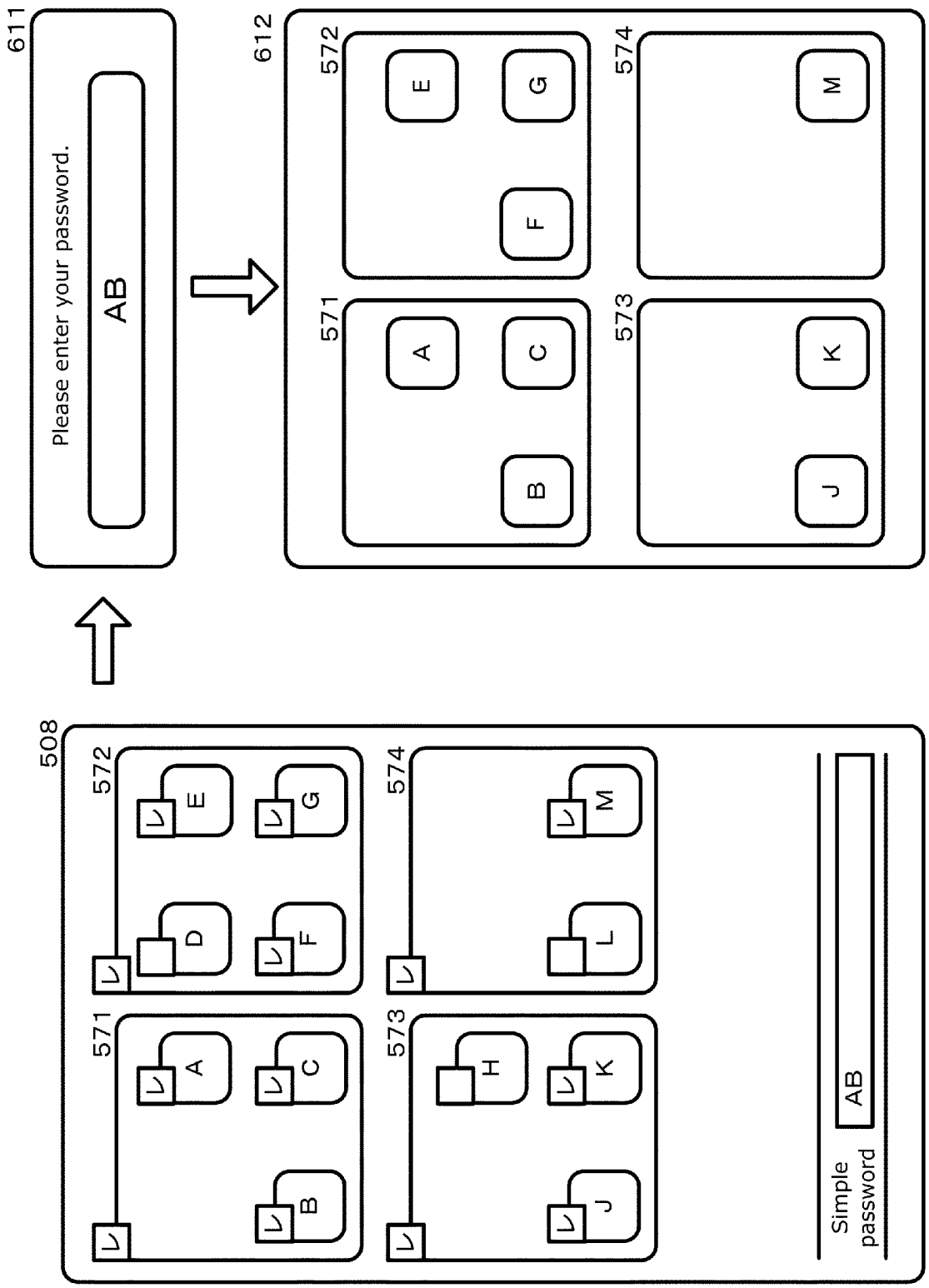
FIG. 6B shows examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.

FIG. 6A and FIG. 6B show examples of screens in which a password generated in accordance with an embodiment of the present invention is entered, and the object icons of objects available to the user on the basis of the entered password are displayed on the screen, or objects available to the user on the basis of the degree of simplicity of the password are displayed on the object icons.

The screen (502) shown in FIG. 6A is the same screen (502) shown in FIG. 5A. When screen (502) is mentioned below, it refers to screen (502) shown in FIG. 6A.

The user wishes to use an object available on screen (502). The user then completes the process of generating a simple password in accordance with an embodiment of the present invention.

The electronic device responds to the user calling up the screen for entering the simple password by displaying the simple password input screen (601).

The user enters the simple password "as" (half-width, lower case characters) into the electronic device.

The electronic device receives the entered character string "as", and verifies that the entered character string matches the registered simple password "as".

In response to the entered character string matching the registered simple password "as", the electronic device generates an initial display screen including the objects available to the user at the current degree of simplicity, and displays the initial display screen on the display device. The initial display screen includes application icons for three applications (511, 512, 513), object icons for objects A, B and C available to application (511), an object icon for objects E, F and G available to application (512), and object icons for object J and object K available to application (513).

Screen (602) shows the initial display screen. Object icons for objects not available to the user at the current degree of simplicity are not included in the initial display screen.

The screen (508) shown in FIG. 6B is the same screen (508) shown in FIG. 5D. When screen (508) is mentioned below, it refers to screen (508) shown in FIG. 6B.

The user wishes to use an object available on screen (508). The user then completes the process of generating a simple password in accordance with an embodiment of the present invention.

The electronic device response to the user calling up the screen for entering the simple password by displaying the simple password input screen (611).

The user enters the simple password "AB" (half-width, upper case characters) into the electronic device.

The electronic device receives the entered character string "AB", and verifies that the entered character string matches the registered simple password "AB".

In response to the entered character string matching the registered simple password "AB", the electronic device generates an initial display screen including the objects available to the user at the current degree of simplicity, and displays the initial display screen on the display device. The initial display screen includes application icons for four applications (571, 572, 573, 574), object icons for objects A, B and C available to application (571), object icon for objects E, F and G available to application (572), object icons for object J and object K available to application (573), and an object icon for object M available to application (574).

Screen (612) shows the initial display screen. Object icons for objects not available to the user at the current degree of simplicity are not included in the initial display screen. Also, there are no checkboxes for object icons on the initial display screen.

Figure 7A:
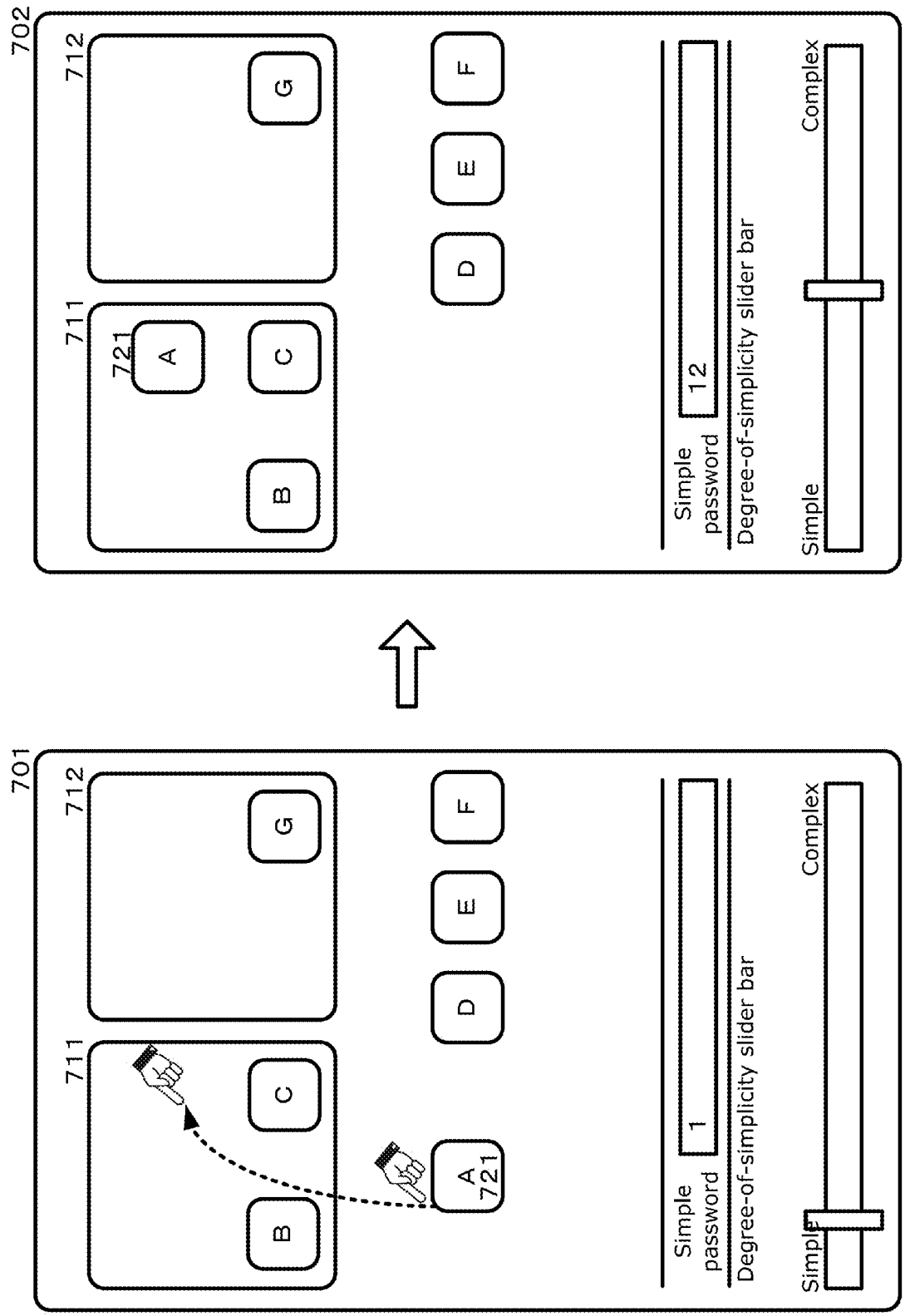
FIG. 7A shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon and on the basis of the degree of simplicity associated with each of the available objects.
Figure 7B:
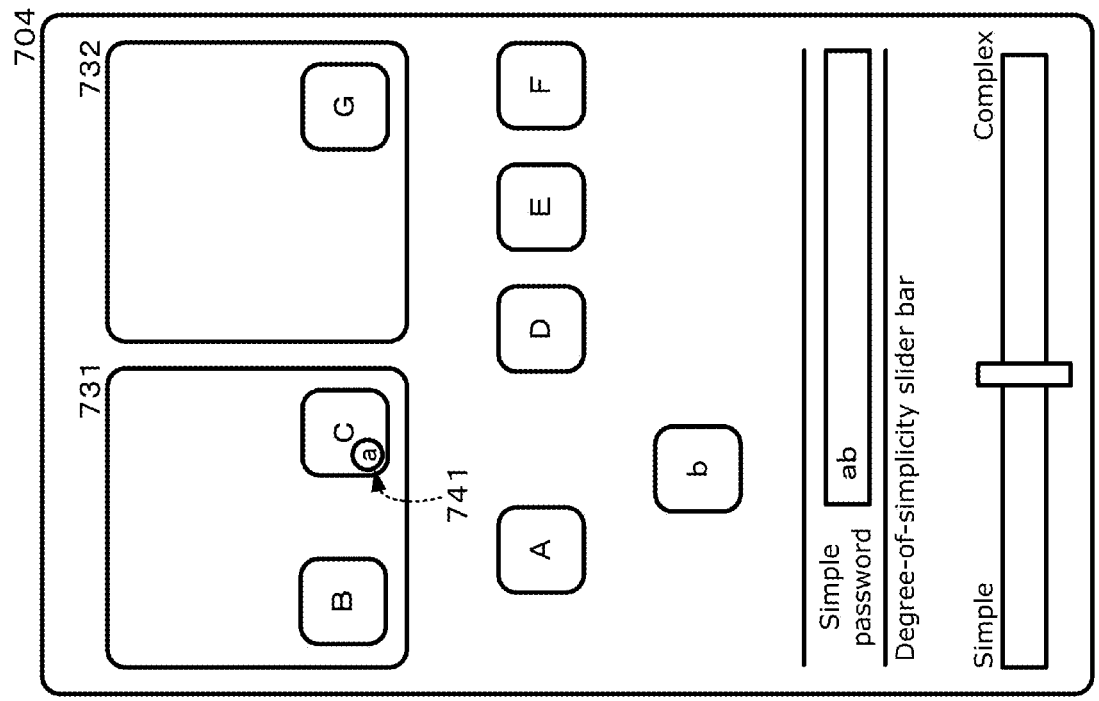
FIG. 7B shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon for an available object and on the basis of the degree of simplicity associated with each of the available objects.
Figure 7B:
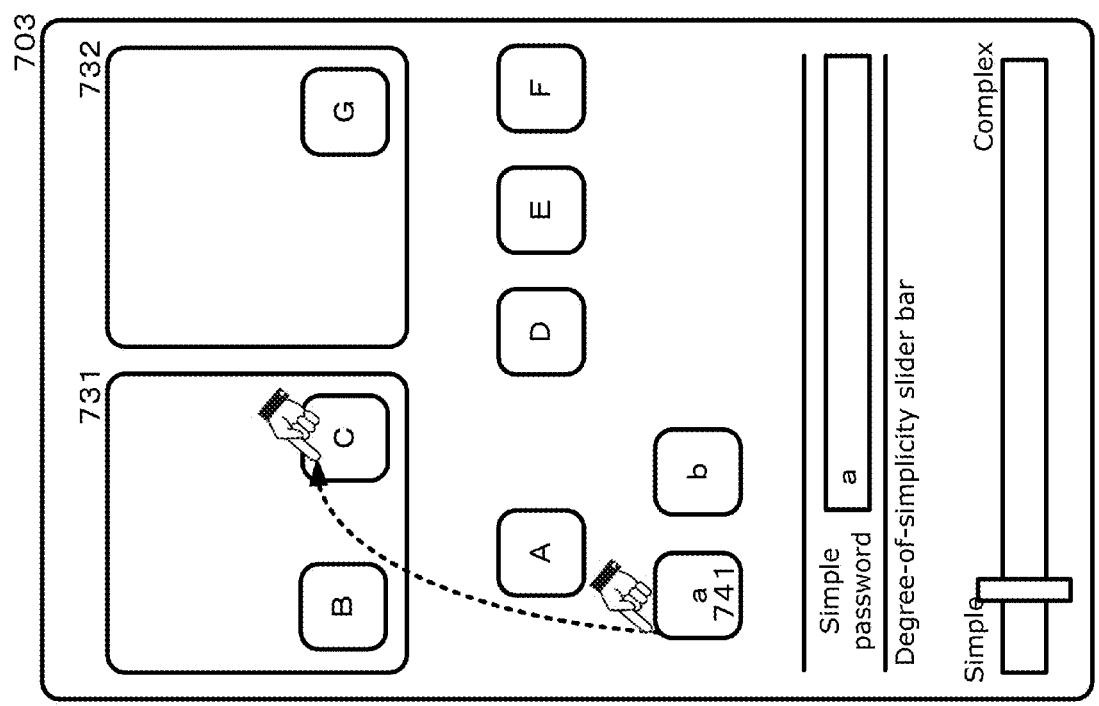
Figure 7C:
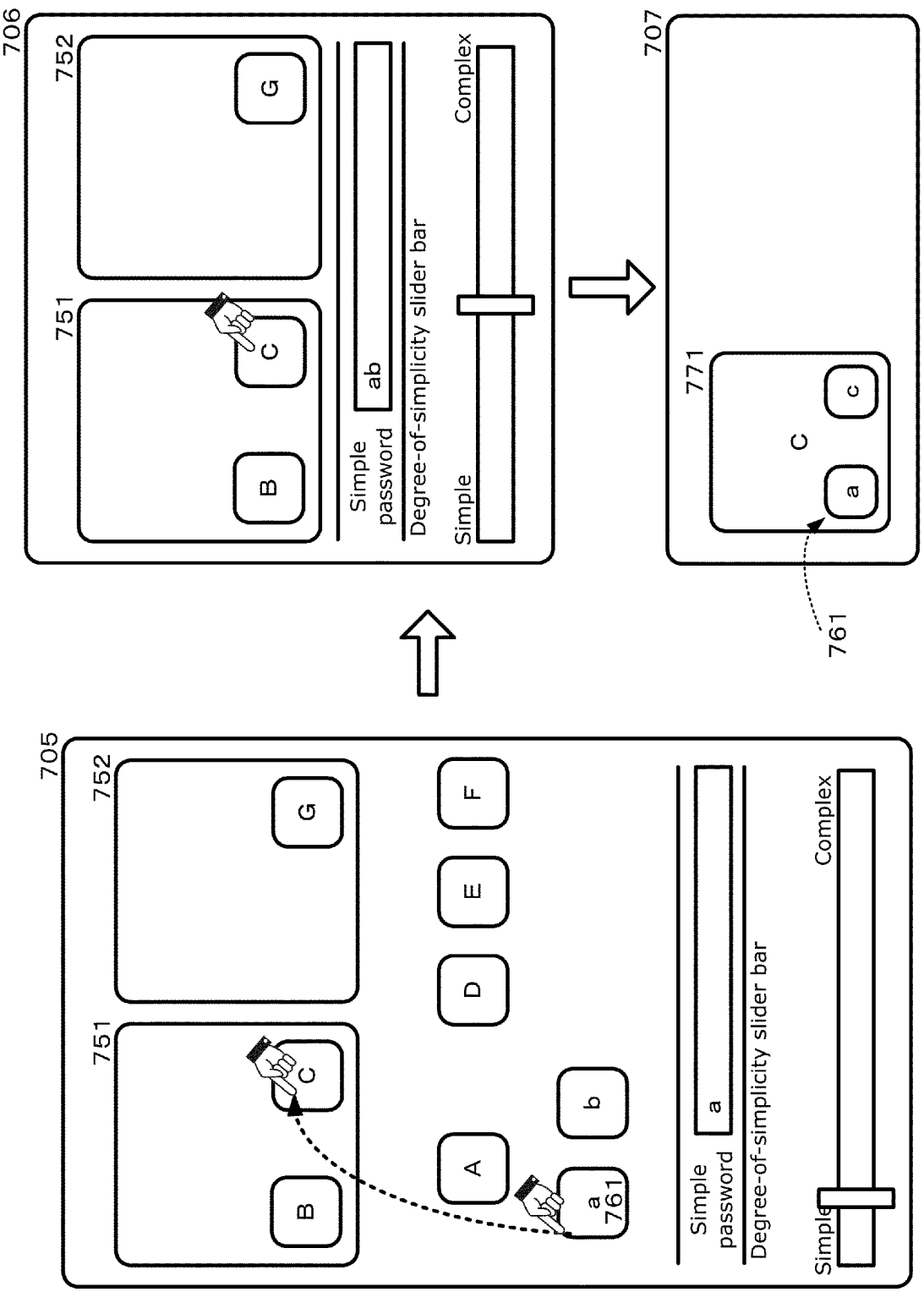
FIG. 7C shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon for an available object and on the basis of the degree of simplicity associated with each of the available objects.

FIG. 7A through FIG. 7C show embodiments of the present invention in which a slider bar enabling the degree of simplicity for a password to be established is used to establish (or change) the degree of simplicity for a password, and the electronic device then recalculates the degree of simplicity of the passwords of the entire device, and generates passwords in accordance with the recalculated degree of simplicity in response to the user dragging and dropping the object icons for objects to be used to a predetermined location or onto other object icons.

FIG. 7A shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon and on the basis of the degree of simplicity associated with each of the available objects.

The user enters the usual password in the electronic device, and the electronic device verifies the usual password that has been entered. When verification of the password has been successful, the electronic device displays a screen enabling the degree of simplicity to be set for a password in response to the menu for setting the degree of simplicity for a password having been called up.

Screen (701) shows the screen after the degree of simplicity has been established for the password using the slider bar.

The screen (701) shows the slider bar used to establish the degree of simplicity for the password, the simple password generated based on the degree of simplicity established by moving the slider bar, object icons for objects available to the currently displayed simple password ("1") (half-width) (available objects), and object icons for objects that are unavailable to the currently displayed simple password but would be available if the degree of simplicity were changed (potentially available objects).

The user can select the objects to be used among the potential objects using a pointing device or by performing a touchpad operation. For example, the user wishes to use object A (721). Object A (721) is an object available to object (711) (an application or data). The user drags and drops object A (721) onto object (711).

Screen (702) shows the screen after object A (721) has been dragged and dropped. Objects D, E and F have not been selected by the user.

Screen (702) also shows, as the simple password corresponding to the degree of simplicity after each object has been dragged and dropped, the two consecutive numbers "12" (half-width). The electronic device calculates a degree of simplicity for the entire device based on the degree of simplicity associated with each of the objects available on the electronic device, and generates simple passwords on the basis of the recalculated degree of simplicity. The slider bar is automatically moved in response to the recalculated degree of simplicity.

The simple password ("12") generated by the selection of objects to be used is longer than the simple password ("1") prior to the drag-and-drop operation (but still simpler than the usual password). In other words, when objects to be used are added, the electronic device may generate longer simple passwords in response to the degree of simplicity associated with the added objects. Conversely, when objects are deleted or moved so as to no longer be available, the electronic device may generate shorter simple passwords in response to the degree of simplicity associated with the deleted or moved objects.

In the embodiment shown in FIG. 7A, as mentioned above, the electronic device recalculates the degree of simplicity for the entire device and generates a simple password in response to the recalculated degree of simplicity on the basis of the degree of simplicity associated with each of the objects available on the device after the degree of simplicity or the password has been established using the slider bar, and objects to be used have been dragged and dropped on a specific location or on top of another object icon.

FIG. 7B shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon for an available object and on the basis of the degree of simplicity associated with each of the available objects.

The user enters the usual password in the electronic device, and the electronic device verifies the usual password that has been entered. When verification of the password has been successful, the electronic device displays a screen enabling the degree of simplicity to be set for a password in response to the menu for setting the degree of simplicity for a password having been called up.

Screen (703) shows the screen after the degree of simplicity has been established for the password using the slider bar.

The screen (703) shows the slider bar used to establish the degree of simplicity for the password, the simple password generated based on the degree of simplicity established by moving the slider bar, object icons for objects available to the currently displayed simple password ("a") (half-width, lower case) (available objects), and object icons for objects that are unavailable to the currently displayed simple password but would be available if the degree of simplicity were changed (potentially available objects).

The user can select the objects to be used among the potential objects using a pointing device or by performing a touchpad operation. For example, the user wishes to use object a (741). Object a (741) is an object available to object C, which is available in turn to object (731) (an application or data). The user drags and drops object a (741) onto object C.

Screen (704) shows the screen after object a (741) has been dragged and dropped. Objects A, D, E and F have not been selected by the user.

Screen (704) shows the object icon for object a (741) on top of the object icon for object C in order to make object a (741) available by means of object C.

Screen (704) also shows, as the simple password corresponding to the degree of simplicity after each object has been dragged and dropped, the two consecutive numbers "ab" (half-width, lower case). The electronic device calculates a degree of simplicity for the entire device based on the degree of simplicity associated with each of the objects available on the electronic device, and generates simple passwords on the basis of the recalculated degree of simplicity. The slider bar is automatically moved in response to the recalculated degree of simplicity.

The simple password ("ab") generated by the selection of objects to be used is longer than the simple password ("a") prior to the drag-and-drop operation (but still simpler than the usual password). In other words, when objects to be used are added, the electronic device may generate longer simple passwords in response to the degree of simplicity associated with the added objects. Conversely, when objects are deleted or moved so as to no longer be available, the electronic device may generate shorter simple passwords in response to the degree of simplicity associated with the deleted or moved objects.

In the embodiment shown in FIG. 7B, as mentioned above, the electronic device recalculates the degree of simplicity for the entire device and generates a simple password in response to the recalculated degree of simplicity on the basis of the degree of simplicity associated with each of the objects available on the device after the degree of simplicity or the password has been established using the slider bar, and objects to be used have been dragged and dropped on a specific location or on top of another object icon.

FIG. 7C shows an embodiment of the present invention in which the slider bar enabling the degree of simplicity for a password to be established is used to establish the degree of simplicity for a password, and the electronic device then recalculates the degree of simplicity of the passwords of the entire device, and generates passwords in accordance with the recalculated degree of simplicity in response to the user dragging and dropping the objects to be used onto another object icon for an available object and on the basis of the degree of simplicity associated with each of the available objects.

The user enters the usual password in the electronic device, and the electronic device verifies the usual password that has been entered. When verification of the password has been successful, the electronic device displays a screen enabling the degree of simplicity to be set for a password in response to the menu for setting the degree of simplicity for a password having been called up.

Screen (705) shows the screen after the degree of simplicity has been established for the password using the slider bar.

The screen (705) shows the slider bar used to establish the degree of simplicity for the password, the simple password generated based on the degree of simplicity established by moving the slider bar, object icons for objects available to the currently displayed simple password ("a") (half-width, lower case) (available objects), and object icons for objects that are unavailable to the currently displayed simple password but would be available if the degree of simplicity were changed (potentially available objects).

The user can select the objects to be used among the potential objects using a pointing device or by performing a touchpad operation. For example, the user wishes to use object a (761). Object a (761) is an object available to object C, which is available in turn to object (751) (an application or data). The user drags and drops object a (761) onto object C.

Screen (706) shows the screen after object a (761) has been dragged and dropped. Objects A, D, E and F have not been selected by the user.

Object a (741) is available to object C, but the object icon for object a (741) is not displayed on the screen (706). However, when the user clicks or double-clicks on the object icon for object C, the electronic device expands the object icon for object C to show the icon for object a (741) on the expanded object icon.

Screen (707) shows the screen with the expanded object icon for object C. The object icons for object a (741) and object c are shown on top of the object icon for object C. In this way, the user knows that object a (741) and object c are available to object C.

Screen (706) also shows, as the simple password corresponding to the degree of simplicity after each object has been dragged and dropped, the two consecutive numbers "ab" (half-width, lower case). The electronic device calculates a degree of simplicity for the entire device based on the degree of simplicity associated with each of the objects available on the electronic device, and generates simple passwords on the basis of the recalculated degree of simplicity. The slider bar is automatically moved in response to the recalculated degree of simplicity.

The simple password ("ab") generated by the selection of objects to be used is longer than the simple password ("a") prior to the drag-and-drop operation (but still simpler than the usual password). In other words, when objects to be used are added, the electronic device may generate longer simple passwords in response to the degree of simplicity associated with the added objects. Conversely, when objects are deleted or moved so as to no longer be available, the electronic device may generate shorter simple passwords in response to the degree of simplicity associated with the deleted or moved objects.

In the embodiment shown in FIG. 7C, as mentioned above, the electronic device recalculates the degree of simplicity for the entire device and generates a simple password in response to the recalculated degree of simplicity on the basis of the degree of simplicity associated with each of the objects available on the device after the degree of simplicity or the password has been established using the slider bar, and objects to be used have been dragged and dropped on a specific location or on top of another object icon.

Figure 8:
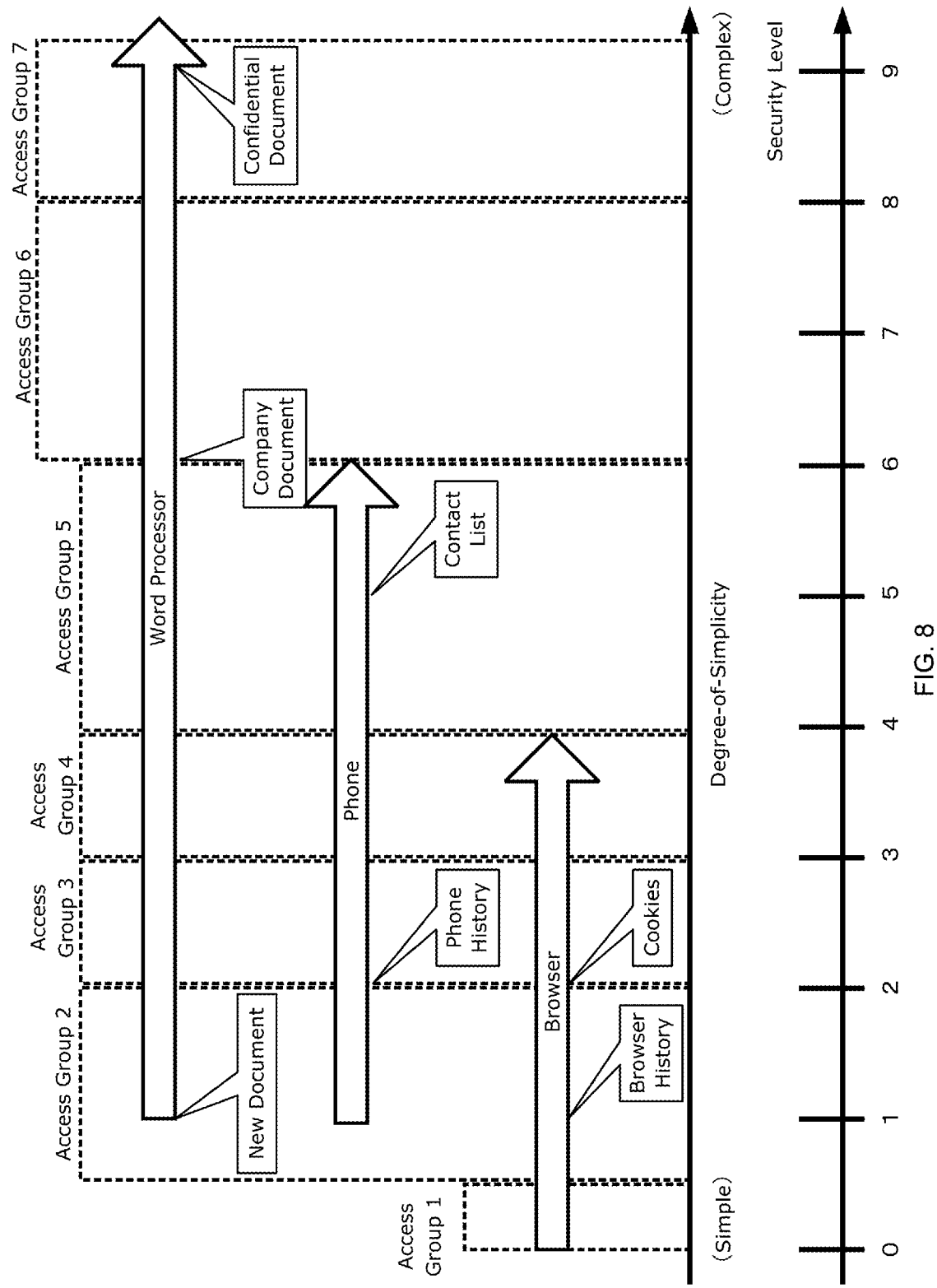
FIG. 8 is a schematic diagram showing the relationship between password degree of simplicity and the security level, and the relationship between password degree of simplicity or security level and the access group that can be used in an embodiment of the present invention.

FIG. 8 is a schematic diagram showing the relationship between password degree of simplicity and the security level, and the relationship between password degree of simplicity or security level and the access group that can be used in an embodiment of the present invention.

The degree of simplicity of the password (Password Simplicity, PS) corresponds to the range from "simple" to "complex" on the slider bar. The degree of simplicity for the password may also be established using numerical values in which a higher value indicates a more complex password, for example, nine stages from 0 to 9. The degree of simplicity for the password may be represented by "Simple (0) to Complex (9)". The degree of simplicity for the password is not limited to nine stages. For example, there may be only two or three discrete stages.

A security level (SL) is established for each object. The security levels may correspond to the degrees of password simplicity. When the security levels correspond to the degrees of password simplicity (SL=PS), the security levels for each object may be represented by "Low (0) to High (9)".

The security levels for objects may be established in the following manner.
(1) For objects that are applications:
Browser application (SL=0);
Phone application (SL=1);
Word processing application (SL=1)

(2) For objects that are data content:
Browser history (including URLs and number of visits) (SL=1);
Cookies (SL=2);
Phone history (including names, phone numbers, call dates, call times, and number of calls) (SL=2);
Phone directory (including names, phone numbers, addresses, and postal codes) (SL=5);
Newly created documents (SL=1);
Company documents (SL=6);
Confidential documents (SL=9)

When the security levels correspond to degrees of password simplicity, security levels and passwords may be mapped as follows: if SL=0, then password="1"; if SL=1, then password="A"; if SL=2, then password="12"; if SL=3, then password="AB"; if SL=4, then password="123"; if SL=5, then password="ABC"; if SL=6, then password="CAT"; etc. As shown in this example, the number of characters does not have to increase as the degree of password simplicity becomes more complex. The number of characters can remain the same, but the character type may vary among numbers, letters, and kana.

Each object can also be associated with a certain access group. Access groups indicate the objects that are available at a given security level. When the degree of simplicity is calculated for the entire electronic device, access groups are used to determine the objects that are available at the calculated degree of simplicity.

The access groups may be established as follows.
(1) Access Group 1 (SL=0 to 0.5)
Browser app (SL=0)
(2) Access Group 2 (0.5≤SL<2)
Browser app (SL=0)+browser history (SL=1), or SL=0+1=1
Phone app (SL=1)
(3) Access Group 3 (2≤SL<3)
Word processing app (SL=1)+new doc (SL=1), or SL=1+1=2
Brower app+(SL=0)+cookies (SL=2), or SL=0+2=2
(4) Access Group 4 (SL=MAX(2,3)=3)
Phone app (SL=1)+phone history (SL=2), or SL=1+2=3
(5) Access Group 5 (4≤SL<6)
(6) Access Group 6 (6≤SL<8)
(7) Access Group 7 (SL≥9)

Figure 9A:
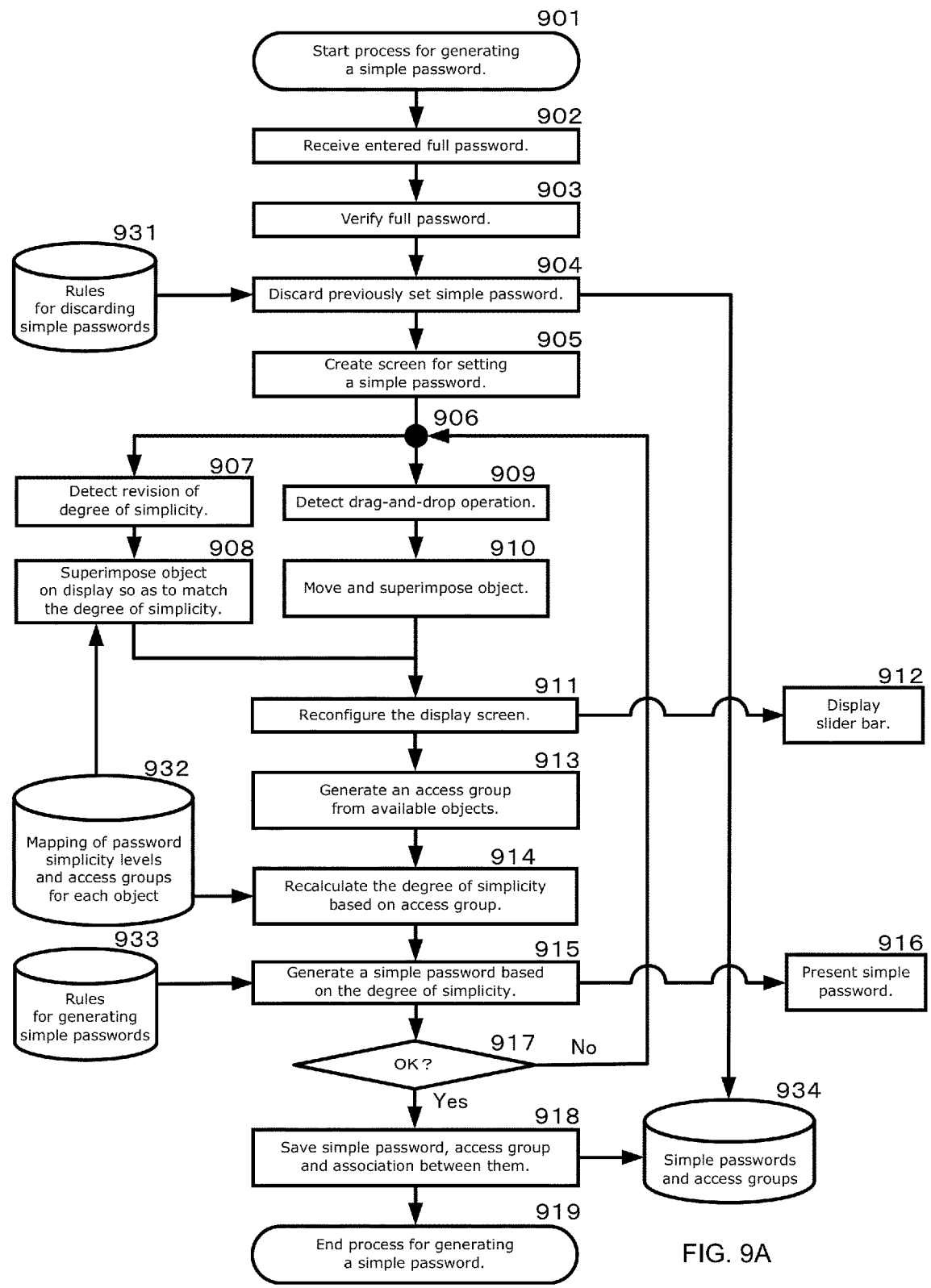
FIG. 9A is a flowchart of the process performed to generate a password in accordance with an embodiment of the present invention.

FIG. 9A is a flowchart of the process performed to generate a password in accordance with an embodiment of the present invention.

In Step 901, the electronic device starts the process of generating a simple password.

In Step 902, the electronic device waits for the user to enter a full password to unlock the electronic device. The electronic device proceeds to Step 903 when a full password has been entered.

In Step 903, the electronic device verifies whether or not the character string entered in Step 902 matches the registered full password. When the entered character string matches the registered full password, the electronic device proceeds to Step 904.

In Step 904, the electronic device determines whether or not a simple password has already been established. When a simple password has already been established, the electronic device references the simple password discard rules (931). When a previously established simple password has to be discarded under the simple password discard rules (931), the electronic device discards the previously established simple password. When a previously established simple password does not have to be discarded under the simple password discard rules (931), the electronic device may indicate that the previously established simple password can be used.

The simple password discard rules (931) may be as follows.

(1) When a full password is entered, the previously established simple password is discarded.

(2) When a previously established simple password has been used a predetermined number of times, the simple password is discarded.

In Step 905, the electronic device configures a screen used to set a simple password. The screen used to set a simple password may be a screen that allows the user to use a slider bar to set the degree of simplicity for a password (see, for example, the screens in FIG. 3A through FIG. 3E); a screen that allows the user to select or move the object icons to be used to a specific location or on top of another object icon (see, for example, the screens in FIG. 5A through FIG. 5E); or a combination of these screens (see, for example, the screens in FIG. 7A through FIG. 7C).

When a screen using a slider bar to set the degree of password simplicity is displayed, the slider bar is displayed at the initial degree of simplicity. The initial degree of simplicity may be a default degree of simplicity predetermined by the user or by the electronic device program in the embodiment of the present invention, or may be the degree of simplicity previously set by the user in accordance with the electronic device program in the embodiment of the present invention. On the basis of the initial degree of simplicity, the electronic device may also allow objects available at the initial degree of simplicity to be selected from access groups corresponding to the initial degree of simplicity. The electronic device may then display the object icons for selected objects on the screen or may superimpose the object icons for selected objects on top of the object icons for objects displayed on the screen. Optionally, the electronic device may display objects unavailable at the initial degree of simplicity but potentially available at a changed degree of simplicity in a manner that is different from the objects available at the initial degree of simplicity.

When a screen that allows the user to select or move object icons to be used to a specific location or on top of another object icon is displayed, the electronic device, on the basis of the initial degree of simplicity, may allow objects available at the initial degree of simplicity to be selected from access groups corresponding to the initial degree of simplicity. The initial degree of simplicity may be a default degree of simplicity predetermined by the user or by the electronic device program in the embodiment of the present invention, or may be the degree of simplicity previously set by the user in accordance with the electronic device program in the embodiment of the present invention. The electronic device may then display the object icons for selected objects on the screen or may superimpose the object icons for selected objects on top of the object icons for objects displayed on the screen. Optionally, the electronic device may display objects unavailable at the initial degree of simplicity but potentially available at a changed degree of simplicity in a manner that is different from the objects available at the initial degree of simplicity.

The electronic device may combine each of these screen displays when a screen is to be displayed which allows the user to use a slider bar to set the degree of simplicity for a password, and allows the user to select or move the object icons to be used to a specific location or on top of another object icon.

In Step 906, the electronic device awaits detection of slider bar movement and a change in the degree of simplicity, or detection of object selection or movement. When slider bar movement and a change in the degree of simplicity have been detected, the electronic device proceeds to Step 907. When object selection or movement has been detected, the electronic device proceeds to Step 909.

In Step 907, the electronic device detects the current position of the slider bar in response to the user moving the slider bar. The electronic device then obtains a degree of simplicity by referencing a map of the degree of simplicity associated with the current position of the slider bar and the security level (see 932 in FIG. 8).

In Step 908, the electronic device displays objects on the screen or superimposes objects on top of available objects so as to conform to the degree of simplicity obtained in Step 907.

In Step 909, the electronic device detects the selection or movement of objects by the user. These objects are not available at the currently displayed simple password but are potentially available with a change in the degree of simplicity.

In Step 910, the electronic device displays the objects selected or moved in Step 909 on the destination screen of the objects or superimposes the objects selected or moved in Step 909 on top of the destination objects.

When Step 907 and Step 908 have been performed, the electronic device in Step 911 may reconfigure the display screen so that the object icons of objects potentially available with a permissible change in the degree of simplicity are updated. The electronic device also updates the display so that the degree of simplicity can be set using the slider bar (912).

When Step 909 and Step 910 have been performed, the electronic device in Step 911 may reconfigure the display screen so that the object icons of objects potentially available with a permissible change in the degree of simplicity are updated.

In Step 913, the electronic device generates access groups from all of the objects available to the electronic device (including objects available to other objects).

In Step 914, the electronic device recalculates the degree of simplicity for the entire electronic device from the access groups generated in Step 912. The electronic device recalculates the degree of simplicity using a map (932) with the degree of simplicity and access group of each object.

In Step 915, the electronic device generates a simple password based on the degree of simplicity recalculated in Step 914. Alternatively, the electronic device may generate a simple password based on the degree of simplicity obtained in Step 907. Alternatively, the electronic device may calculate the degree of simplicity for the entire device from the degree of simplicity associated with each object available to the electronic device including objects selected or moved in Step 909, and a simple password may be generated on the basis of the calculated degree of simplicity. The simple password may be generated by the electronic device using simple password generating rules (933). One simple password generating rule (933) may be to specify the degree of simplicity (or password weakness) using linear values.

The electronic device can establish the following control rules for simple passwords when generating simple passwords.

(1) Discard Rules:
  1) A setting can be established to automatically discard simple passwords when the electronic device is unlocked at a high authorization level.
  2) The number of times a simple password can be used (that is, the number of times the password is used to unlock the device) can be set. Here, the value is lower than the number of times the device can be unlocked using an unlocking password. When there are only two passwords, a full password and a simple password, the unlocking password is the full password. When there are multiple simple passwords for different access groups, the unlocking password is the full password or an unlocking simple password.
(2) Number of Input Attempts Rule:
  The number of times a character string can be entered to unlock the device (that is, a lockout threshold value) may be established.
(3) Effective Period Rule:
  This period can be shorter than the lockout period established for the unlocking password.
(4) Number of Simple Passwords Generated:
  The number of times a simple password different from the security level can be generated may be established.

In Step 916, the electronic device presents the simple password generated in Step 915. The simple password may be displayed on the screen, the simple password may be uttered by voice software, the simple password may be sent to an email account, or the simple password may be provided in an image or video.

In Step 917, the electronic device responds to user confirmation of the degree of simplicity (for example, by pressing a confirmation button for the simple password) by proceeding to Step 918. The electronic device responds to non-confirmation of the degree of simplicity of the user (for example, by moving the slider bar to another position or by selecting or moving more objects) by returning to Step 906.

In Step 918, the electronic device stores the simple password generated in Step 915 in a database (934) used to store simple passwords. Alternatively, in Step 918, the electronic device associates the simple password generated in Step 915 with the access groups generated in Step 913, and stores the association of the simple passwords with the access group in a database (934) used to store associations.

In Step 919, the electronic device ends the process of generating a simple password.

Figure 9B:
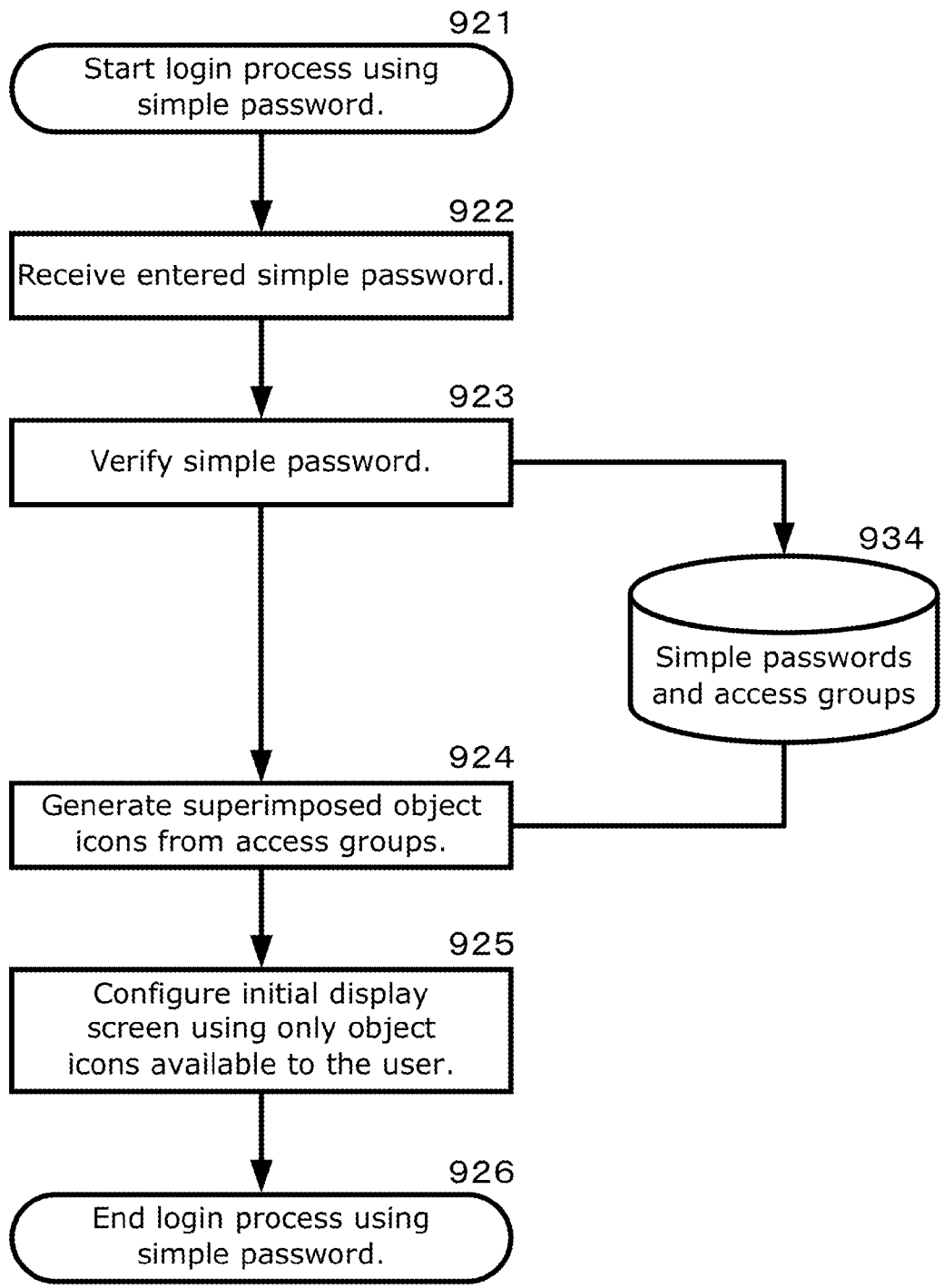
FIG. 9B is a flowchart of the process performed to log in using a password generated in accordance with the embodiment of the present invention shown in FIG. 9A.

FIG. 9B is a flowchart of the process performed to log in using a password generated in accordance with the embodiment of the present invention.

In Step 921, the electronic device starts the process of logging into the electronic device using a simple password.

In Step 922, the electronic device awaits entry of a simple password. In response to the user entering a simple password, the electronic device advances to Step 923.

In Step 923, the electronic device verifies whether or not the character string entered in Step 922 matches a simple password registered in the database (934) used to store simple passwords. When the character string matches a simple password registered in the database (934), the electronic device proceeds to Step 924.

In Step 924, the electronic device extracts access groups on the basis of the degree of simplicity corresponding to the verified simple password. When an object belonging to the extracted access group is available to another object, the electronic device generates an object icon that is superimposed on the object icon of the other object.

In Step 925, the electronic device displays object icons of the objects belonging to the extracted access group on the screen or superimposes the object icons of the objects belonging to the extracted access group on object icons located on the screen. The electronic device then configures the initial display screen with only those object icons available to the user.

In Step 926, the electronic device ends the process of logging into the electronic device using a simple password.

Figure 10A:
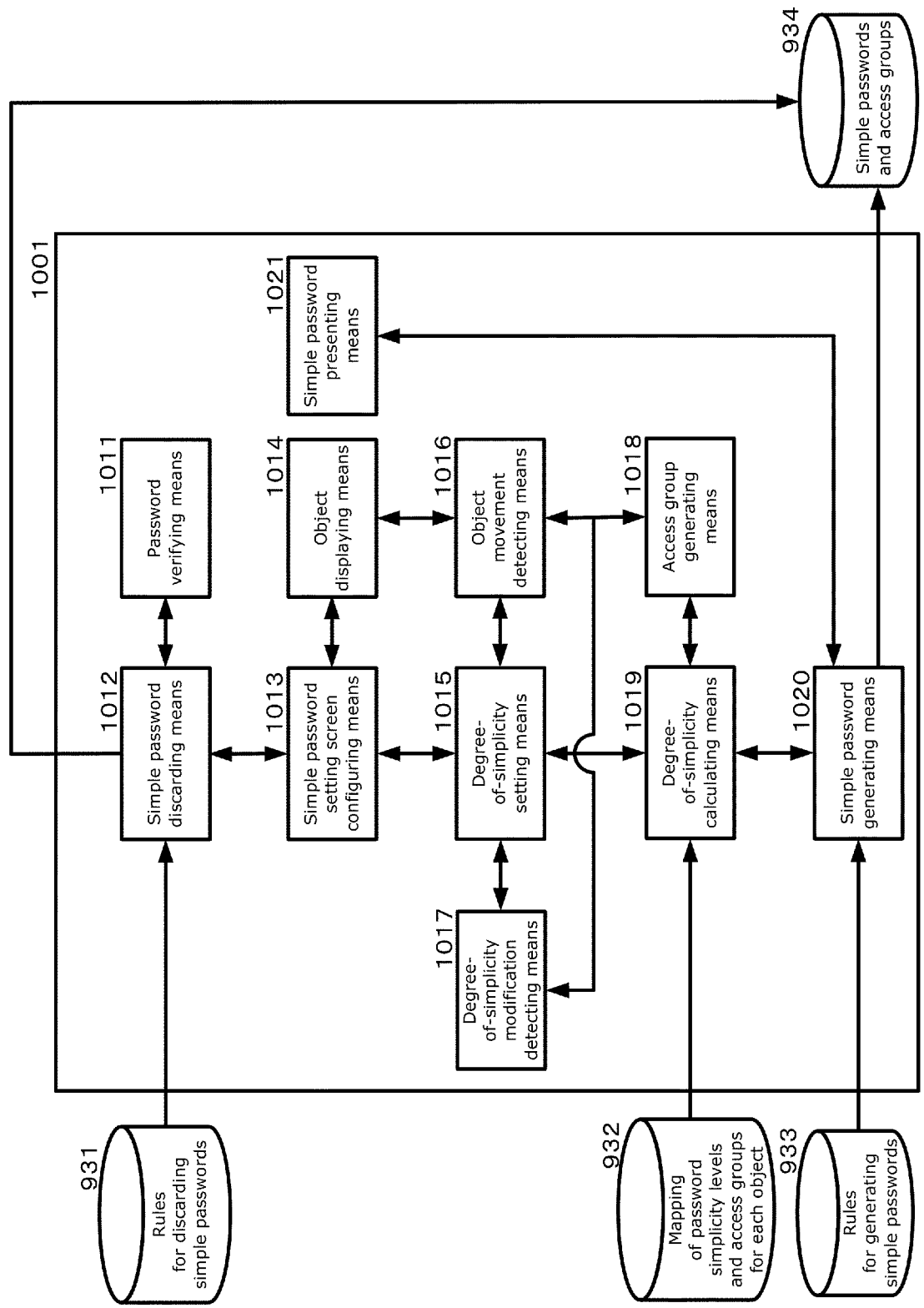
FIG. 10A is a function block diagram of an electronic device used to generate a password in accordance with an embodiment of the present invention, the electronic device preferably including the hardware configuration shown in FIG. 1A or FIG. 1B.

FIG. 10A is a function block diagram of an electronic device used to generate a password in accordance with an embodiment of the present invention, the electronic device preferably including the hardware configuration shown in FIG. 1A or FIG. 1B.

The electronic device (1001) includes a password verifying means (1011), a simple password discarding means (1012), a simple password setting screen configuring means (1013), an object displaying means (1014), a degree-of-simplicity setting means (1015), an object movement detecting means (1016), a degree-of-simplicity modification detecting means (1017), an access group generating means (1018), a degree-of-simplicity calculating means (1019), a simple password generating means (1020), and a simple password presenting means (1021).

The password verifying means (1011) waits for the user to enter a full password to unlock the electronic device. When a full password has been entered, the password verifying means (1011) verifies whether or not the entered character string matches the registered full password.

When a simple password has already been established and the previously established simple password has to be discarded under the simple password discard rules (931), the simple password discarding means (1012) discards the previously established simple password.

The simple password setting screen configuring means (1013) configures a screen for setting a simple password (see, for example, the screens shown in FIG. 3A through FIG. 3E, the screens shown in FIG. 5A through FIG. 5E, and the screens shown in FIG. 7A through FIG. 7C).

The object displaying means (1014) displays objects on the screen of the display device (106, 126). The objects are primary objects, secondary objects available to primary objects, or a combination of these objects.

The object displaying means (1014) also superimposes the secondary object icon of at least one secondary object available to a primary object on top of the primary object icon of the primary object.

The object displaying means (1014) also superimposes a display indicating whether or not a superimposed secondary object is available, based on the degree of simplicity, on top of the superimposed secondary object icon.

The object displaying means (1014) also changes the superimposed secondary object icon so as to differentiate the availability of superimposed secondary objects on the basis of the degree of simplicity.

The object displaying means (1014) also displays a degree of simplicity setting display (for example, a sliding bar) enabling the degree of simplicity for the password to be changed.

The object displaying means (1014) also dynamically changes either the display indicating whether or not the superimposed secondary object is available on the basis of the degree of simplicity, or the display indicating whether or not the primary object is available on the basis of the degree of simplicity.

The object displaying means (1014) also dynamically changes the superimposed secondary object icon so as to differentiate the availability of the superimposed secondary object on the basis of the degree of simplicity, or the primary object icon so as to differentiate the availability of the primary object on the basis of the degree of simplicity.

The object displaying means (1014) also dynamically changes, in response to the degree of simplicity detected by the degree of simplicity setting means (1015), either the display indicating whether or not the superimposed secondary object is available on the basis of the degree of simplicity, or the display indicating whether or not the primary object is available on the basis of the degree of simplicity.

The object displaying means (1014) also dynamically changes, in response to the degree of simplicity detected by the degree of simplicity setting means (1015), the superimposed secondary object icon so as to differentiate the availability of the superimposed secondary object on the basis of the degree of simplicity, or the primary object icon so as to differentiate the availability of the primary object on the basis of the degree of simplicity.

The object displaying means (1014) also changes, in response to a secondary object icon having been moved onto a primary object icon, the display indicating whether or not the superimposed secondary object is available on the basis of the degree of simplicity.

The object displaying means (1014) also dynamically changes, in response to a secondary object icon having been moved onto a primary object icon, the superimposed secondary object icon so as to differentiate the availability of the superimposed secondary object on the basis of the degree of simplicity.

The object displaying means (1014) also superimposes and displays a tertiary object icon for at least one tertiary object available to a secondary object on top of an expanded secondary object icon in response to the expanded display of the secondary object icon.

The degree of simplicity setting means (1015) enables the user to set (or change) the degree of simplicity for a password.

The object movement detecting means (1016) recalculates the degree of simplicity for the entire electronic device on the basis of the degree of simplicity associated with each object available to the electronic device in response to the user selecting or moving an object which is not available using the currently displayed simple password but is potentially available with a change in the degree of simplicity.

The degree of simplicity modification detecting means (1017) responds to the user moving the slider bar by detecting the current position of the status bar and calculating the degree of simplicity after the change. The degree of simplicity modification detecting means (1017) also responds to the user again moving the slider bar by detecting the current position of the status bar and calculating the degree of simplicity after the change.

The degree of simplicity modification detecting means (1017) also detects the changed degree of simplicity for a simple password.

The access group generating means (1018) generates access groups from all objects available to the electronic device (including objects available to other objects).

The degree of simplicity calculating means (1019) calculates the degree of simplicity so as to enable a moved secondary object to be available in response to a secondary object icon having been moved onto a primary object icon.

The degree of simplicity calculating means (1019) also calculates the degree of simplicity so the security level associated with the moved secondary object satisfies the security level associated with the established degree of simplicity.

The degree of simplicity calculating means (1019) also calculates the degree of simplicity so as to make a selected or changed secondary or primary object available in response to the object icon of a secondary or primary object unavailable on the basis of the established degree of simplicity having been selected, The degree of simplicity calculating means (1019) also calculates the degree of simplicity so as to make a selected or changed secondary or primary object available in response to a display on an icon indicating whether or not an unavailable secondary or primary object is available on the basis of the established degree of simplicity having been changed to available on the basis of the degree of simplicity.

The degree of simplicity calculating means (1019) also calculates the degree of simplicity so the security level associated with the selected or changed secondary or primary object or a security level calculated using a combination thereof satisfies the security level associated with the established degree of simplicity.

The simple password generating means (1020) generates a password in accordance with the degree of simplicity established by the degree of simplicity setting means (1015) or the degree of simplicity generated by the degree of simplicity calculating means (1019).

The simple password generating means (1020) also generates multiple simple passwords. These simple passwords may include a first simple password valid in a first environment, a second simple password valid in a second environment, and an nth password for an nth environment (where n is a positive integer).

The simple password presenting means (1021) presents to the user a simple password generated by the simple password generating means (1020).

The password verifying means (1011) may execute Step 902 and Step 903 in FIG. 9A. The simple password discarding means (1012) may execute Step 904 in FIG. 9A. The simple password setting screen configuring means (1013) may execute Step 905 in FIG. 9A. The degree of simplicity change detecting means (1017) may execute Step 906 and Step 907 in FIG. 9A. The object movement detecting means (1016) may execute Step 906 and Step 909 in FIG. 9A. The object displaying means (1014) may execute Step 908, Step 910, Step 911, and Step 912 in FIG. 9A. The access group generating means (1018) may execute Step 913 in FIG. 9A. The degree of simplicity calculating means (1019) may execute Step 914 in FIG. 9A. The simple password generating means (1020) may execute Step 915 in FIG. 9A. The simple password presenting means (1021) may execute Step 916 in FIG. 9A.

Figure 10B:
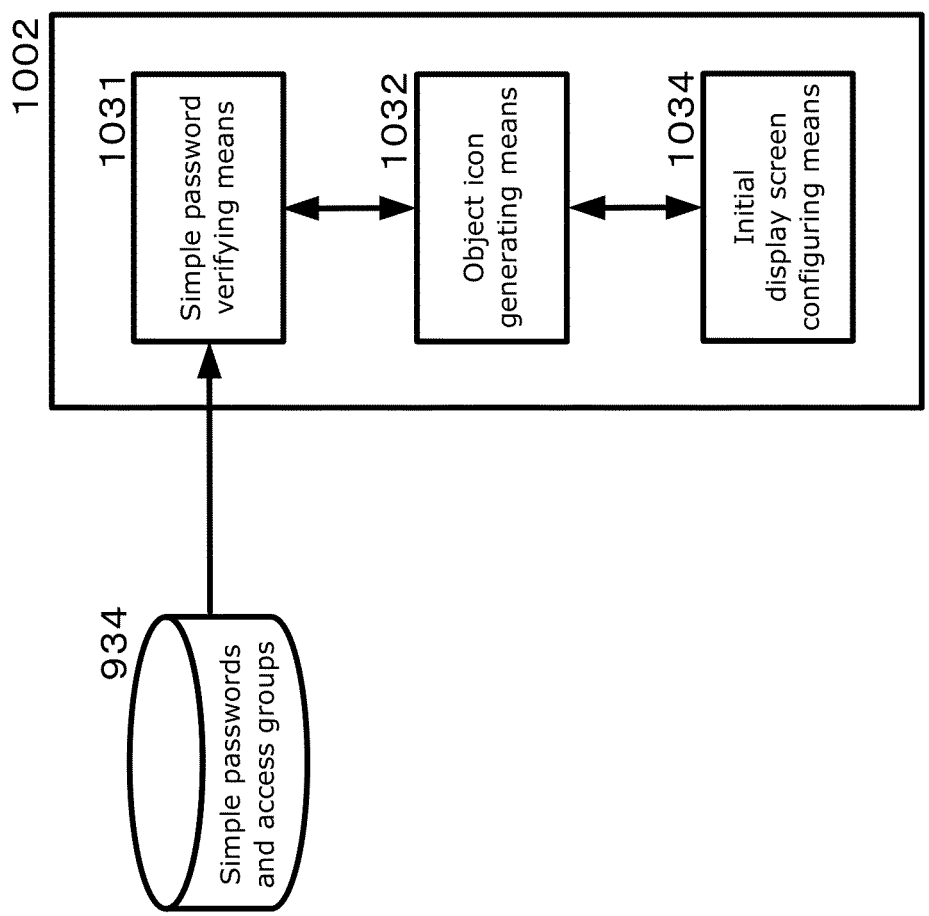
FIG. 10B is a function block diagram of an electronic device used to enter a password generated in accordance with an embodiment of the present invention in order to display objects available to the entered password and to use these objects, the electronic device preferably including the hardware configuration shown in FIG. 1A or FIG. 1B.

FIG. 10B is a function block diagram of an electronic device used to enter a password generated in accordance with an embodiment of the present invention in order to display objects available to the entered password and to use these objects, the electronic device preferably including the hardware configuration shown in FIG. 1A or FIG. 1B.

The electronic device (1002) is the same electronic device (1001) shown in FIG. 10A.

The electronic device (1002) includes a simple password verifying means (1031), an object icon generating means (1032), and an initial display screen configuring means (1034).

The simple password verifying means (1031) waits for the user to enter a simple password to unlock the electronic device. When a simple password has been entered, the simple password verifying means (1031) references the database (934) used to store simple passwords, and verifies whether or not the entered character string matches a simple password registered with the database (934) used to store simple passwords.

The object icon generating means (1032) extracts access groups on the basis of the degree of simplicity corresponding to the verified simple password. When an object belonging to the extracted access group is available to another object, the electronic device generates an object icon that is superimposed on the object icon of the other object.

The initial display screen configuring means (1034) displays object icons of the objects belonging to the extracted access group on the screen or superimposes the object icons of the objects belonging to the extracted access group on object icons located on the screen.

Also, the initial display screen configuring means (1034) configures the initial display screen using only those object icons available to the user.

The simple password verifying means (1031) may execute Step 922 and Step 923 in FIG. 9B. The object icon generating means (1032) may execute Step 924 in FIG. 9B. The initial display screen configuring means (1034) may execute Step 925 in FIG. 9B.

What is claimed is:

1. A method for generating a password by an electronic device, the method comprising:
    displaying, on an electronic display, a first object, the display of the first object including second objects available to the first object;
    enabling a degree of simplicity to be set for the password by executing one or more steps comprising displaying a degree of simplicity setting display to enable the degree of simplicity for the password to be changed;
    superimposing displays of secondary object icons of at least one of the second objects available to the first object on top of a first object icon of the first object to indicate whether the secondary object is available based on the degree of simplicity;
    dynamically changing, in response to a change in the degree of simplicity established in the degree of simplicity setting display, at least one of (i) the display indicating whether or not the secondary objects is available on the basis of the degree of simplicity, and (ii) a display indicating whether or not the first object is available on the basis of the degree of simplicity; and
    generating the password in accordance with the degree of simplicity.

2. The method according to claim 1, further comprising:
    detecting a changed degree of simplicity for the password;
    dynamically changing, in response to the detected degree of simplicity, at least one of (i) the display indicating whether or not the secondary object is available on the basis of the degree of simplicity, and (ii) the display indicating whether or not the first object is available on the basis of the degree of simplicity; and
    changing the password in accordance with the changed degree of simplicity.

3. The method according to claim 1, wherein enabling a degree of simplicity to be set for a password further comprises calculating the degree of simplicity so as to enable a moved second object to be available in response to a secondary object icon having been moved onto a first object icon.

4. The method according to claim 3, further comprising:
    dynamically changing, in response to the secondary object icon having been moved onto the first object icon, the display indicating whether or not the second object is available on the basis of the degree of simplicity.

5. The method according to claim 3, wherein calculating the degree of simplicity further comprises:
calculating the degree of simplicity so a security level associated with the moved second object satisfies the security level associated with the established degree of simplicity.

6. The method according to claim 3, wherein calculating the degree of simplicity further comprises:
calculating a security level based on a security level determined by at least one of (i) the moved second object, and the first object so that the calculated security level satisfies a security level associated with the established degree of simplicity.

7. The method according to claim 1, wherein the display indicating availability on the basis of the degree of simplicity is a checkbox, the display indicating that second objects are available on the basis of the degree of simplicity is the checkbox having been turned on, and the display indicating that second objects are not available on the basis of the degree of simplicity is the checkbox having been turned off.

8. The method according to claim 1, further comprising:
changing a color of the displays of the superimposed secondary object icons to indicate whether second objects associated with the superimposed displays of the secondary object icons are available.

9. The method according to claim 1, wherein the electronic device further executes a step of displaying a tertiary object icon for at least one tertiary object available to a second object on top of an expanded secondary object icon in response to an expanded display of the secondary object icon.

10. The method according to claim 1, wherein the first object or the second objects available on the basis of an established degree of simplicity, or a combination thereof, form an access group, and a security level associated with the first object belonging to the access group, the security level associated with the second objects belonging to the access group, or a security level calculated on the basis of a combination thereof satisfies a security level associated with the established degree of simplicity.

11. The method according to claim 10, wherein the step of generating a password in accordance with the established degree of simplicity further comprises a step of generating a plurality of passwords, the plurality of passwords being generated so that a different access group is associated with each of the plurality of passwords.

12. The method according to claim 1, wherein the step of enabling a degree of simplicity to be set for a password enables a degree of simplicity to be set in response to a primary password having been entered and verified, and the password has a lower security level than the primary password.

* * * * *